US008784212B2

(12) United States Patent
Eisele

(10) Patent No.: US 8,784,212 B2
(45) Date of Patent: Jul. 22, 2014

(54) NETWORKED GAMING ENVIRONMENT EMPLOYING DIFFERENT CLASSES OF GAMING MACHINES

(75) Inventor: Walter Eisele, Reno, NV (US)

(73) Assignee: Bally Gaming, Inc., Las Vegas, NV (US)

(*) Notice: Subject to any disclaimer, the term of this patent is extended or adjusted under 35 U.S.C. 154(b) by 1312 days.

(21) Appl. No.: 11/938,150

(22) Filed: Nov. 9, 2007

(65) Prior Publication Data

US 2008/0200255 A1 Aug. 21, 2008

Related U.S. Application Data

(60) Provisional application No. 60/865,345, filed on Nov. 10, 2006, provisional application No. 60/865,575, filed on Nov. 13, 2006.

(51) Int. Cl.

| | |
|---|---|
| ***A63F 9/24*** | (2006.01) |
| ***A63F 13/00*** | (2014.01) |
| ***G06F 17/00*** | (2006.01) |
| ***G06F 19/00*** | (2011.01) |

(52) U.S. Cl.
USPC .......... 463/42

(58) Field of Classification Search
USPC .......... 463/42
See application file for complete search history.

(56) References Cited

U.S. PATENT DOCUMENTS

| | | | | |
|---|---|---|---|---|
| 4,339,798 | A | 7/1982 | Hedges et al. | 364/412 |
| 4,373,726 | A | 2/1983 | Churchill et al. | 273/138 A |
| 4,592,377 | A | 6/1986 | Paulsen et al. | 133/5 R |
| 4,725,079 | A | 2/1988 | Koza et al. | 283/73 |
| 4,832,341 | A | 5/1989 | Muller et al. | 273/139 |
| 4,948,138 | A | 8/1990 | Pease et al. | 273/138 A |
| 5,007,649 | A | 4/1991 | Richardson | |
| 5,083,800 | A | 1/1992 | Lockton | 273/439 |
| 5,179,517 | A | 1/1993 | Sarbin et al. | 364/410 |
| 5,199,710 | A | 4/1993 | Lamle | 273/149 R |
| 5,258,837 | A | 11/1993 | Gormley | 358/140 |
| 5,275,400 | A | 1/1994 | Weingardt et al. | 273/85 CP |
| 5,321,241 | A | 6/1994 | Craine | 235/380 |
| 5,324,035 | A | 6/1994 | Morris et al. | 273/138 A |
| 5,326,104 | A | 7/1994 | Pease et al. | 273/138 A |
| 5,386,103 | A | 1/1995 | DeBan et al. | 235/379 |
| 5,398,932 | A | 3/1995 | Eberhardt et al. | 273/138 A |
| 5,429,361 | A | 7/1995 | Raven et al. | 273/138 A |
| 5,472,194 | A | 12/1995 | Breeding et al. | 273/138 A |

(Continued)

FOREIGN PATENT DOCUMENTS

| | | | |
|---|---|---|---|
| DE | 199 40 954 | A1 | 3/2001 |
| EP | 1074955 | A2 | 2/2001 |

(Continued)

OTHER PUBLICATIONS

U.S. Appl. No. 11/938,203, Kelly et al., filed Nov. 9, 2007.

(Continued)

*Primary Examiner* — Kevin Y Kim
(74) *Attorney, Agent, or Firm* — Frank Abramonte; Fearon Brown; Marvin Hein

(57) ABSTRACT

A computerized management system and methods for use with game devices, systems, and methods enable users to remotely monitor, control, and modify game devices and other related activities, for gaming machines of different classes, for example Class II and Class III gaming machines.

39 Claims, 21 Drawing Sheets

(56) References Cited

U.S. PATENT DOCUMENTS

| | | | | |
|---|---|---|---|---|
| 5,493,613 | A | 2/1996 | Denno et al. | 380/24 |
| 5,505,449 | A | 4/1996 | Eberhardt et al. | 273/138 A |
| 5,507,489 | A | 4/1996 | Reibel et al. | 273/138 A |
| 5,562,284 | A | 10/1996 | Stevens | 273/139 |
| 5,580,311 | A | 12/1996 | Haste, III | 463/29 |
| 5,605,334 | A | 2/1997 | McCrea, Jr. | 273/309 |
| 5,605,506 | A | 2/1997 | Hoorn et al. | 463/47 |
| 5,613,680 | A | 3/1997 | Groves et al. | 273/138.2 |
| 5,613,912 | A | 3/1997 | Slater | 463/25 |
| 5,643,086 | A | 7/1997 | Alcorn et al. | 463/29 |
| 5,655,961 | A | 8/1997 | Acres et al. | 463/27 |
| 5,707,287 | A | 1/1998 | McCrea, Jr. | 463/27 |
| 5,737,418 | A | 4/1998 | Saffari et al. | 380/9 |
| 5,741,183 | A | 4/1998 | Acres et al. | 463/42 |
| 5,745,110 | A | 4/1998 | Ertemalp | 345/340 |
| 5,759,102 | A | 6/1998 | Pease et al. | 463/42 |
| 5,770,533 | A | 6/1998 | Franchi | 463/42 |
| 5,779,545 | A | 7/1998 | Berg et al. | 463/22 |
| 5,800,268 | A | 9/1998 | Molnick | 463/40 |
| 5,813,912 | A | 9/1998 | Shultz | 463/25 |
| 5,823,879 | A | 10/1998 | Goldberg et al. | 463/42 |
| 5,830,067 | A | 11/1998 | Graves et al. | 463/40 |
| 5,830,068 | A | 11/1998 | Brenner et al. | 463/42 |
| 5,850,447 | A | 12/1998 | Peyret | 380/25 |
| 5,851,149 | A | 12/1998 | Xidos et al. | 463/42 |
| 5,890,963 | A | 4/1999 | Yen | 463/42 |
| 5,911,626 | A | 6/1999 | McCrea, Jr. | 463/27 |
| 5,957,776 | A | 9/1999 | Hoehne | 463/25 |
| 5,971,851 | A | 10/1999 | Pascal et al. | 463/24 |
| 5,974,135 | A | 10/1999 | Breneman et al. | |
| 5,999,808 | A | 12/1999 | LaDue | 455/412 |
| 6,001,016 | A | 12/1999 | Walker et al. | 463/42 |
| 6,042,150 | A | 3/2000 | Daley | 283/86 |
| 6,047,322 | A | 4/2000 | Vaid et al. | |
| 6,068,553 | A | 5/2000 | Parker | 463/27 |
| 6,077,161 | A | 6/2000 | Wisler | 463/11 |
| 6,080,063 | A | 6/2000 | Khosla | 463/42 |
| 6,089,980 | A | 7/2000 | Gauselmann | 463/27 |
| 6,093,103 | A | 7/2000 | McCrea, Jr. | 463/27 |
| 6,102,799 | A | 8/2000 | Stupak | 463/27 |
| 6,104,815 | A | 8/2000 | Alcorn et al. | 380/251 |
| 6,106,396 | A | 8/2000 | Alcorn et al. | 463/29 |
| 6,110,041 | A | 8/2000 | Walker et al. | 463/20 |
| 6,110,043 | A | 8/2000 | Olsen | 463/27 |
| 6,117,012 | A | 9/2000 | McCrea, Jr. | 463/27 |
| 6,135,887 | A | 10/2000 | Pease et al. | 463/42 |
| 6,146,273 | A | 11/2000 | Olsen | 463/27 |
| 6,149,522 | A | 11/2000 | Alcorn et al. | 463/29 |
| 6,152,824 | A | 11/2000 | Rothschild et al. | 463/42 |
| 6,165,069 | A | 12/2000 | Sines et al. | 463/12 |
| 6,166,763 | A | 12/2000 | Rhodes et al. | 348/143 |
| 6,168,523 | B1 | 1/2001 | Piechowiak et al. | 463/26 |
| 6,183,366 | B1 | 2/2001 | Goldberg et al. | 463/42 |
| 6,185,184 | B1 | 2/2001 | Mattaway et al. | |
| 6,186,892 | B1 | 2/2001 | Frank et al. | 463/19 |
| 6,210,277 | B1 | 4/2001 | Stefan | 463/27 |
| 6,217,447 | B1 | 4/2001 | Lofink et al. | 463/12 |
| 6,219,836 | B1 | 4/2001 | Wells et al. | 717/11 |
| 6,234,898 | B1 | 5/2001 | Belamant et al. | 463/25 |
| 6,244,958 | B1 | 6/2001 | Acres | 463/26 |
| 6,251,014 | B1 | 6/2001 | Stockdale et al. | 463/16 |
| 6,254,483 | B1 | 7/2001 | Acres | |
| 6,254,484 | B1 | 7/2001 | McCrea, Jr. | 463/27 |
| 6,264,561 | B1 | 7/2001 | Saffari et al. | 463/42 |
| 6,275,586 | B1 | 8/2001 | Kelly | 380/46 |
| 6,287,202 | B1 | 9/2001 | Pascal et al. | 463/42 |
| 6,302,793 | B1 | 10/2001 | Fertitta, III et al. | |
| 6,312,332 | B1 | 11/2001 | Walker et al. | |
| 6,346,044 | B1 | 2/2002 | McCrea, Jr. | 463/27 |
| 6,362,836 | B1 | 3/2002 | Shaw et al. | |
| 6,383,076 | B1 | 5/2002 | Tiedeken | 463/40 |
| 6,389,126 | B1 | 5/2002 | Bjornberg et al. | |
| 6,394,900 | B1 | 5/2002 | McGlone et al. | 463/20 |
| 6,400,272 | B1 | 6/2002 | Holtzman et al. | 340/572.1 |
| 6,401,099 | B1 | 6/2002 | Koppolu et al. | |
| 6,409,602 | B1 | 6/2002 | Wiltshire et al. | 463/42 |
| 6,439,996 | B2 | 8/2002 | LeMay et al. | 463/29 |
| 6,443,839 | B2 | 9/2002 | Stockdale et al. | 463/16 |
| 6,459,882 | B1 | 10/2002 | Palermo | |
| 6,460,848 | B1 | 10/2002 | Soltys et al. | 273/149 R |
| 6,464,584 | B2 | 10/2002 | Oliver | 463/25 |
| 6,488,581 | B1 | 12/2002 | Stockdale | 463/29 |
| 6,488,585 | B1 | 12/2002 | Wells et al. | 463/43 |
| 6,490,285 | B2 | 12/2002 | Lee et al. | |
| 6,503,147 | B1 | 1/2003 | Stockdale et al. | 463/29 |
| 6,505,772 | B1 | 1/2003 | Mollett et al. | 235/379 |
| 6,508,709 | B1 | 1/2003 | Karmarkar | 463/42 |
| 6,508,710 | B1 | 1/2003 | Paravia et al. | 463/42 |
| 6,516,350 | B1 | 2/2003 | Lumelsky et al. | |
| 6,517,435 | B2 | 2/2003 | Soltys et al. | 463/25 |
| 6,517,436 | B2 | 2/2003 | Soltys et al. | 463/29 |
| 6,520,857 | B2 | 2/2003 | Soltys et al. | 463/29 |
| 6,527,271 | B2 | 3/2003 | Soltys et al. | 273/148 R |
| 6,527,638 | B1 | 3/2003 | Walker et al. | 463/25 |
| 6,530,836 | B2 | 3/2003 | Soltys et al. | 463/29 |
| 6,530,837 | B2 | 3/2003 | Soltys et al. | 463/29 |
| 6,533,276 | B2 | 3/2003 | Soltys et al. | 273/148 R |
| 6,533,662 | B2 | 3/2003 | Soltys et al. | 463/25 |
| 6,575,833 | B1 | 6/2003 | Stockdale | 463/29 |
| 6,578,847 | B1 | 6/2003 | Hedrick et al. | 273/138.2 |
| 6,579,180 | B2 | 6/2003 | Soltys et al. | 463/25 |
| 6,579,181 | B2 | 6/2003 | Soltys et al. | 463/25 |
| 6,581,747 | B1 | 6/2003 | Charlier et al. | 194/214 |
| 6,595,857 | B2 | 7/2003 | Soltys et al. | 463/29 |
| 6,607,441 | B1 | 8/2003 | Acres | 463/25 |
| 6,609,978 | B1 | 8/2003 | Paulsen | 463/42 |
| 6,612,928 | B1 | 9/2003 | Bradford et al. | 463/29 |
| 6,629,184 | B1 | 9/2003 | Berg et al. | 710/306 |
| 6,638,170 | B1 | 10/2003 | Crumby | 463/42 |
| 6,641,484 | B2 | 11/2003 | Oles et al. | 463/47 |
| 6,645,077 | B2 | 11/2003 | Rowe | 463/42 |
| 6,652,378 | B2 | 11/2003 | Cannon et al. | 463/20 |
| 6,656,048 | B2 | 12/2003 | Olsen | |
| 6,663,490 | B2 | 12/2003 | Soltys et al. | 463/25 |
| 6,675,152 | B1 | 1/2004 | Prasad et al. | 705/64 |
| 6,676,522 | B2 | 1/2004 | Rowe et al. | 463/42 |
| 6,682,421 | B1 | 1/2004 | Rowe et al. | 463/25 |
| 6,682,423 | B2 | 1/2004 | Brosnan et al. | 463/29 |
| 6,685,564 | B2 | 2/2004 | Oliver | 463/25 |
| 6,685,567 | B2 | 2/2004 | Cockerille et al. | 463/43 |
| 6,688,979 | B2 | 2/2004 | Soltys et al. | 463/25 |
| 6,699,128 | B1 | 3/2004 | Beadell et al. | 463/46 |
| 6,702,291 | B2 | 3/2004 | Grebler et al. | 273/292 |
| 6,712,695 | B2 | 3/2004 | Mothwurf et al. | 463/25 |
| 6,712,696 | B2 | 3/2004 | Soltys et al. | 463/25 |
| 6,718,361 | B1 | 4/2004 | Basani et al. | |
| 6,722,985 | B2 | 4/2004 | Criss-Puszkiewicz et al. | |
| 6,728,740 | B2 | 4/2004 | Kelly et al. | 708/250 |
| 6,743,102 | B1 | 6/2004 | Fiechter et al. | 463/42 |
| 6,745,330 | B1 | 6/2004 | Maillot | |
| 6,746,330 | B2 | 6/2004 | Cannon | 463/25 |
| 6,752,312 | B1 | 6/2004 | Chamberlain et al. | 235/375 |
| 6,755,741 | B1 | 6/2004 | Rafaeli | 463/25 |
| 6,758,751 | B2 | 7/2004 | Soltys et al. | 463/29 |
| 6,800,029 | B2 | 10/2004 | Rowe et al. | 463/25 |
| 6,811,488 | B2 | 11/2004 | Paravia et al. | 463/42 |
| 6,817,948 | B2 | 11/2004 | Pascal et al. | 463/42 |
| 6,823,419 | B2 | 11/2004 | Berg et al. | 710/306 |
| 6,837,789 | B2 | 1/2005 | Garahi et al. | 463/29 |
| 6,846,238 | B2 | 1/2005 | Wells | 463/39 |
| 6,848,994 | B1 | 2/2005 | Knust et al. | 463/25 |
| 6,866,581 | B2 | 3/2005 | Martinek et al. | 463/16 |
| 6,866,586 | B2 | 3/2005 | Oberberger et al. | 463/42 |
| 6,884,170 | B2 | 4/2005 | Rowe | |
| 6,884,173 | B2 | 4/2005 | Gauselmann | 463/42 |
| 6,884,174 | B2 | 4/2005 | Lundy et al. | 463/42 |
| 6,896,618 | B2 | 5/2005 | Benoy et al. | 463/25 |
| 6,899,627 | B2 | 5/2005 | Lam et al. | 463/40 |
| 6,905,411 | B2 | 6/2005 | Nguyen et al. | 463/25 |
| 6,908,387 | B2 | 6/2005 | Hedrick et al. | |
| 6,962,530 | B2 | 11/2005 | Jackson | 463/29 |
| 6,971,956 | B2 | 12/2005 | Rowe et al. | 463/25 |
| 6,972,682 | B2 | 12/2005 | Lareau et al. | 340/568.1 |
| 6,993,587 | B1 | 1/2006 | Basani et al. | 709/229 |

(56) References Cited

U.S. PATENT DOCUMENTS 6,997,803 B2 2/2006 LeMay et al. .................. 463/20
7,013,469 B2 3/2006 Smith et al.
7,025,674 B2 4/2006 Adams et al.
7,035,626 B1 4/2006 Luciano, Jr. ............... 455/414.1
7,050,056 B2 5/2006 Meyringer .................... 345/440
7,062,470 B2 6/2006 Prasad et al. .................... 705/64
7,086,947 B2 8/2006 Walker et al. ................... 463/25
7,099,035 B2 8/2006 Brooks et al. ................ 358/1.15
7,100,184 B1 8/2006 Kahn
7,112,138 B2 9/2006 Hedrick et al. ................. 463/29
7,114,718 B2 10/2006 Grauzer et al. ........... 273/149 R
7,116,782 B2 10/2006 Jackson et al. ................ 380/251
7,147,558 B2 12/2006 Giobbi ............................ 463/25
7,168,089 B2 1/2007 Nguyen et al. .................... 726/4
7,179,170 B2 2/2007 Martinek et al. ................ 463/29
7,186,181 B2 3/2007 Rowe ............................. 463/42
7,197,765 B2 3/2007 Chan et al. ........................ 726/8
7,198,571 B2 4/2007 LeMay et al. ................... 463/25
RE39,644 E 5/2007 Alcorn et al. ................. 380/251
7,260,834 B1 * 8/2007 Carlson ............................ 726/4
7,291,068 B2 11/2007 Bryant et al. ................... 463/25
7,293,282 B2 11/2007 Danforth et al.
7,297,062 B2 11/2007 Gatto et al.
7,300,352 B2 11/2007 Rowe
7,303,475 B2 12/2007 Britt et al. ....................... 463/42
7,309,065 B2 12/2007 Yoseloff et al. ............... 273/292
7,311,605 B2 12/2007 Moser ............................ 463/25
7,329,185 B2 2/2008 Conover et al. ................. 463/25
7,330,822 B1 2/2008 Robson et al. .................... 705/9
7,331,520 B2 2/2008 Silva et al. .................... 235/381
7,337,330 B2 2/2008 Gatto et al.
7,346,682 B2 3/2008 Basani et al. ................. 709/224
7,349,920 B1 3/2008 Feinberg et al. .............. 707/102
7,351,147 B2 4/2008 Stockdale et al. .............. 463/29
7,356,770 B1 4/2008 Jackson ........................ 715/736
7,363,342 B1 4/2008 Wang et al. ................... 709/204
7,364,510 B2 4/2008 Walker et al.
7,370,282 B2 5/2008 Cary ............................ 715/772
7,384,339 B2 6/2008 LeMay et al. ................... 463/30
7,398,327 B2 7/2008 Lee .............................. 709/250
7,410,422 B2 8/2008 Fine ............................... 463/42
7,419,428 B2 9/2008 Rowe ............................. 463/25
7,427,233 B2 9/2008 Walker et al. ................... 463/16
7,427,236 B2 9/2008 Kaminkow et al.
7,434,805 B2 10/2008 Grauzer et al. ........... 273/149 R
7,435,179 B1 10/2008 Ford ............................... 463/42
7,438,221 B2 10/2008 Washington et al.
7,438,643 B2 10/2008 Brosnan et al. ................. 463/42
7,460,863 B2 12/2008 Steelberg et al. ............. 455/419
7,465,231 B2 12/2008 Lewin et al. .................... 463/37
7,473,178 B2 1/2009 Boyd et al.
7,483,394 B2 1/2009 Chang et al. .................. 370/254
7,484,207 B2 1/2009 Sato
7,510,474 B2 3/2009 Carter, Sr. ....................... 463/29
7,515,718 B2 4/2009 Nguyen et al. ................ 380/278
7,534,169 B2 5/2009 Amaitis et al. .................. 463/39
7,549,576 B2 6/2009 Alderucci et al. ............ 235/380
7,559,080 B2 7/2009 Bhargavan et al. ............... 726/1
7,566,274 B2 7/2009 Johnson et al.
7,575,234 B2 8/2009 Soltys et al. .............. 273/149 R
7,577,847 B2 8/2009 Nguyen et al. ................ 713/186
7,578,739 B2 8/2009 Gauselmann ................... 463/27
7,585,217 B2 9/2009 Lutnick et al. .................. 463/16
7,594,030 B2 9/2009 Teodosiu et al.
7,607,976 B2 10/2009 Baerlocher et al.
7,607,977 B2 10/2009 Baerlocher et al.
7,611,407 B1 11/2009 Itkis et al. ....................... 463/29
7,611,409 B2 11/2009 Muir et al. ...................... 463/29
7,617,151 B2 11/2009 Rowe ............................. 705/39
7,621,809 B2 11/2009 Baerlocher et al.
7,629,886 B2 12/2009 Steeves ...................... 340/572.1
7,634,550 B2 12/2009 Wolber et al. ................. 709/220
7,637,810 B2 12/2009 Amaitis et al. .................. 463/25
7,644,861 B2 1/2010 Alderucci et al. ............ 235/382
7,648,414 B2 1/2010 McNutt et al. .................. 463/25
7,666,081 B2 2/2010 Baerlocher et al.
7,674,179 B2 3/2010 Baerlocher et al.
7,682,249 B2 3/2010 Winans et al. .................. 463/31
7,684,874 B2 3/2010 Schlottmann et al. ............ 700/9
7,685,516 B2 3/2010 Fischer
7,685,593 B2 3/2010 Solomon et al. .............. 717/170
7,686,688 B2 3/2010 Friedman et al. ............... 463/25
7,690,995 B2 4/2010 Frankulin et al. ............... 463/41
7,699,697 B2 4/2010 Darrah et al. ................... 463/16
7,699,703 B2 4/2010 Muir et al. ...................... 463/29
7,702,719 B1 4/2010 Betz et al.
7,706,895 B2 4/2010 Callaghan
7,722,453 B2 5/2010 Lark et al. ....................... 463/16
7,730,198 B2 6/2010 Ruppert et al. ............... 709/230
7,744,462 B2 6/2010 Grav et al. ....................... 463/27
7,747,741 B2 6/2010 Basani et al. ................. 709/224
7,753,790 B2 7/2010 Nguyen et al. .................. 463/42
7,769,877 B2 8/2010 McBride et al. .............. 709/230
7,778,635 B2 8/2010 Crookham et al. ........ 455/426.1
7,780,525 B2 8/2010 Walker et al. ................... 463/29
7,780,526 B2 8/2010 Nguyen et al. .................. 463/29
7,780,529 B2 8/2010 Rowe et al.
7,783,881 B2 8/2010 Morrow et al. ............... 713/165
7,785,204 B2 8/2010 Wells et al.
7,788,503 B2 8/2010 Gatto et al.
7,805,719 B2 9/2010 O'Neill
7,824,267 B2 11/2010 Cannon et al. .................. 463/42
7,828,649 B2 11/2010 Cuddy et al. .................... 463/26
7,841,946 B2 11/2010 Walker et al.
7,846,020 B2 12/2010 Walker et al.
7,850,528 B2 12/2010 Wells
7,857,702 B2 12/2010 Hilbert
7,862,425 B2 1/2011 Cavagna
7,874,920 B2 1/2011 Hornik et al.
7,874,921 B2 1/2011 Baszucki et al. ................ 463/43
7,886,288 B2 2/2011 Breckner et al.
7,892,093 B2 2/2011 Kniesteadt et al.
7,898,679 B2 3/2011 Brack et al.
7,901,294 B2 3/2011 Walker et al.
7,908,486 B2 3/2011 Gatto et al.
7,918,735 B2 4/2011 Inamura
7,963,847 B2 6/2011 Baerlocher
7,980,954 B2 7/2011 Gagner et al.
7,993,199 B2 8/2011 Iddings et al.
8,025,574 B2 9/2011 Hilbert
8,028,046 B2 9/2011 Elliott et al.
8,033,913 B2 10/2011 Cockerille et al.
8,037,313 B2 10/2011 Hämäläinen et al.
8,051,180 B2 11/2011 Mazzaferri et al.
8,057,294 B2 11/2011 Pacey et al.
8,057,297 B2 11/2011 Silvestro et al.
8,073,657 B2 12/2011 Moore, III et al.
8,075,403 B2 12/2011 O'Brien et al.
8,117,461 B2 2/2012 Bigelow, Jr. et al.
8,147,316 B2 4/2012 Arezina et al.
8,147,334 B2 4/2012 Gatto et al.
8,171,155 B2 5/2012 Ruppert
8,185,423 B2 5/2012 Brook et al.
8,197,344 B2 6/2012 Rathsack et al.
8,201,229 B2 6/2012 Ruppert et al.
8,280,777 B2 10/2012 Mengerink et al.
8,285,740 B2 10/2012 Graham et al.
8,308,554 B2 11/2012 Rowe et al.
2001/0019966 A1 9/2001 Idaka .............................. 463/40
2002/0004824 A1 1/2002 Cuan et al.
2002/0111213 A1 8/2002 McEntee et al. ................ 463/42
2002/0113371 A1 8/2002 Snow ............................ 273/292
2002/0115487 A1 8/2002 Wells .............................. 463/42
2002/0142844 A1 10/2002 Kerr
2002/0147047 A1 10/2002 Letovsky et al.
2002/0151363 A1 10/2002 Letovsky et al.
2002/0152120 A1 10/2002 Howington
2002/0187825 A1 12/2002 Tracy et al. ..................... 463/17
2003/0004871 A1 1/2003 Rowe .............................. 705/39
2003/0027625 A1 2/2003 Rowe .............................. 463/20
2003/0032474 A1 2/2003 Kaminkow ..................... 463/25
2003/0036425 A1 2/2003 Kaminkow et al. ............. 463/25
2003/0042679 A1 3/2003 Snow ............................ 273/292
2003/0064798 A1 4/2003 Grauzer et al. ................. 463/29

(56) References Cited

U.S. PATENT DOCUMENTS

2003/0069074 A1 4/2003 Jackson .................. 463/43
2003/0075869 A1 4/2003 Breeding et al. .............. 273/292
2003/0078103 A1 4/2003 LeMay et al. .................. 463/43
2003/0090064 A1 5/2003 Hoyt et al. .................. 273/292
2003/0104865 A1 6/2003 Itkis et al. .................. 463/39
2003/0130024 A1 7/2003 Darby .................. 463/13
2003/0182414 A1 9/2003 O'Neill
2003/0186733 A1 10/2003 Wolf et al. .................. 463/16
2003/0203755 A1 10/2003 Jackson .................. 463/42
2003/0206548 A1 11/2003 Bannai et al. .................. 370/389
2003/0224858 A1 12/2003 Yoseloff et al. .................. 463/43
2003/0228912 A1 12/2003 Wells et al. .................. 463/43
2003/0232651 A1 12/2003 Huard et al. .................. 463/42
2004/0002385 A1 1/2004 Nguyen .................. 463/42
2004/0002386 A1 1/2004 Wolfe et al.
2004/0002388 A1 1/2004 Larsen et al. .................. 463/43
2004/0029635 A1 2/2004 Giobbi .................. 463/30
2004/0043815 A1 3/2004 Kaminkow .................. 463/25
2004/0043820 A1 3/2004 Schlottmann .................. 463/43
2004/0048671 A1 3/2004 Rowe .................. 463/42
2004/0068654 A1 4/2004 Cockerille et al. .............. 713/168
2004/0082385 A1 4/2004 Silva et al. .................. 463/40
2004/0092310 A1 5/2004 Brosnan et al. .................. 463/42
2004/0106452 A1 6/2004 Nguyen et al. .................. 463/42
2004/0110119 A1 6/2004 Riconda et al. .............. 434/350
2004/0127291 A1 7/2004 George et al. .................. 463/42
2004/0133485 A1 7/2004 Schoonmaker et al. ........ 705/30
2004/0142744 A1 7/2004 Atkinson et al. .................. 463/29
2004/0166940 A1 8/2004 Rothschild
2004/0185936 A1 9/2004 Block et al. .................. 463/42
2004/0229684 A1 11/2004 Blackburn et al.
2004/0254993 A1 12/2004 Mamas
2005/0043094 A1 2/2005 Nguyen et al. .................. 463/42
2005/0054438 A1 3/2005 Rothschild et al. .............. 463/29
2005/0070358 A1 3/2005 Angell et al. .................. 463/39
2005/0080898 A1 4/2005 Block
2005/0119052 A1 6/2005 Russell et al. .................. 463/42
2005/0124411 A1 6/2005 Schneider et al. .............. 463/29
2005/0153778 A1 7/2005 Nelson et al. .................. 463/42
2005/0171808 A1 8/2005 Saenz et al.
2005/0222891 A1 10/2005 Chan et al. .................. 705/9
2005/0239542 A1 10/2005 Olsen .................. 463/27
2005/0261058 A1* 11/2005 Nguyen et al. .................. 463/40
2005/0282626 A1 12/2005 Manfredi et al. .................. 463/25
2006/0003828 A1 1/2006 Abecassis
2006/0004618 A1 1/2006 Brixius .................. 705/8
2006/0009282 A1 1/2006 George et al. .................. 463/29
2006/0015716 A1 1/2006 Thornton et al.
2006/0026499 A1 2/2006 Weddle .................. 715/503
2006/0035707 A1 2/2006 Nguyen et al. .................. 463/29
2006/0046849 A1 3/2006 Kovacs .................. 463/39
2006/0068907 A1* 3/2006 DiMichele et al. .............. 463/30
2006/0116208 A1 6/2006 Chen et al. .................. 463/43
2006/0121970 A1 6/2006 Khal .................. 463/16
2006/0160614 A1* 7/2006 Walker et al. .................. 463/29
2006/0183541 A1 8/2006 Okada et al. .................. 463/29
2006/0195847 A1 8/2006 Amano et al. .................. 718/103
2006/0205508 A1 9/2006 Green .................. 463/40
2006/0217202 A1 9/2006 Burke et al.
2006/0247013 A1 11/2006 Walker et al. .................. 463/20
2006/0247057 A1 11/2006 Green et al. .................. 463/42
2006/0252530 A1 11/2006 Oberberger et al.
2006/0253702 A1 11/2006 Lowell et al.
2006/0259604 A1 11/2006 Kotchavi et al.
2006/0277487 A1 12/2006 Poulsen et al. .................. 715/772
2006/0287098 A1 12/2006 Morrow et al.
2007/0004501 A1 1/2007 Brewer et al.
2007/0006329 A1 1/2007 Morrow et al. .................. 726/34
2007/0015583 A1 1/2007 Tran .................. 463/40
2007/0026935 A1 2/2007 Wolf et al.
2007/0032288 A1 2/2007 Nelson et al.
2007/0033247 A1 2/2007 Martin .................. 709/201
2007/0054740 A1 3/2007 Salls et al. .................. 463/42
2007/0057453 A1 3/2007 Soltys et al. .............. 273/149 R
2007/0057454 A1 3/2007 Fleckenstein .............. 273/149 R
2007/0057469 A1 3/2007 Grauzer et al. .............. 273/309
2007/0060259 A1 3/2007 Pececnik .................. 463/16
2007/0060307 A1 3/2007 Mathis et al. .................. 463/25
2007/0060365 A1 3/2007 Tien et al. .................. 463/42
2007/0077995 A1 4/2007 Oak et al.
2007/0082737 A1 4/2007 Morrow et al. .................. 463/42
2007/0093298 A1 4/2007 Brunet .................. 463/42
2007/0105628 A1 5/2007 Arbogast et al. .................. 463/42
2007/0111775 A1 5/2007 Yoseloff .................. 463/16
2007/0111791 A1 5/2007 Arbogast et al. .................. 463/40
2007/0111794 A1 5/2007 Hogan et al. .................. 463/42
2007/0117608 A1 5/2007 Roper et al. .................. 463/16
2007/0124483 A1 5/2007 Marples et al. .............. 709/228
2007/0129145 A1 6/2007 Blackburn et al. .............. 463/42
2007/0155490 A1 7/2007 Phillips et al.
2007/0167235 A1 7/2007 Naicker .................. 463/42
2007/0191102 A1 8/2007 Coliz et al. .................. 463/42
2007/0192748 A1 8/2007 Martin et al. .................. 715/856
2007/0198418 A1 8/2007 MacDonald et al. .......... 705/52
2007/0208816 A1 9/2007 Baldwin et al. .............. 709/206
2007/0214030 A1 9/2007 Shear et al.
2007/0218998 A1 9/2007 Arbogast et al. .................. 463/42
2007/0235521 A1 10/2007 Mateen et al. .............. 235/379
2007/0241497 A1 10/2007 Soltys et al. .............. 273/149 R
2007/0241498 A1 10/2007 Soltys .................. 273/149 R
2007/0243925 A1 10/2007 LeMay et al. .................. 463/20
2007/0243927 A1 10/2007 Soltys .................. 463/25
2007/0243935 A1 10/2007 Huizinga .................. 463/42
2007/0259709 A1 11/2007 Kelly et al. .................. 463/20
2007/0259711 A1 11/2007 Thomas .................. 463/22
2007/0273094 A1 11/2007 Fleckenstein .............. 273/149 P
2007/0287535 A1 12/2007 Soltys .................. 463/29
2007/0298868 A1 12/2007 Soltys .................. 463/25
2008/0004108 A1 1/2008 Klinkhammer .................. 463/29
2008/0009344 A1 1/2008 Graham et al.
2008/0026832 A1 1/2008 Stevens et al.
2008/0026848 A1 1/2008 Byng
2008/0038035 A1 2/2008 Shuldman et al. .............. 400/76
2008/0045341 A1 2/2008 Englman
2008/0045342 A1 2/2008 Crowder, Jr. et al.
2008/0058105 A1 3/2008 Combs et al.
2008/0064501 A1 3/2008 Patel .................. 463/40
2008/0065590 A1 3/2008 Castro et al.
2008/0076572 A1 3/2008 Nguyen et al. .................. 463/42
2008/0090651 A1 4/2008 Baerlocher .................. 463/27
2008/0096659 A1 4/2008 Kreloff et al. .................. 463/39
2008/0102919 A1 5/2008 Rowe et al.
2008/0102932 A1 5/2008 Anderson et al.
2008/0108405 A1 5/2008 Brosnan et al.
2008/0108433 A1 5/2008 DiMichele et al. .............. 463/40
2008/0113764 A1 5/2008 Soltys .................. 463/22
2008/0113773 A1 5/2008 Johnson et al. .................. 463/25
2008/0119284 A1 5/2008 Luciano, Jr. et al. .......... 463/42
2008/0126803 A1 5/2008 Ginter et al.
2008/0127174 A1 5/2008 Johnson
2008/0138773 A1 6/2008 Lathrop
2008/0146337 A1 6/2008 Halonen et al. .................. 463/42
2008/0153599 A1 6/2008 Atashband et al. .............. 463/42
2008/0153600 A1 6/2008 Swarna .................. 463/43
2008/0154916 A1 6/2008 Atashband .................. 707/10
2008/0155665 A1 6/2008 Ruppert et al. .................. 726/5
2008/0162729 A1 7/2008 Ruppert .................. 709/249
2008/0171588 A1 7/2008 Atashband .................. 463/20
2008/0171598 A1 7/2008 Deng .................. 463/40
2008/0200255 A1 8/2008 Eisele .................. 463/42
2008/0243697 A1 10/2008 Irving et al. .................. 705/54
2008/0244565 A1 10/2008 Levidow et al.
2008/0261699 A1 10/2008 Topham et al.
2008/0261701 A1 10/2008 Lewin et al.
2008/0287197 A1 11/2008 Ruppert et al. .................. 463/42
2008/0293494 A1 11/2008 Adiraju et al. .................. 463/42
2008/0300046 A1 12/2008 Gagner et al.
2008/0311971 A1 12/2008 Dean .................. 463/20
2008/0313282 A1 12/2008 Warila et al.
2008/0318685 A9 12/2008 Oak et al.
2009/0005176 A1 1/2009 Morrow et al. .................. 463/43
2009/0005177 A1 1/2009 Kishi et al.
2009/0011833 A1 1/2009 Seelig et al.
2009/0029775 A1 1/2009 Ruppert et al. .................. 463/42

(56) References Cited

U.S. PATENT DOCUMENTS

| | | | | |
|---|---|---|---|---|
| 2009/0029776 | A1 | 1/2009 | Ruppert et al. | 463/42 |
| 2009/0054139 | A1 | 2/2009 | Anderson | |
| 2009/0063309 | A1 | 3/2009 | Stephens | |
| 2009/0115133 | A1 | 5/2009 | Kelly et al. | 273/274 |
| 2009/0117994 | A1 | 5/2009 | Kelly et al. | 463/25 |
| 2009/0118001 | A1 | 5/2009 | Kelly et al. | 463/29 |
| 2009/0118006 | A1 | 5/2009 | Kelly et al. | 463/31 |
| 2009/0124329 | A1 | 5/2009 | Palmisano | |
| 2009/0124392 | A1 | 5/2009 | Ruppert et al. | 463/42 |
| 2009/0124394 | A1 | 5/2009 | Swarna | 463/43 |
| 2009/0125603 | A1 | 5/2009 | Atashband et al. | 709/207 |
| 2009/0131144 | A1 | 5/2009 | Allen | 463/20 |
| 2009/0131163 | A1 | 5/2009 | Arbogast et al. | 463/29 |
| 2009/0132720 | A1 | 5/2009 | Ruppert et al. | 709/231 |
| 2009/0170594 | A1 | 7/2009 | Delaney et al. | 463/25 |
| 2009/0176580 | A1 | 7/2009 | Herrmann et al. | 463/43 |
| 2009/0181776 | A1 | 7/2009 | Deng | |
| 2009/0239667 | A1 | 9/2009 | Rowe et al. | |
| 2009/0270170 | A1 | 10/2009 | Patton | 463/36 |
| 2009/0275394 | A1 | 11/2009 | Young et al. | 463/25 |
| 2009/0275400 | A1 | 11/2009 | Rehm et al. | 463/27 |
| 2009/0276341 | A1 | 11/2009 | McMahan et al. | 705/30 |
| 2009/0307069 | A1 | 12/2009 | Meyerhofer | 705/14.12 |
| 2009/0325708 | A9 | 12/2009 | Kerr | |
| 2010/0016067 | A1 | 1/2010 | White et al. | 463/25 |
| 2010/0016068 | A1 | 1/2010 | White et al. | 463/25 |
| 2010/0029385 | A1 | 2/2010 | Garvey et al. | 463/35 |
| 2010/0048291 | A1 | 2/2010 | Warkentin | 463/25 |
| 2010/0058320 | A1 | 3/2010 | Milligan et al. | |
| 2010/0062838 | A1 | 3/2010 | Nguyen et al. | |
| 2010/0093440 | A1 | 4/2010 | Burke | |
| 2010/0124990 | A1 | 5/2010 | Crowder | 463/42 |
| 2010/0125851 | A1 | 5/2010 | Singh et al. | 718/104 |
| 2010/0131772 | A1 | 5/2010 | Atashband et al. | 713/189 |
| 2010/0151926 | A1 | 6/2010 | Ruppert et al. | 463/1 |
| 2010/0161798 | A1 | 6/2010 | Ruppert et al. | 709/225 |
| 2010/0210353 | A1 | 8/2010 | Gagner et al. | |
| 2010/0234104 | A1 | 9/2010 | Ruppert et al. | 463/30 |
| 2011/0009184 | A1 | 1/2011 | Byng | |
| 2011/0124417 | A1 | 5/2011 | Baynes et al. | |
| 2011/0179409 | A1 | 7/2011 | Yoseloff et al. | |
| 2011/0269534 | A1 | 11/2011 | Kelly et al. | |
| 2012/0110649 | A1 | 5/2012 | Murphy | |
| 2012/0203692 | A1 | 8/2012 | Olliphant et al. | |

FOREIGN PATENT DOCUMENTS

| | | | |
|---|---|---|---|
| EP | 1463008 | A2 | 9/2004 |
| GB | 2 380 143 | A | 4/2003 |
| GB | 2 382 034 | A | 5/2003 |
| JP | 8255059 | | 10/1996 |
| KR | 2001-0084838 | | 9/2001 |
| KR | 2002-0061793 | | 7/2002 |
| KR | 2003-0091635 | | 12/2003 |
| WO | WO 02/05914 | | 1/2002 |
| WO | WO 03/060846 | | 7/2003 |
| WO | 2005/035084 | | 4/2005 |
| WO | WO 2007/033207 | | 3/2007 |

OTHER PUBLICATIONS

U.S. Appl. No. 12/112,473, Allen et al., filed Apr. 30, 2008.
U.S. Appl. No. 12/112,554, Nelson et al., filed Apr. 30, 2008.
U.S. Appl. No. 12/112,691, Backover et al., filed Apr. 30, 2008.
U.S. Appl. No. 12/113,005, McAllister et al., filed Apr. 30, 2008.
U.S. Appl. No. 12/113,021, Singh et al., filed Apr. 30, 2008.
U.S. Appl. No. 12/113,038, Arbogast et al., filed Apr. 30, 2008.
U.S. Appl. No. 12/113,139, Hermansen et al., filed Apr. 30, 2008.
U.S. Appl. No. 61/057,306, Jones, filed May 30, 2008.
U.S. Appl. No. 61/080,165, Rajaraman et al., filed Jul. 11, 2008.
Bulavsky, J., "Tracking the Tables," *Casino Journal*, May 2004, pp. 44-47, accessed Dec. 21, 2005, URL=http://www.ascendgaming.com/cj/vendors_manufacturers_table/Trackin916200411141AM.htm, 5 pages
Burke, A., "Tracking the Tables," reprinted from *International Gaming & Wagering Business*, Aug. 2003, 4 pages.
Gros, R., "All You Ever Wanted to Know About Table Games," reprinted from *Global Gaming Business*, Aug. 1, 2003, 2 pages.
Terdiman, D., "Who's Holding the Aces Now?", reprinted from *Wired News*, Aug. 18, 2003, 2 pages.
Winkler, C., "Product Spotlight: MindPlay," reprinted from *Gaming and Leisure Technology*, Fall 2003, 2 pages.
Bally TMS, "MP21—Automated Table Tracking/Features," 2 pages, Nov. 2005.
Bally TMS, "MPBacc—Specifications/Specifications," 2 pages, Nov. 2005.
Bally TMS, "MPLite—Table Management System/Features," 2 pages, Nov. 2005.
Mikohn, "Mikohn Tablelink—The Industry's Premier Table Tracking Solution Delivers Improvements Straight to the Bottom Line," 2 pages, before Jan. 1, 2004.
Mikohn, "Tablelink™, The New Standard in Table Games," before Jan. 1, 2004, 14 pages.
Bally Technologies, Inc., iVIEW, http://ballytech.com/systems/product.cfm?id=9, download date Nov. 6, 2007, 2 pages.
MagTek, "Port Powered Swipe Reader," Technical Reference Manual, Manual Part No. 99875094 Rev 12, Jun. 2003, 20 pages.
"BOB and LDAP," Gaming Standards Association, Fremont, California, 7 pages, Oct. 26, 2003.
"GSA Point-to-Point SOAP/HTTPS Transport and Security Specification v1.0.3," Gaming Standards Association TRANSPORT Technical Committee, 16 pages, Jun. 5, 2007.
Gwyddion User Guide, "False Color Mapping: Chapter 3. Getting Started," retrieved from URL=http://sourceforge.net/projects/gwyddion/files/user-guide/2007-06-28/gwyddion-user-guide-xhtml-2007-06-28.tar.gz/download, retrieved on Nov. 21, 2012, 2 pages.
Requirements document, "Game Authentication Terminal Program (GAT3)," to Gaming Standards Association, Aug. 2005, 27 pages.
Standards document, "Technical Standards for Gaming Devices and On-Line Slot Systems," to Nevada Gaming Commission and State Gaming Control Board, Aug. 17, 2005, 15 pages.
Hung et al., "Performance Evaluation of the Least Conflict Sharable Spreading Code Assignment Algorithm," IEEE, 1996, 5 pages.
Olesiejuk, "Discovery Services for Gaming Devices on a Casino Floor," Gaming Standards Association, 3 pages, Mar. 12, 2007.

* cited by examiner

NETWORKED GAMING ENVIRONMENT EMPLOYING DIFFERENT CLASSES OF GAMING MACHINES

CROSS-REFERENCE TO RELATED APPLICATIONS

This application claims benefit under 35 U.S.C. 119(e) to U.S. provisional patent application Ser. No. 60/865,345, filed Nov. 10, 2006; and U.S. provisional patent application Ser. No. 60/865,575, filed Nov. 13, 2006.

BACKGROUND

1. Technical Field

This invention pertains generally to management systems and methods. More particularly, the present invention relates to a computerized method and system for managing, monitoring, controlling, and modifying game- or gaming-related activities.

2. Description of Related Art

BRIEF SUMMARY

In one aspect, a computerized management system and method for use with game devices, systems, and methods is provided to enable users to monitor, control, and modify game devices and other related activities.

At least one embodiment may be summarized as a gaming system, including a plurality of gaming machines each including a respective main processor and main user interface, at least one of the gaming machines configured as a Class II gaming machine and at least one of the gaming machines configured as a Class III gaming machine; and an information server communicatively coupled with the gaming machines configured as Class II gaming machines and the gaming machines configured as Class III gaming machines.

The information server may be implemented as a set of Internet Information Services®. The gaming system may further include a plurality of embedded user interfaces associated with respective ones of the gaming machines, the embedded user interfaces including an embedded processor and an embedded display, where the information server may be communicatively coupled to the gaming machines via respective ones of the embedded user interfaces. The gaming system may further include a message processor configured to parse messages into commands and to route the commands to be handled. The gaming system may further include a message handler configured to handle commands routed from the message processor. The message handler may be configured to handle at least some of the commands via a Web service. The gaming system may further include a plurality of databases communicatively coupled to the message handler. The plurality of databases may include at least one of a core database, a configuration database that stores configuration information indicative of one or more configuration parameters of the gaming machines, a download database that stores one or more packages of instructions downloadable to and executable by one or more of the gaming machines, a tournament database that stores information indicative of a tournament run on one or more of the gaming machines, a reports database that stores performance information about one or more of the gaming machines, an event database that stores information about one or more events, a voucher database that stores information about one or more vouchers provided to a number of players, and a schedule database that stores scheduling information indicative of times at which one or more of the gaming machines are to be reconfigured. The message handler may be configured to make a direct call to a procedure stored on a selected one of the databases to retrieve data requested via one of the commands. The gaming system may further include at least one additional server communicatively coupled only to the gaming machines that are configured as the Class II gaming machines. The at least one additional server may include at least one of a bingo gaming controller, a bingo gaming manager, a player tracking gateway and a player account system. The gaming system may further include a certificate server communicatively coupled to at least one of the gaming machines. The gaming system may further include a gaming control computer including a graphical user interface and may be operable to remotely selectively configure at least one of the gaming machines, wherein the certificate server may provide certificates used to authenticate a proposed configuration command.

At least one embodiment may be summarized as a gaming machine management system to manage a plurality of gaming machines operable as Class II and Class III gaming machines, the gaming machine management system including a plurality of embedded user interfaces embedded in respective ones of the gaming machines and including an embedded processor and an embedded display; and a set of communications services that provide communications between the embedded user interfaces respectively embedded in both the Class II and the Class III gaming machines.

The communications services may be implemented as a set of Internet Information Services®. The gaming system may further include a message processor configured to parse messages into commands and to route the commands to be handled; and a message handler configured to handle commands routed from the message processor. The gaming system may further include a plurality of databases communicatively coupled to exchange information with the message handler. The message handler may be configured to handle at least some of the commands via a Web service. The gaming system may further include a game management computing system including a game management graphical user interface; an executive server configured to reconfigure the game machines; and a set of communications services that provide communications between the computing system and the executive server. The gaming system may further include a scheduler communicatively coupled to the executive server and configured to cause the executive server to reconfigure at least some of the gaming machines based on a schedule stored in a schedule database. The gaming system may further include a scheduler communicatively coupled to the executive server and configured to cause the executive server to reconfigure at least some of the gaming machines based on a schedule stored in a schedule database that represents player demand for the Class II and the Class III gaming machines in a similar previous period. The executive server may be configured to reconfigure at least some of the Class II gaming machines as Class III gaming machines. The executive server may be configured to reconfigure at least some of the Class III gaming machines as Class II gaming machines.

At least one embodiment may be summarized as a method of manage a plurality of gaming machines operable as Class II and Class III gaming machines, the method including providing communications between the gaming machines operated as Class II gaming machines and a first information server; and providing communications between the gaming machines operated as Class III gaming machines and the first information server.

Providing communications between the gaming machines operated as Class II gaming machines and a first information server may include providing communications between the first information server and each of a first number of embedded user interfaces embedded in respective ones of the gaming machines operated as Class II gaming machines. Providing communications between the gaming machines operated as Class III gaming machines and the first information server may include providing communications between the first information server and each of a second number of embedded user interfaces embedded in respective ones of the gaming machines operated as Class III gaming machines. Providing communications between the first information server and each of a first number of embedded user interfaces embedded in respective ones of the gaming machines operated as Class II gaming machines and providing communications between the first information server and each of a first number of embedded user interfaces embedded in respective ones of the gaming machines operated as Class III gaming machines may include providing communications using a set of Internet Information Services®. The method may further include parsing messages into a number of commands; and handling the commands. Handling the commands may include directly calling a procedure stored on a selected databases to retrieve data requested via one of the commands. Handling the commands may include invoking a Web service. The method may further include providing communications between the gaming machines operated as Class II gaming machines and a slot management system, separately from the communications between the gaming machines operated as Class II gaming machines and the first information server. The method may further include providing communications between the gaming machines operated as Class II gaming machines and at least one of a bingo gaming controller, a bingo gaming manager, a player tracking gateway and a player account system, separately from the communications between the gaming machines operated as Class II gaming machines and the first information server. The method may further include providing certificates to the gaming machines operated as Class II gaming machines and to the gaming machines operated as Class III gaming machines, separately from the communications between the gaming machines and the first information server. The method may further include remotely reconfiguring at least one parameter of at least one of the gaming machines operated as a Class II gaming machine via the first information server. The method may further include remotely reconfiguring at least one parameter of at least one of the gaming machines operated as a Class III gaming machine via the first information server. The method may further include remotely downloading new instructions to at least one of the gaming machines operated as a Class II gaming machine via the first information server. The method may further include remotely downloading new instructions to at least one of the gaming machines operated as a Class III gaming machine via the first information server. The method may further include remotely reconfiguring at least some of the Class II gaming machines as Class III gaming machines. The method may further include reconfiguring at least some of the Class III gaming machines as Class II gaming machines. The method may further include automatically reconfiguring at least some of the Class II and the Class III gaming machines based on a schedule. The method may further include providing communications between at least some of the gaming machines and a casino management system via the first information server.

Further aspects, features and advantages of various embodiments of the invention will be apparent from the following detailed disclosure, taken in conjunction with the accompanying sheets of drawings.

BRIEF DESCRIPTION OF THE SEVERAL VIEWS OF THE DRAWINGS

In the drawings, identical reference numbers identify similar elements or acts. The sizes and relative positions of elements in the drawings are not necessarily drawn to scale. For example, the shapes of various elements and angles are not drawn to scale, and some of these elements are arbitrarily enlarged and positioned to improve drawing legibility. Further, the particular shapes of the elements as drawn, are not intended to convey any information regarding the actual shape of the particular elements, and have been solely selected for ease of recognition in the drawings.

DETAILED DESCRIPTION OF THE PREFERRED EMBODIMENTS

Figure 1A:
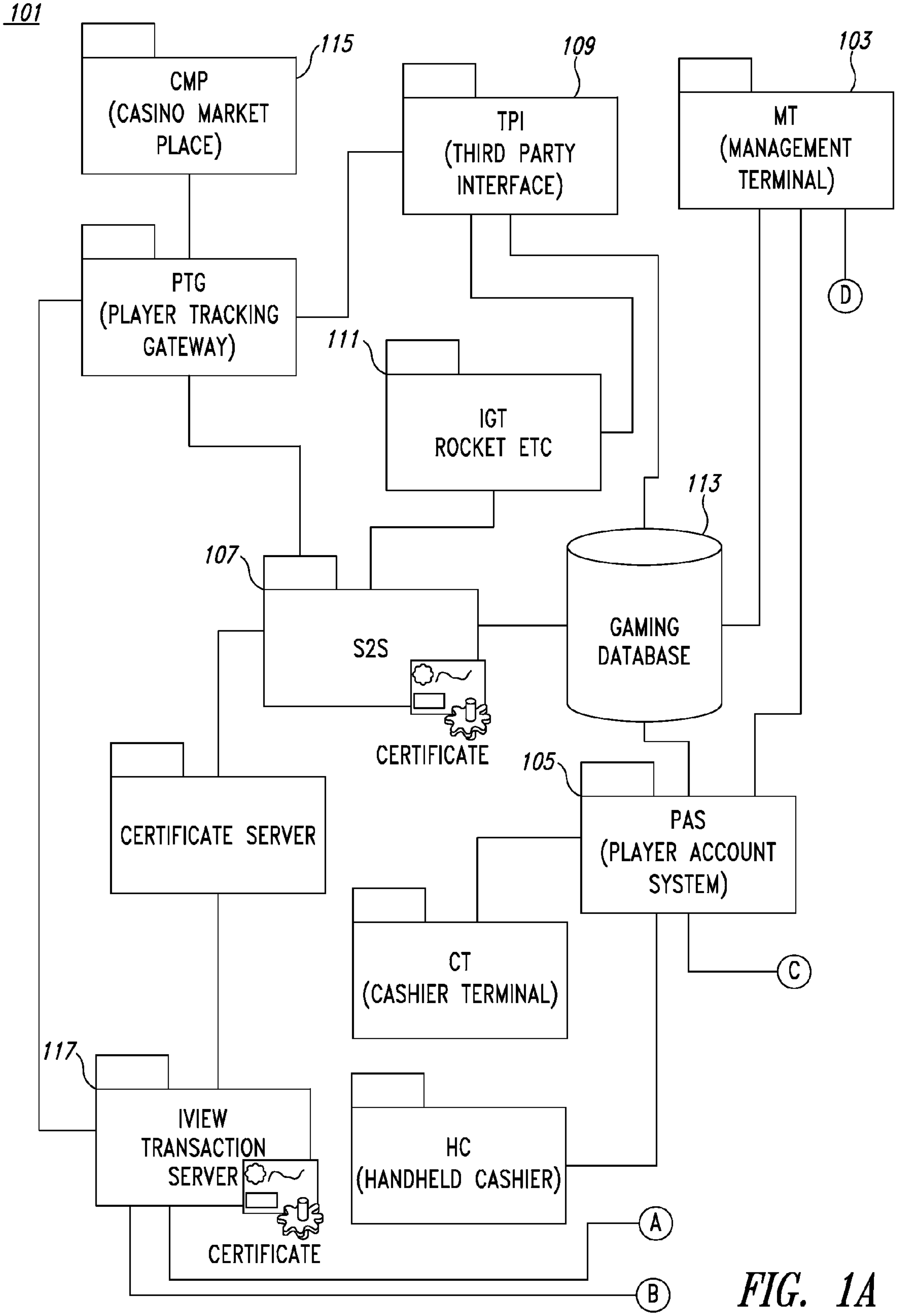
FIGS. 1A and 1B are a block diagram of a slot management system architecture according to one illustrated embodiment.

In the following description, certain specific details are set forth in order to provide a thorough understanding of various disclosed embodiments. However, one skilled in the relevant art will recognize that embodiments may be practiced without one or more of these specific details, or with other methods, components, materials, etc. In other instances, well-known structures associated with computing systems, networks including servers, routers and bridges, and gaming machines have not been shown or described in detail to avoid unnecessarily obscuring descriptions of the embodiments.

Unless the context requires otherwise, throughout the specification and claims which follow, the word "comprise" and variations thereof, such as, "comprises" and "comprising" are to be construed in an open, inclusive sense, that is as "including, but not limited to."

Reference throughout this specification to "one embodiment" or "an embodiment" means that a particular feature, structure or characteristic described in connection with the embodiment is included in at least one embodiment. Thus, the appearances of the phrases "in one embodiment" or "in an embodiment" in various places throughout this specification are not necessarily all referring to the same embodiment. Further more, the particular features, structures, or characteristics may be combined in any suitable manner in one or more embodiments.

As used in this specification and the appended claims, the singular forms "a," "an," and "the" include plural referents unless the content clearly dictates otherwise. It should also be noted that the term "or" is generally employed in its sense including "and/or" unless the content clearly dictates otherwise.

The headings and Abstract of the Disclosure provided herein are for convenience only and do not interpret the scope or meaning of the embodiments.

Referring to FIG. 1, an example slot management system 101 is shown.

One conventional gaming machine management system is the Bally One System, which is designed to provide essential functionality for Class II and/or Class III facilities. The present example embodiment provides for a unified gaming machine management system that offers the full feature sets which are desirable for a Class III casino floor with a rich gaming environment and providing the flexibility to mix Class II and Class III machines on the same gaming floor. To accommodate this unification, many features and functions are needed to provide a robust functional capability. In the example embodiment, an architectural framework is provided that enables the addition of modules and functionality. Slot management system 101 uses standards based communications protocols, such as HTTP, XML, SOAP, SSL. Slot management system 101 is a scaleable system which includes off-the-shelf components, such as conventional servers and storage devices. Slot management system 101 utilizes standard user interfaces for all system front ends, such as a display, keyboard, mouse, and conventional windows software. An example front-end may be management terminal (server) 103 from which an operator can utilize a user interface (e.g., graphical user interface or GUI) to communicate with player account system server 105 and review and/or modify player information contained in a player database managed by player account system server 105. Slot management system 101 uses standardized authentication, authorization and verification protocols which are implemented and/or controlled by server-to-server (S2S) server 107 which enables the secure communication of data and information between the respective servers within the system 101. Third party interface 109 further provides for the incorporation of third party servers and storage devices, such as IGT/Rocket server 111 and Gaming Database 113, using the standardized authentication, authorization and verification protocols. Slot management system 101 supports a wide range of promotional tools to enable various promotional and marketing programs which may be used in conjunction with casino market place server 115, such as Bally Gaming's CMP subsystem, or another system gaming subsystem. Slot management system 101 includes transaction server 117, for example a Bally iView transaction server which communicates with Bally iView apparatuses which are incorporated with gaming machines connected to the network, where iView apparatuses include a secondary display connected to a motherboard including a microprocessor or controller, memory, and selected communication, player, and/or gaming software, such as a conventional video wagering game or multi-media presentations which may be enabled by a player, the gaming machine, or the slot management system. It may be appreciated that transaction server 117 can be designed to drive and communicate with other network connected apparatuses having a display and user interface. In the contemplated embodiments, the networked apparatuses, such as the iVIEW apparatuses, are incorporated with slot management system 101 to multi-task as both a presentation engine and a game management unit (GMU). It must be noted that this implementation of the iVIEW provides a real-time polling engine for serial based protocols as well as a web service communications stack for communicating with the back-office host system. Additionally the iVIEW provides complete graphical content management visible to the player. To provide flexibility, slot management system 101 utilizes open standard GSA (Gaming Standards Association) protocols for ease of integrating various manufacturers devices and a windows-based system for ease of operators (users) in programming and obtaining data from, and adding data to the system.

Figure 1B:
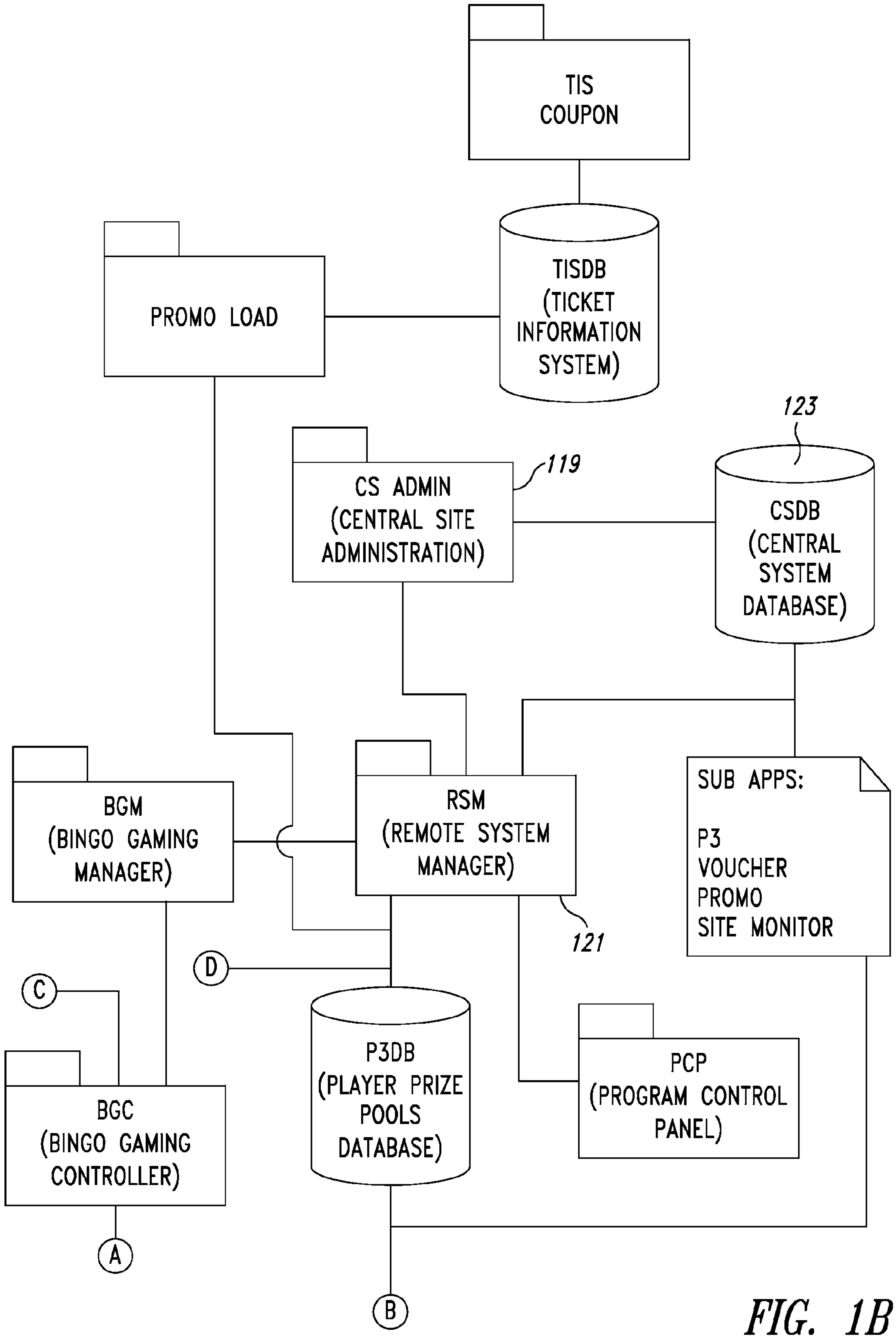

The slot management system 101 may include or interact with a variety of other systems, subsystem and/or servers, as illustrated in FIGS. 1A and 1B. For example, a central site administration system 119, remote systems manager (RSM) 121, both of which may access a central system database 123.

Figure 2A:
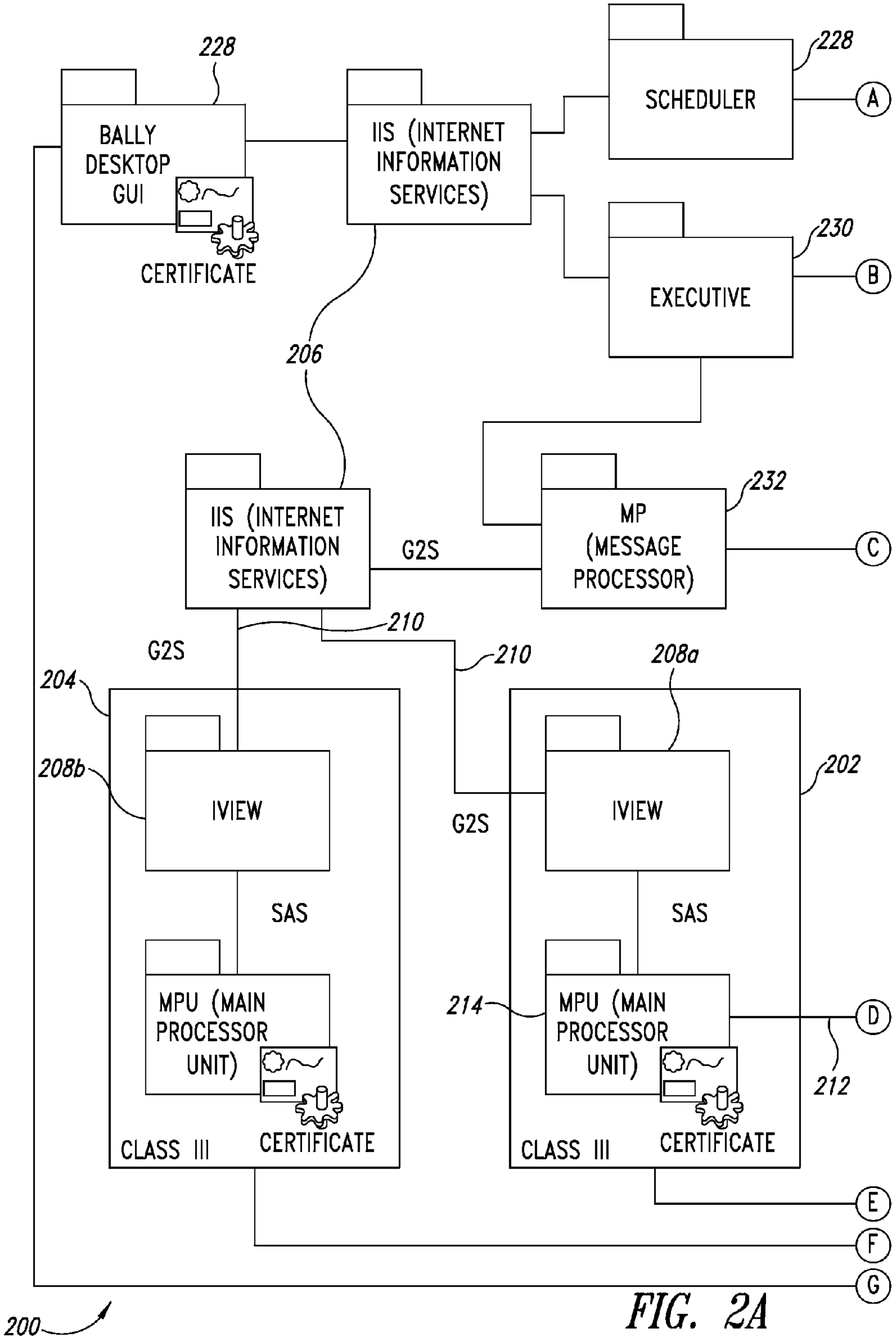
FIGS. 2A and 2B are a block diagram of a transaction server architecture.
Figure 2B:
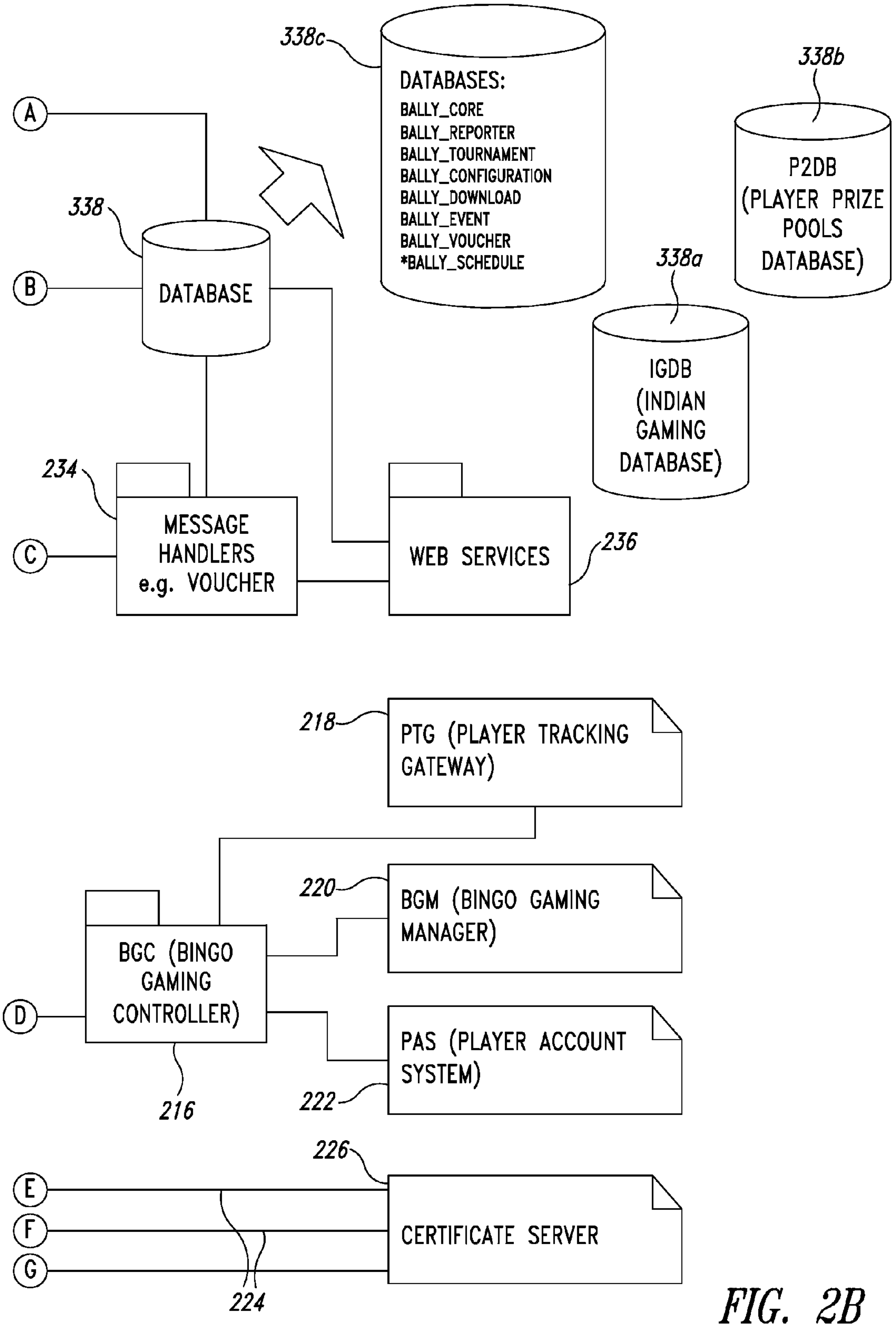
Figure 3A:
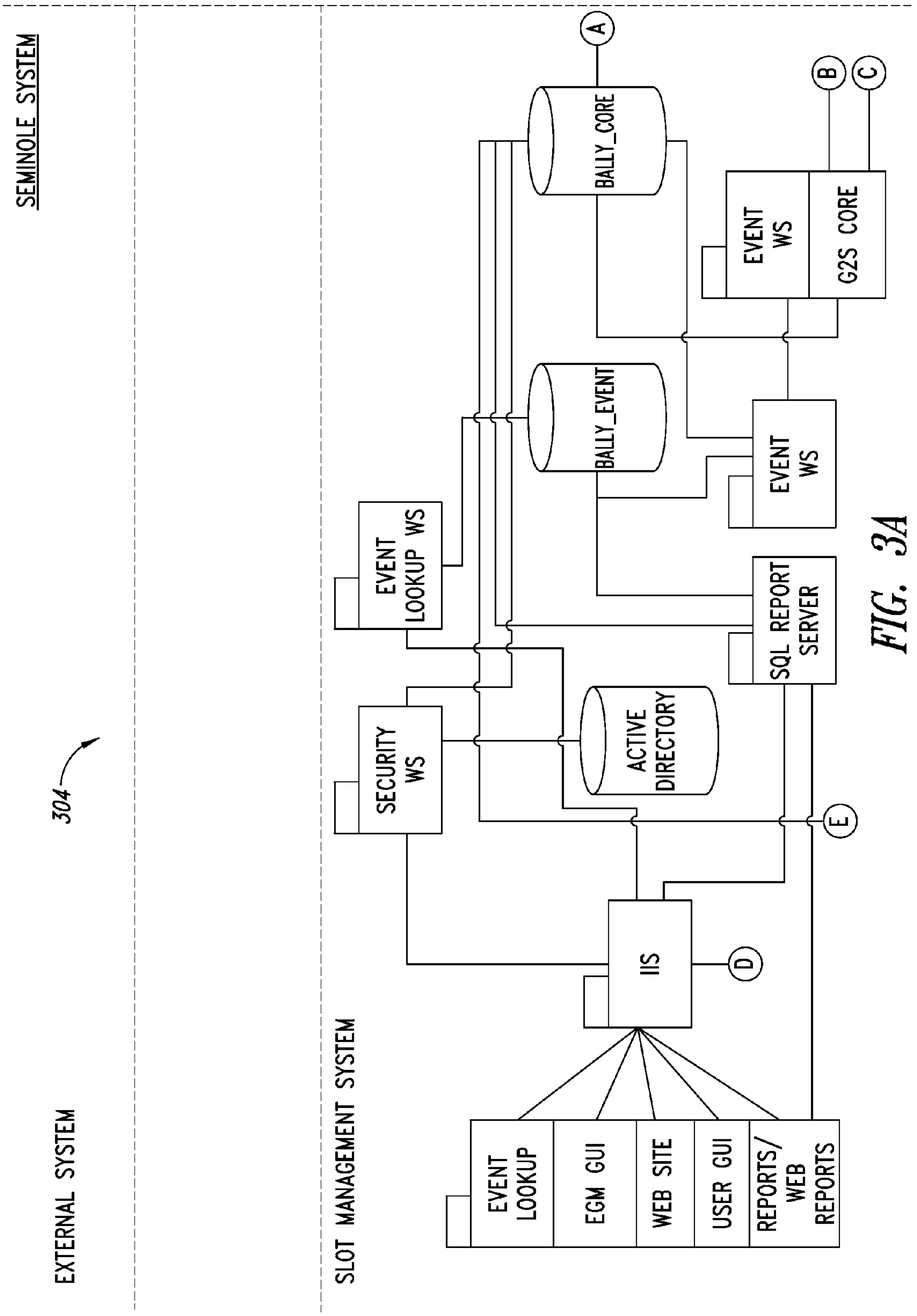
FIGS. 3A-3D are a block diagram of a slot management system architecture according to another illustrated embodiment.
Figure 3B:
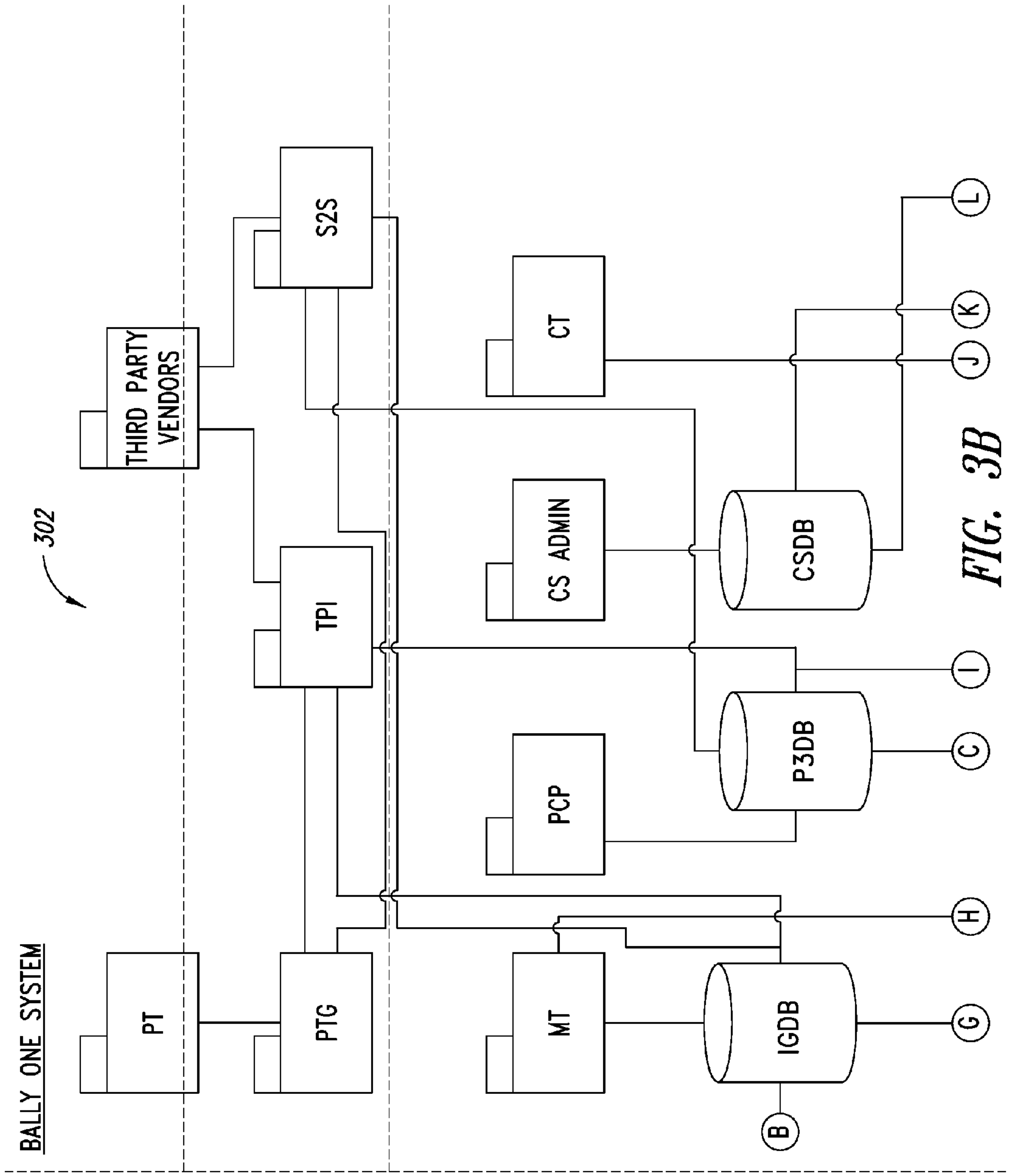
Figure 3C:
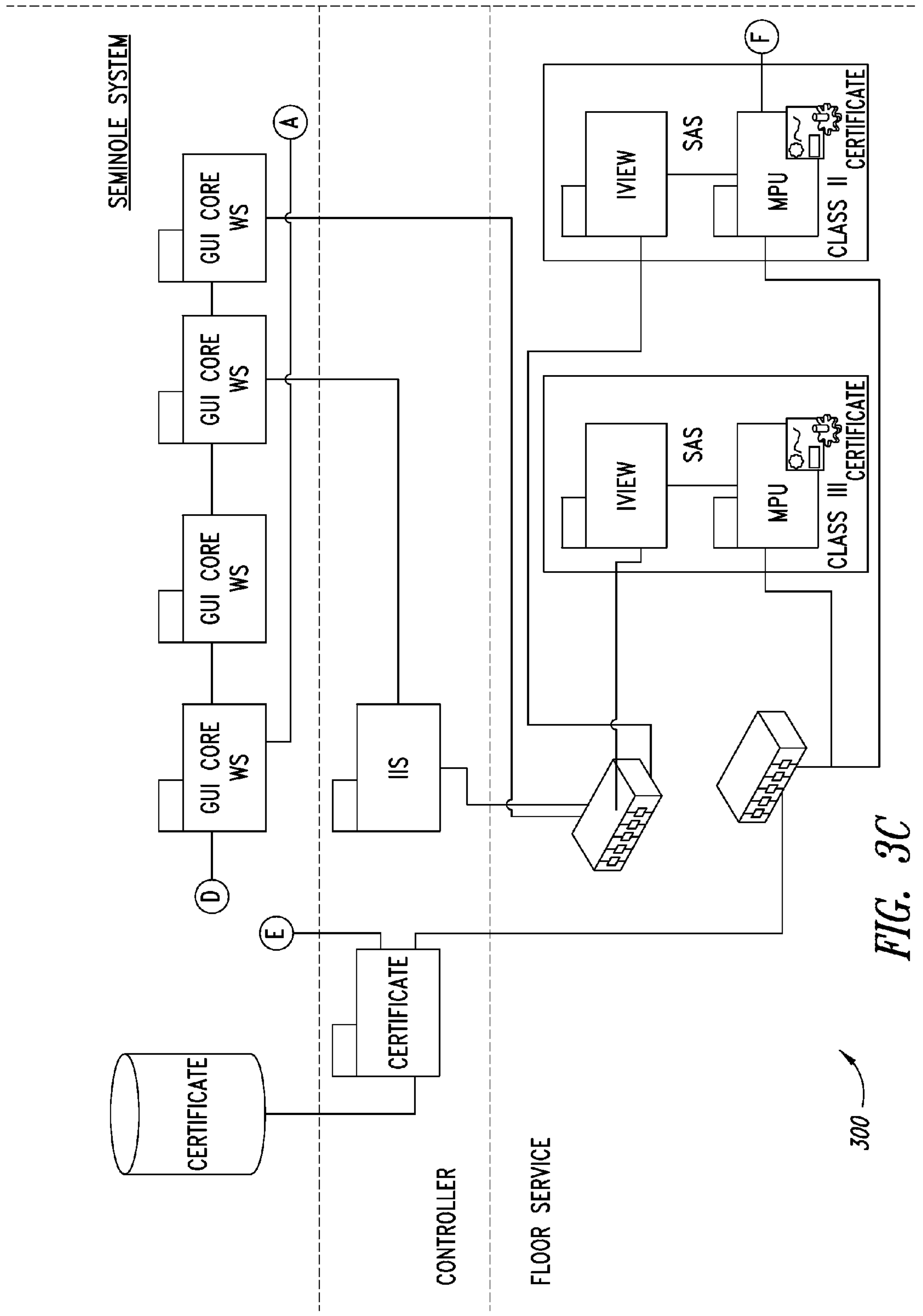
Figure 3D:
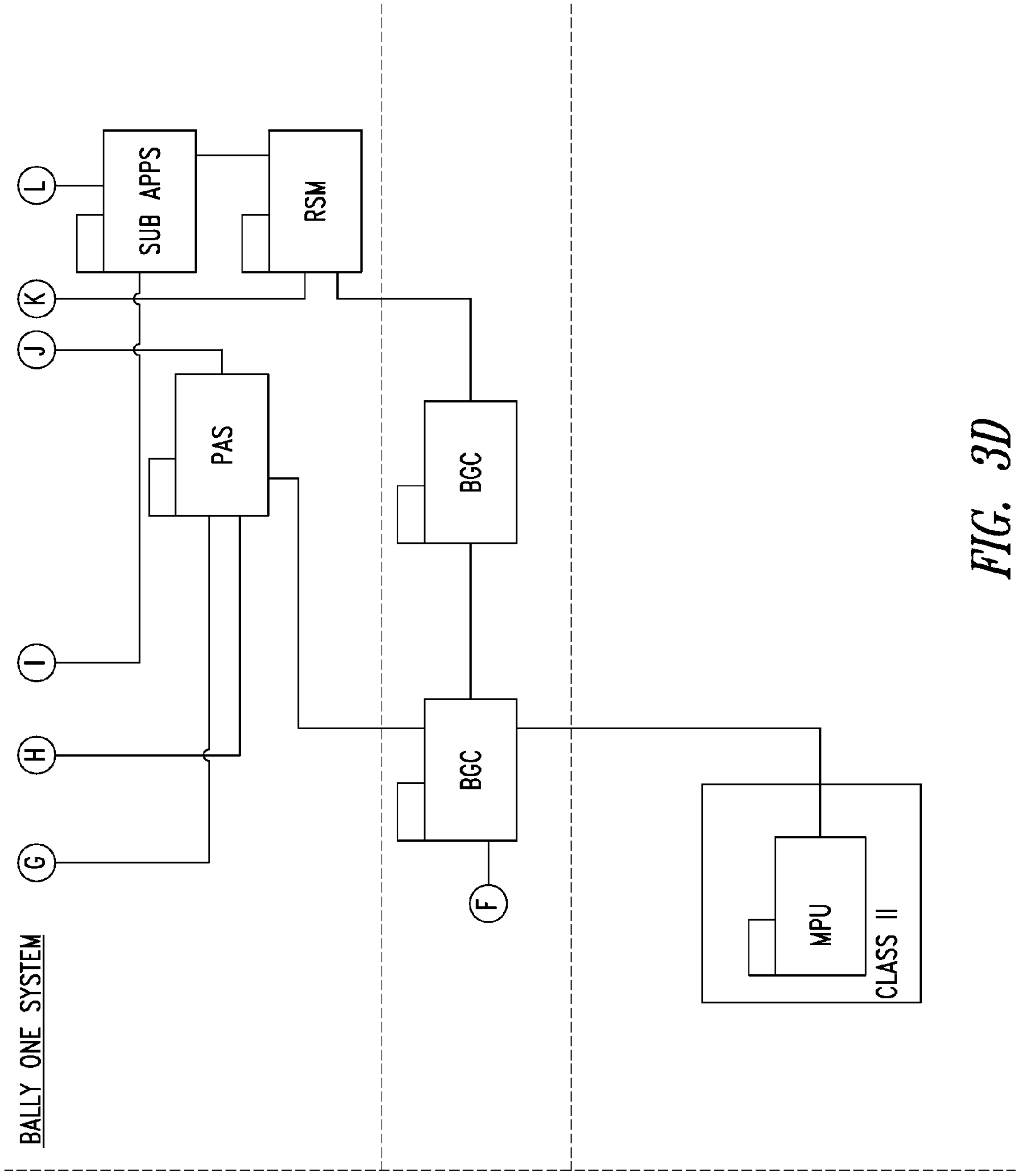

Referring to FIGS. 2A and 2B, an example transaction server architecture 200 is shown that includes connectability of Class II and Class III gaming devices 202, 204, respectively, to Internet Information Services 206 through an iView-type device 208*a*, 208*b* (collectively 208), such as the Bally iView, attached to the respective gaming devices. FIGS. 2A and 2B simply show only one Class II gaming device and only one Class III gaming device as representative of a network of gaming devices that may be connected to the transaction server subsystem through the connecting network 210. For the Class II gaming devices, a second network 212 connection may be utilized between the MPU (Main Processor Unit) 214 to other servers, such as the BGC (Bingo Gaming Controller) 216, PTG (Player Tracking Gateway) 218, BGM (Bingo Gaming Manager) 220, and PAS (Player Account System) 222. Also, another connection 224 may be made between both types of gaming devices and a Certificate Server 226 utilized to authenticate content that may be introduced to the respective gaming devices, such as from the Bally Desktop GUI 228.

The system 200 may include or interact with a variety of other systems, subsystems, and/or servers. The Internet information services system 206 may interact with a scheduler 228, an executive 230, a message processor 232, message handlers 234, and Web services 236. Such systems, subsystems and/or servers may access one or more databases 338, for example a casino database 338*a*, go prize pool database 338*b*, etc. 338*c*.

Referring to FIGS. 3A-3D, an example slot management system architecture 300 is shown that integrates with a legacy slot management system 302 (e.g., Bally One System) integrated with a Class II/III hybrid server subsystem 304 (e.g., Floor System).

Some Architectural Components and Component Characteristics may include:

Web Reporter

The WebReporter client may use SQL 2005 (herein incorporated by reference) and talks to the SQL Reporting Services. This allows a user with any web browser to print out reports for the system. The reports are saved in a database and delivered to the WebReporter via XML using Web Services. Some Web Services may themselves access other Web Services for their data.

Web Browser

Web Browsers may use Internet Explorer, such as IE 6 or later, or any other comparable browser. Microsoft 'Click once' technology may be used to allow smart downloading of client applications. Full-access users may be able to remotely deploy the client to selected users of various systems, while ordinary users will be able to deploy the client to their own system.

Some embodiments may additionally or alternatively include handheld devices with appropriate Web browsers.

Smart Clients

This is the Microsoft name for the clients downloaded using 'Click once' technology. This technology will auto-install .NET Framework on the client system if it is not present and is needed. The Smart Clients may be written in various program languages, such as by example: C, C++, C#.

Smart clients may include: 1) Bally Desktop; 2) Bally Control panel; 3) Tournament Management; 4) Voucher Management; 5) Event Lookup; and 6) Smart Reporter.

Each smart client may have a Helper Wizard, similar to the Microsoft helper wizard or setup wizards, to assist users through the process of supplying the information required by the application or obtaining guidance on the use of the application. Additionally, while the Wizard may have initially accessible information to provide to a user based on prompts, such as a user depressing a button or selecting a menu item; the Wizard may also access stored information that is accessible through the smart client to provide real-time updated information input to a user. An example may be as follows: a user at the Bally Control panel selects a pane that shows the floor plan of slots at a facility and the user selects an optimizing configuration menu item. The Wizard may ask if the user would like an optimized floor configuration based on the statistics stored on the slot management system. If the user wants this information, then the Wizard can access and provide the information to the user. Alternatively, if a user is stuck, the user may ask the Wizard for information concerning an operation or procedure, and the Wizard may provide a menu of potential answers to the query.

Some embodiments may additionally or alternatively include handheld devices with appropriately configured smart clients.

Internet Information Services (IIS)

IIS may use standard HTML and ASP.NET to generate the web pages requested by the GUI front ends. HTML is able to deliver web pages whose content does not alter. ASP.NET is able to deliver web pages whose content can change dynamically in a programmed fashion.

Example Support and Configuration Services utilized by the system may include: 1) Dynamic Host Configuration Protocol (DHCP); 2) Domain Name System (DNS); 3) Lightweight Directory Access Protocol (LDAP); 4) Network Time Protocol (NTP); 5) Internet Information Services (IIS); 6) Public Key Infrastructure (PKI); and 7) Microsoft Message Queuing (MSMQ).

Example Databases may return information based on the results of a stored procedure call. The following databases may be included with slot management system 101: 1) Core; 2) Reporter; 3) Tournament; 4) Configuration; 5) Download; and 6) Event.

With selected embodiments, a scheduling functionality may be incorporated with the system. This functionality may be enabled using a 'Schedule' database accessible by one of the smart clients, such as the Control Panel. Alternatively, the functionality may be enabled using the SQL scheduling subsystem or a Schedule server.

Message Processors

The Message Processors may use MS Message Queue or other conventional technology to receive G2S messages from the EGMs. The received messages, which may contain multiple commands, are then broken down and each command routed to the appropriate Message Handler. The handlers contain the 'business logic' for each command, and use either Web Services or direct calls to stored procedures on the databases to retrieve the requested data.

Figure 4:
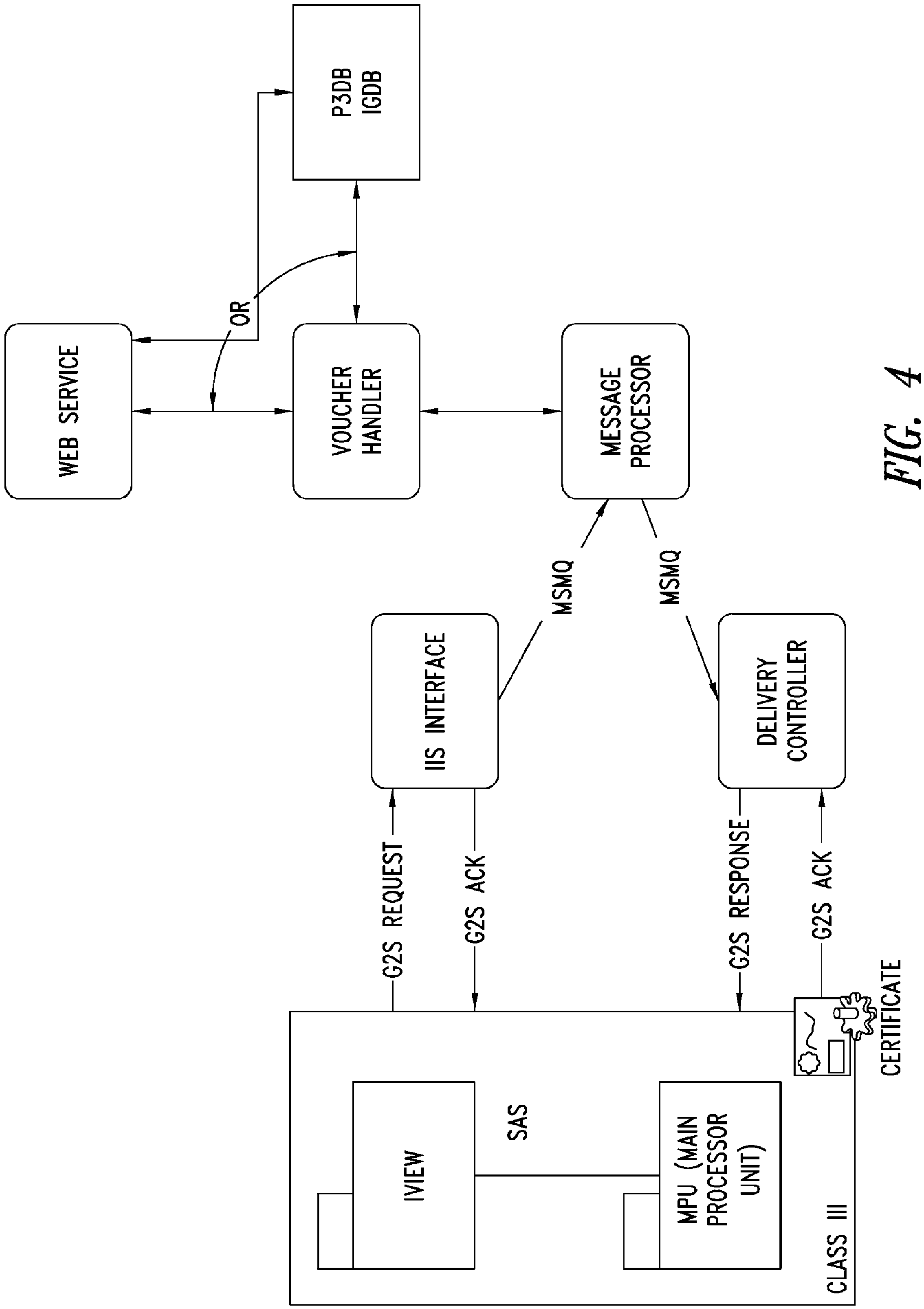
FIG. 4 is a block and flow diagram of a voucher request system according to one illustrated embodiment.

Referring to FIG. 4, an example voucher system process flow is shown connected to and communicating with a class III gaming machine. FIG. 4 illustrates the system handling of a request from an EGM to process a voucher. FIG. 4 is illustrative of the handling of various system requests through various handlers including for example: Event, Hand Pay, Core, Note Acceptor, WAT, Player and Meters handlers.

Figure 5A:
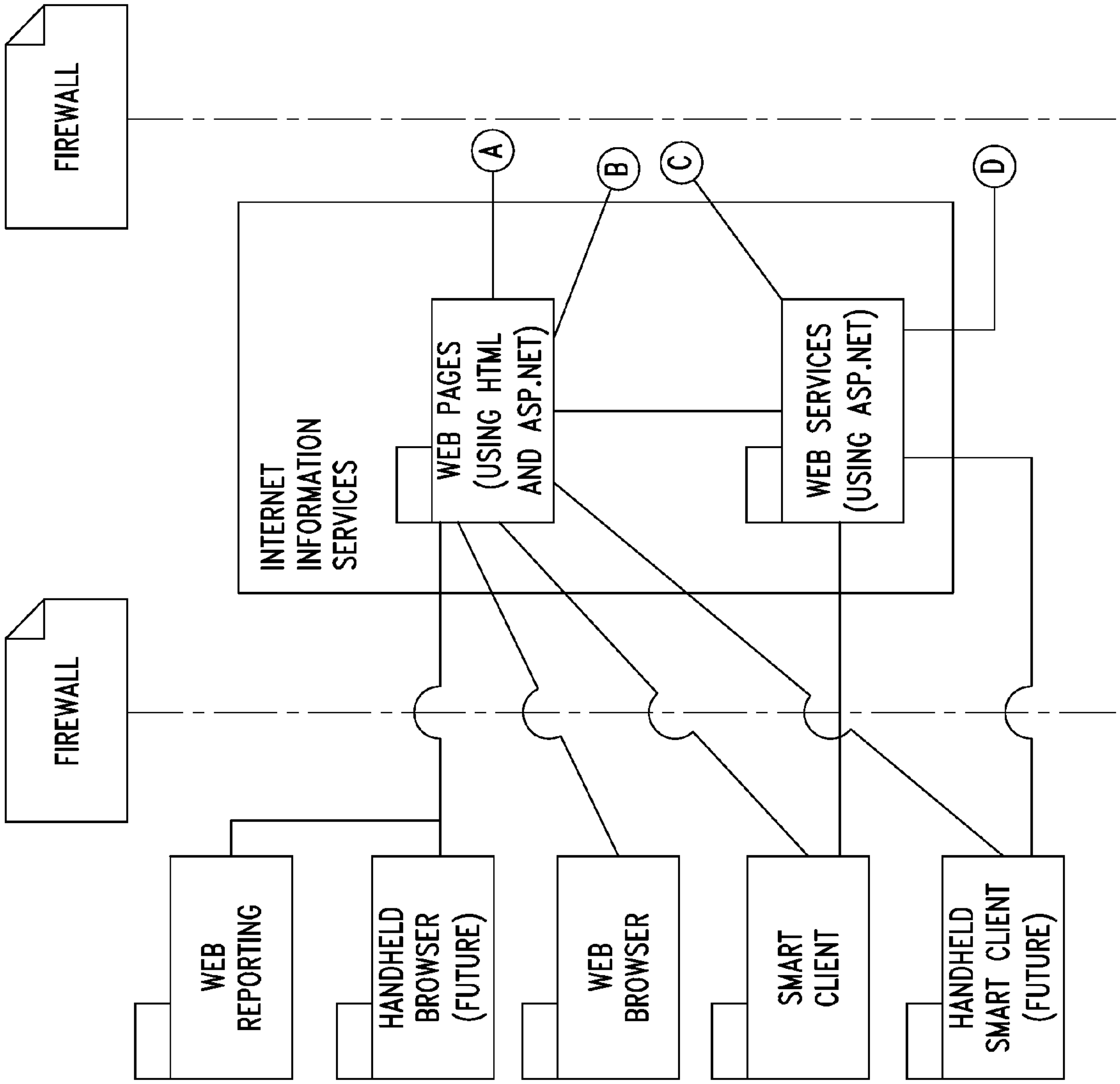
FIGS. 5A and 5B are a functional block diagram showing user interface datapaths.
Figure 5B:
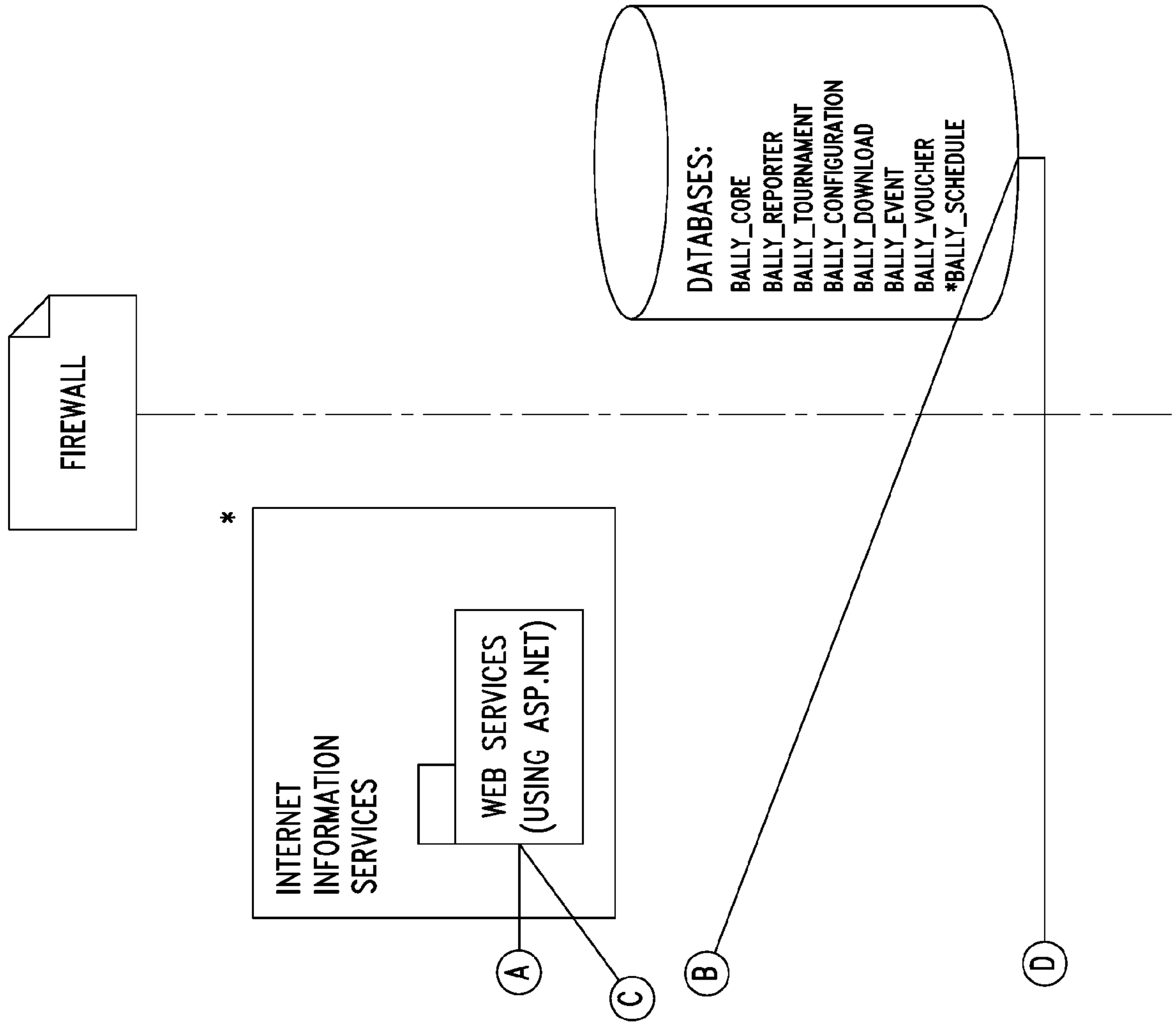

Referring to FIGS. 5A and 5B, an example gaming user interface (GUI) block and flow diagram is shown.

Interfaces

The GUI

Overview

The UI for the new system framework is composed of a Web Site, a set of Smart Client Applications, and the MS Windows operating systems and management tools.

Each application requires a user to log in. Each user will have a set of roles assigned to him or her. Each role has a set of tasks that are enabled for the role. As such, the applications auto configure when a user logs in to enable only the tasks allowed by the user's roles. It is helpful to point out the regulatory roles are included. Even so, we will be providing a dedicated regulator's Smart Client application focused on the task they regularly perform.

Additionally, the two main applications, the Web Site and the Bally Desktop are configured to include only those parts of the system that are deployed at a given installation. For example, if a property does do not have tournaments installed, then tournament areas of the Website and Desktop apps will be hidden.

With few exceptions, when Windows level options must be configured such as DNS, DHCP, or Active Directory, the system will not provide duplicate user interfaces. We will provide help and installation pages to describe how and when to set these items up for our system.

The Website

The Website primarily provides users with the ability to do installations and updates (through Click Once technology), get help, and to configure system level settings. Logs will be kept of any client that auto-updates. The Website may also be used to set up and maintain system meta-data like users, companies and sites. Support for reporting via Web pages is also included, although most users may prefer the Smart Reporter interface. Some manufacturer advertising may also be included. For example, this channel may allow the Website provider to announce new product or product updates, or communicate other messages with the IT staff of a casino operator.

Smart Clients

Depending upon a particular deployment, various smart clients may or may not be used. For instance, if a casino operator does not want download and configuration subsystems, then the control panel can be eliminated. Similarly, if a casino operator does not want the slot management system to manage tournaments, then the tournament manager can be eliminated. Additionally, as new functionality is desired to be implemented on or with the slot management system, then more smart clients may be added. For instance, an accounting smart client may be added with a new accounting module. A smart client may be a Web site deployable application which then runs locally like a traditional Windows application. The smart client may use Web Services to acquire and update system data. Alternatively, the smart client may be completely self-contained when implemented on or with a slot management system.

Desktop

A desktop smart client may be the main framework user interface that will contain much of the functionality needed to operate a gaming floor. The desktop smart client may perform roughly in a similar role as a legacy Management Terminal might provide. As such a user can perform reporting, mine events, lookup vouchers, and other operational tasks. The Desktop may also display Web pages and as such can incorporate any functions of the Website itself.

System Interface Monitor

A system interface monitor smart client application may provide real-time feedback about the health of the system. The system interface monitor smart client may, for example, display live event feeds, leverages charts, graphs and other visual elements to provide a high level view. Limited drill down functionality may be provided to help in the initial stages of isolating and debugging system problems.

Smart Reporter

A smart reporter smart client may provide access to all the systems reports. The reports can be scheduled, viewed, exported, printed, etc. User roles may also be used to restrict access to the various users on a report-by-report basis. In some cases, access may be further restricted to portions of data within a report, for example, a particular site or portion thereof.

Bally Regulator

A regulator smart client may encapsulate all the functionality to support the command and control portions of the regulator's functions. This may include things like verifying system software versions, hash codes and functionality. It includes access to regulatory reports. The regulator smart client may have notifications screens listing items awaiting approval and allows regulators to take action. No modifications to the system, except for these approvals, may be permitted by the Regulator. This software may be run on a dedicated on site computer which may add some machine level roles (or security) protection. The regulator smart client may enable the slot or casino management system to more safely allow remote VPN access to this computer from central regulator's offices.

In the future, we may add the ability through this channel to deliver approved game and system software to sites.

Control Panel (BCP)

This is really not part of the core floor system but may be added as an add-on component if that functionality is required.

The control panel smart client may encapsulate all the functionality to support the command and control portions of the download and configuration features of the slot or casino management system. Downloads and configuration options may be schedulable in advance or be deployable immediately. Notifications, approvals, searches, and reports in these areas may be viewed by a user through a display or printouts or other conventional mode.

The scope of the control panel smart client application may include remote downloads of games and/or reconfiguration of game operating systems on network connected gaming machines. The control panel smart client may also include the ability to perform remote downloads of games and/or reconfiguration of secondary displays, such as a BallyiVIEW, and second game monitors, as well as peripheral software for components in the game machines, for example bill validators and ticket printers.

Referring to FIGS. 5A and 5B, an example slot management system datapath diagram is shown that reflects the data paths and interactions from the user front end through to the backend databases.

An example Tournament Manager may include:

This smart client may encapsulate all the functionality to support the command and control portions or base game tournaments. Tournaments may be designed, run, and reported on remotely through Tournament Manager. For instance, a Download and Configuration request can be sent from Tournament Manager to respective systems that support those features in order to remotely prepare a selected set of EGMs for tournament play.

Example Software Interfaces may include the following G2S classes: 1) G2S Core; 2) Meters class—this talks to the iVIEW; 3) Notes class—this talks to the bill validators; 4) Printer class—this talks to the printer; 5) Hand Pay class; 6) Player class—this talks to the CMP gateway; 7) Voucher class; and 8) WAT class—this talks to the Player Tracking Gateway (PTG).

Example Communication Protocols may include: a) MPU to iVIEW and b) the SAS protocol (hereby incorporated by reference) may be used to communicate between the Main Processor Unit (MPU) and the iVIEW device, for both Class II and III EGMs. For Class III devices this may be the only communication that the MPU has, and may therefore contain Voucher, Meter, Event and Game State information.

For Class II devices, the MPU may have a communication link with the Bingo Gaming Controller (BGC) as well as with the iVIEW. The SAS communications to the iVIEW may carry the Game State; while the communications with the BGC may contain the Voucher, Meter and Event information.

iVIEW IIS and Message Processor

The iVIEW (or comparable) devices may communicate G2S (hereby incorporated by reference to GSA publications) to the Internet Information Services (IIS) processor. In turn, IIS may also communicate G2S to the Message Processor (MP). Another protocol that may be utilized is the BOB protocol (hereby incorporated by reference to GSA publications).

GUI to Databases

The GUI client applications may be connected to a semi-private network. All client applications may use HTTPS to communicate securely with the IIS Server, using the SOAP protocol. In the event of a self-contained implementation of the casino and/or slot management network system, then less secure protocols may be utilized without significantly impairing secure communications. Further security measures may also be implemented such as:

Make use of Active Directory Services

Assign users to roles, and define role-based tasks

Assign access based on machine ID

Use certificates

Use passwords with expiry times

Employ user session time-outs

Queues, Jobs, Scheduler and Executive

The Scheduler

There may be many jobs that need to occur within the system at predetermined times. These jobs may be managed by the Scheduler. The Scheduler may track and manage job priorities by utilizing a set of rules. One way for the Scheduler to manage jobs is by scanning the iVIEW database for jobs that need scheduling, and find 'the next job to be scheduled'. If nothing else occurs in the system, this job will be processed when its time comes. After processing this job, the Scheduler will re-scan the iVIEW database looking for the next job to be scheduled, and will then process this job when its time comes, and so on.

While this cycle is occurring, if a new scheduled job is added to the system, not only will it be added to the iVIEW database, but the Scheduler will also be informed. This allows the Scheduler to check the database to ascertain whether or not the newly added job should occur before the job that is currently due to process next.

Jobs

Jobs may be defined as an XML structure, and may be read by the Scheduler. Inside the structure will be all the information required to define the job and its scheduling. For example, what the job is, (run an executable), when the job should occur (7 pm), and how frequently it should occur (daily, weekly etc). One other piece of information will also be present: which message queue this job should be added to. When the time comes to action this job, the Scheduler will add the XML definition of the task to the specified message queue.

Message Queues

Once a job is placed onto a message queue, it may be read, interpreted, and forwarded, for instance by the Host computer, to be processed by an application that may be part of the Executive or Scheduler or BCP. The job application may identify the type of job and may classify the job according to a set of rules including identifying the adequacy of permissions by the message sender, security or priority level of the job, and file access for each and all jobs. Some of these jobs, such as running an executable file, or updating a value in a database may be enabled for automatic processing. Jobs that need to interact with the message processors will invoke the Executive.

The Executive

The Executive's role may include communication with the message processors, and through them, to the EGMs. The Executive may handle any scheduled job that needs to interact with an EGM, for example, resetting a unit.

Security

The Security component may have an expanded function in the new gaming machine management system. It may encompass all areas of the system, covering human access, machine access and network access. Some fundamental issues that may be resolved by the Security component include authentication, authorization and verification. An example product that may be utilized by or as part of the Security component to resolve authorization, providing user access rights, user roles and various other security features may be Windows 2003 Active Directory Services (hereby incorporated by reference). It may also be possible to use alternate security repository and management services other than Active Directory. This is possible through the use of web service used to authenticate and validate users which abstracts the end data consumer from the actual security management system in place.

Authentication may be provided through the use of certificates. The authentication procedures for EGM-to-System interaction may be accomplished through the use of the BOB (best-of-breed) protocol, G2S protocol, or some other comparable protocol. (the BOB and G2S protocols are published by GSA and hereby incorporated by reference)

Additional security measures that may be implemented include: user roles; user permissions; machine permissions; digital certificates; user passwords; and/or application passwords.

Figure 6A:
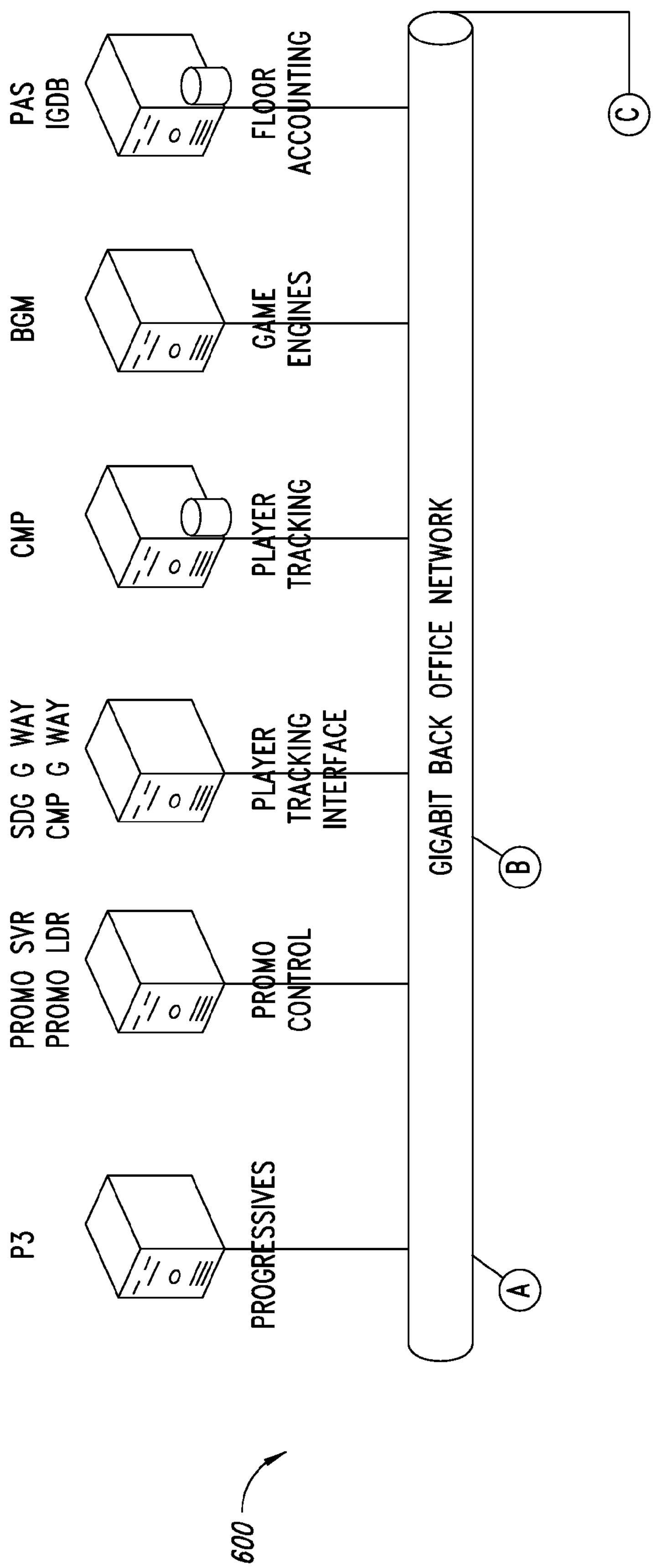
FIGS. 6A and 6B are a block diagram of a slot management system according to yet another illustrated embodiment.
Figure 6B:
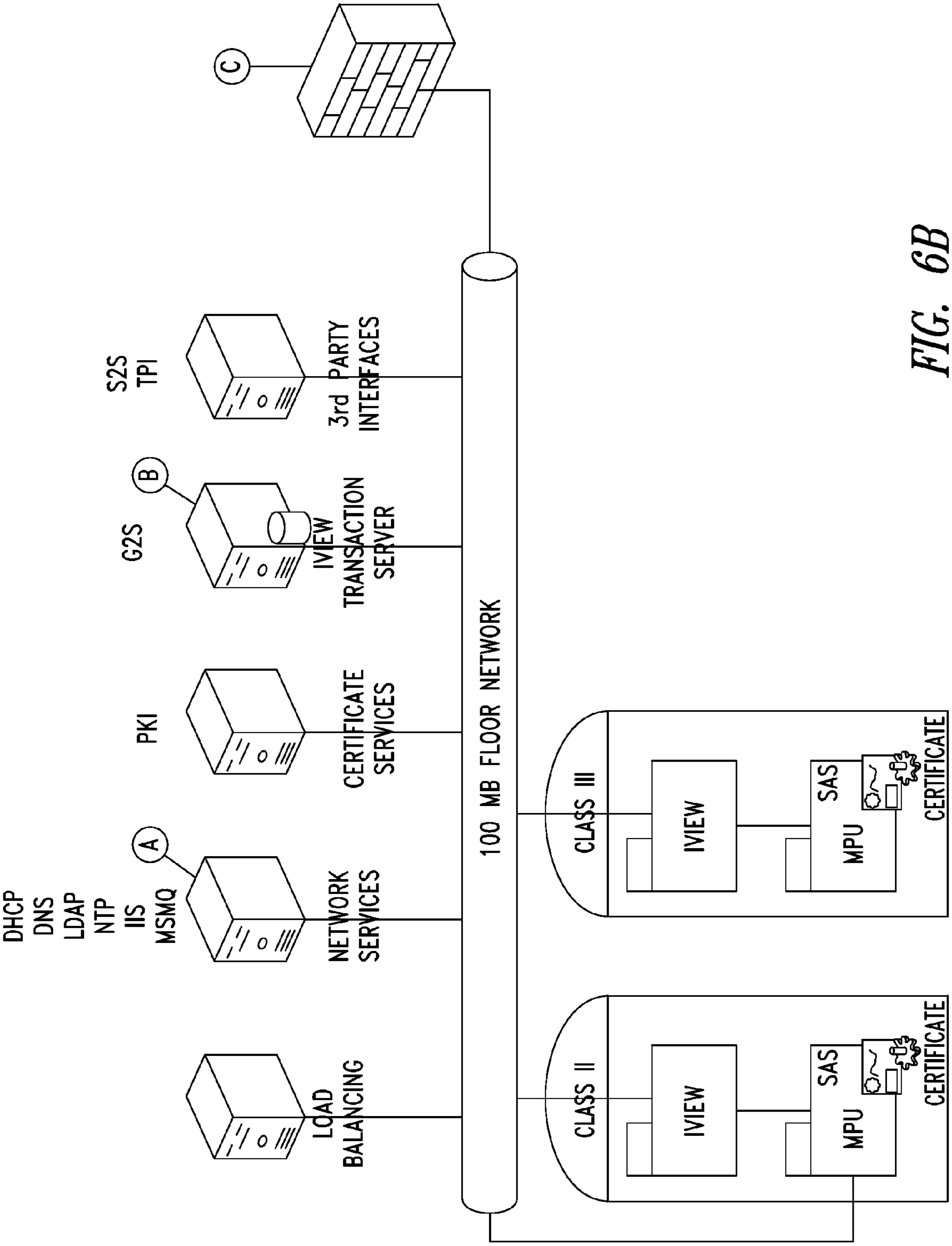

FIGS. 6A and 6B show a slot management system 600 according to another illustrated embodiment.

Reports

Reports may be accessible from the MT, the PCP, and/or the Smart Reporter. The slot management system may be implemented to restrict specified reports to particular components. Some example reports include:

System Performance Reports

Report Usage Report

Transaction Activity Report

User Reports

User listing with role and group

Password to Expire within 15 days (this is a system parameter)

Role with Capabilities

User Activity Report

Assignment Reports

Current Assignments by EGM/Package

Current Assignments by EGM/Module

Assignments created/saved/approved by User

Assignment Schedule

Assignment History

Job Reports

Job Status History by Assignment

Job Status History by EGM

Failed Job History

Audit Reports

User Activity Report

EGM Activity Report
Activity Report (for regulators)
Module Inventory report
List of Revoked Packages/Outdated Package
Detailed EGM Job Report
Failed EGM Job Report
EGM Reports
EGM Device Inventory report
EGM Event
EGM Meter (raw meters) (denormalized meter data)
Performance Reports (max. size=xx lines per page for portrait reports
EGM Daily Financial (audited data)
EGM Hourly Delta (denormalized meter data)
EGM Daily Delta (un-audited data) (denormalized meter data)
EGM Listing
EGM Media Report
EGM Combo Report
EGM Configuration
EGM Collection Report In addition to any regular or scheduled reports, users, depending upon their authorization level, may create their own reports and populate them with data from the databases. For example, this may include data on: 1) Meters; 2) Vouchers; 3) Events; 4) WAT; 5) Player Information.

To reduce security and data integrity risks, a number of constraints may be applied, for example: a) No modification of the data allowed; b) Restrict access to warehouse databases; and c) No access to live databases.

Figure 7:
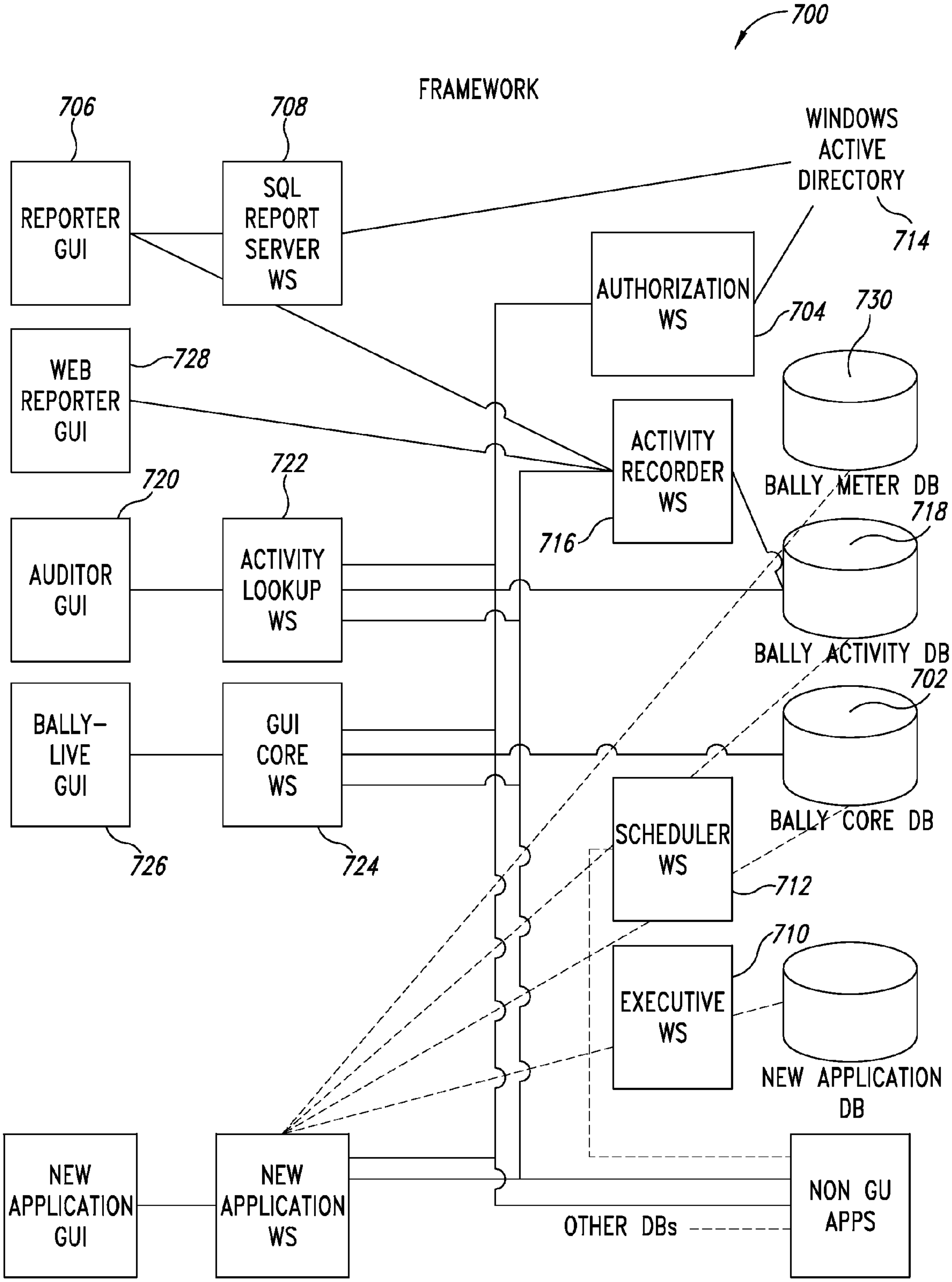
FIG. 7 is a block diagram of slot management system software architecture according to one illustrated embodiment.

FIG. 7 shows a slot management system software framework according to yet a further embodiment.

The Slot Management System Framework may include a suite of programs and tools which provide smooth and consistent transitions to web-services for a range of gaming system applications. The Framework may simplify support across varying applications. The Framework elements provide common development and run-time resources for implementing a gaming system application using Web-based technologies.

The Framework is designed to simplify the task of developing applications that are to be Web based components in a gaming system that has an semi-open architecture, such as through the integration of Web-based systems. For instance, in one embodiment, a Core database 702 may be required to be used as the source of system configuration and Electronic Gaming Machine (EGM) configuration data. Keeping this same information in other forms may require synchronization and reconciliation and make an application more susceptible to error and increase total development workload. The Framework may manage these system conflicts. Similarly, an authorization Web-service component 704 may be used in order to reduce the complexity of user management.

Example Development Tools for modifying, reducing, or expanding the casino and/or slot management system may include:

Code Generator (CG)

This tool may be used to generate code for a DLL which is a proxy for a Web-service and code for the web-service itself. By example, using as input an XML schema (for function calls, parameters and return values), the CG may generate the code for the underlying communication and verification of data.

Data Access Layer (DAL)

DAL may create an object from a database schema. The application will then have access to the object submitted to the database or returned from the database and will be insulated from the database access mechanisms.

A report server builder Web-service component 706 stores report generation files in SQL report server 708.

Exemplary run-time components may, for example, include: an executive Web-service component 710, a scheduler Web-service component 712, an authorization Web-service component 704, an activity recorder Web-service component 716.

The executive Web-service component 710 may comprise a utility which may control the privileges for a system component to send unsolicited messages to an EGM. The executive Web-service component takes care of determining which system element of the distributed control mechanisms currently have control of the EGM and coordinates the delivery of the message to the addressed EGM. The executive Web-service component may be applicable to applications which have an interactive relationship with EGMs.

The scheduler Web-service component 712 may send an XML package (via HTTP web service) to a specified receiver at a specified one-time or recurring time. The scheduler Web-service component 712 may allow easy effectuation of scheduled jobs.

The authorization Web-service component 704 may be used to maintain users in groups that have predetermined authorization to application functions. This function may be integrated into a Windows® Active Directory 714. Function access security may be controlled on an individual user/password basis AND on a terminal location basis (who, where). Groups and authorizations may be established with AZMAN. An application load an "off-web proxy" that makes the authorization calls to the authorizing Web-service component. Having applications adhere to this mechanism may provide consistency and system maintainability from a user-maintenance point of view.

The activity recorder Web-service component 716 may be a Web-service that may record various types of system activity in an Activity database 718. This allows the records to be used later by other applications for a variety of purposes (audit, troubleshooting, floor performance optimization, etc.). Types of activity that may be defined include: 1) RecordEgmActivity; 2) RecordJackpotActivity (includes handpays); 3) RecordPlayerActivity; 4) RecordServerActivity; 5) RecordUserActivity; 6) RecordVoucherActivity; 7) RegisterActivity; 8) RegisterEGM; 9) RegisterManufacturer; 10 RegisterPlayer; 11) RegisterSite; 12) RegisterUser; and 13) RegisterWorkstation.

An auditor component 720 may be a user interface application incorporated with a workstation that may provide a set of functions for examining certain content of the Activity database 718.

An activity lookup component 722 may be a user-interface support Web-service component accessible at one of the casino or slot management system workstations, such as for example the MT or BCP. The activity lookup component 722 may provide a set of calls to access information previously stored by Activity Recorder Web-service component 716 in the Activity database 718, for example, preparatory to calling Windows reporting services. The activity lookup Web-service component 722 may be utilized by auditor component 720. Although the calls provided are specific to the needs of Auditor, other user-interfaces may utilize the service if their needs are appropriate. Alternatively, activity lookup Web-service service component 722 may serve as a model for creating their own supporting web service.

A graphical user interface (GUI) core Web-service component 724 may be a user-interface support Web-service that may retrieve and manipulate data in the core database 702. Although the calls provided are specific to the needs of that GUI (user-interface) application, other GUIs can utilize the service if their needs are appropriate. Alternatively, this service may serve as a model for creating their own supporting web service.

A live GUI application 726 may use the GUI core Web-service component 724 to inspect and maintain the core database 702.

The reporter component 706 may take the form of a click-once GUI application which may execute reports from SQL reporting services.

A Web Reporter component 728 may be similar in some respects to the reporter component 706, but operates in a Web environment.

The SQL report server Web-service component 708 employs SQL, a Microsoft product (hereby incorporated by reference) and, which may incorporate various parameterized (where clause, order clause) prepared reports used by the live reporter component 726.

Additional reports may be generated and stored using a report server builder application.

Example Databases may include: the core; a database 702, a SQL database which may contain data defining detailed information on EGMs, system configuration and site data.

As noted previously, the activity database 718 may be used as the repository for all information logged by ActivityRecorder. Note that some records in this database may be linked, for example with companion records in a meter database 730. For example, when an EGM event (door open) is received the associated meter record is stored in the meter database 730. The paired records will be associated by a common GUID.

The meter database 730 contains device meter records received from EGMs. As referenced above, records can be associated with records in Activity as well as other components.

Each web service may have a proxy DLL. Each proxy DLL may have a matching messages DLL. ConnectionPoints.DLL may allow for lookup of DNS and LDAP entries specific to the framework system (such as all connection strings, all web services).

Figure 8A:
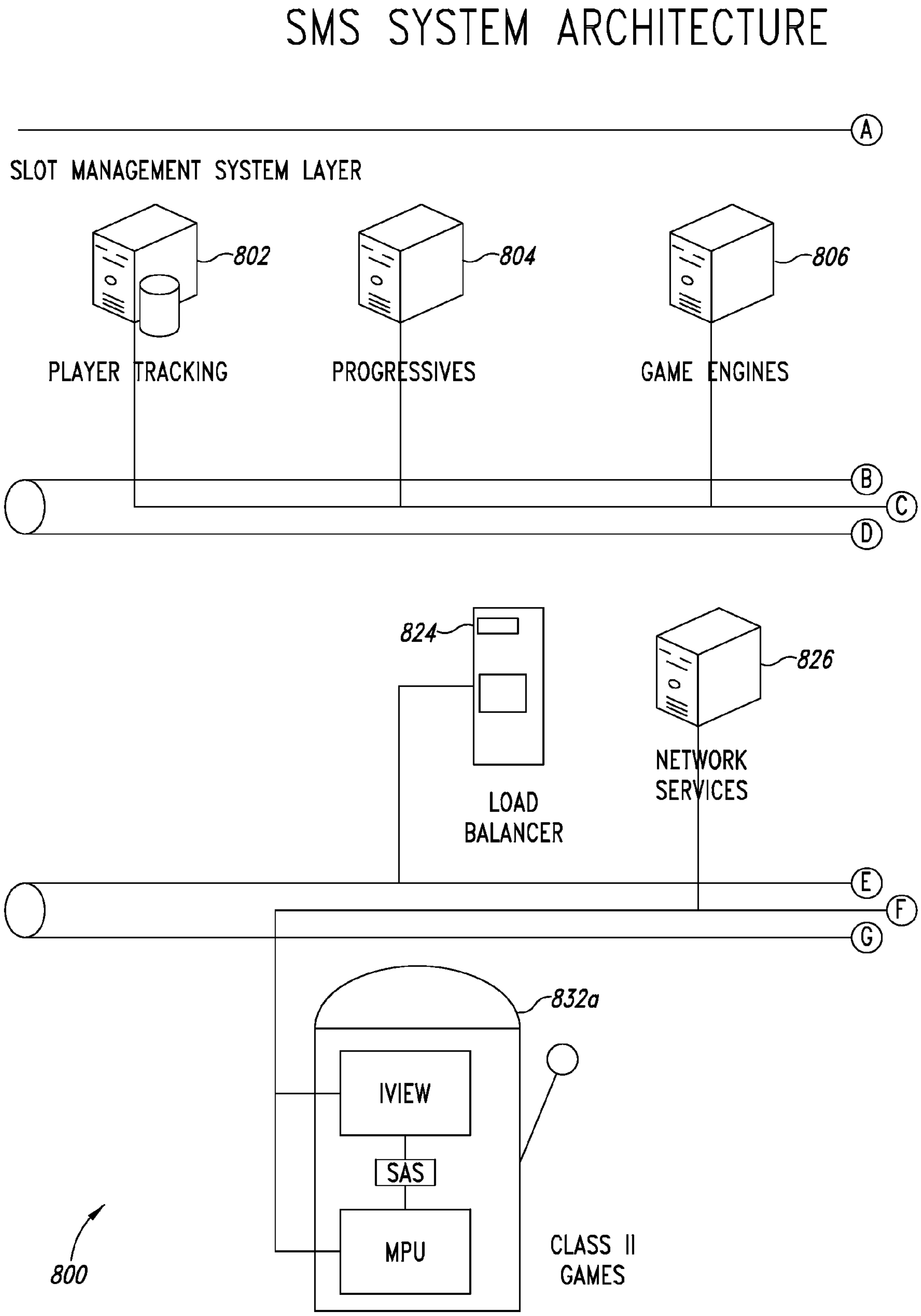
FIGS. 8A-8C are a schematic diagram of a system architecture according to one illustrated embodiment.
Figure 8B:
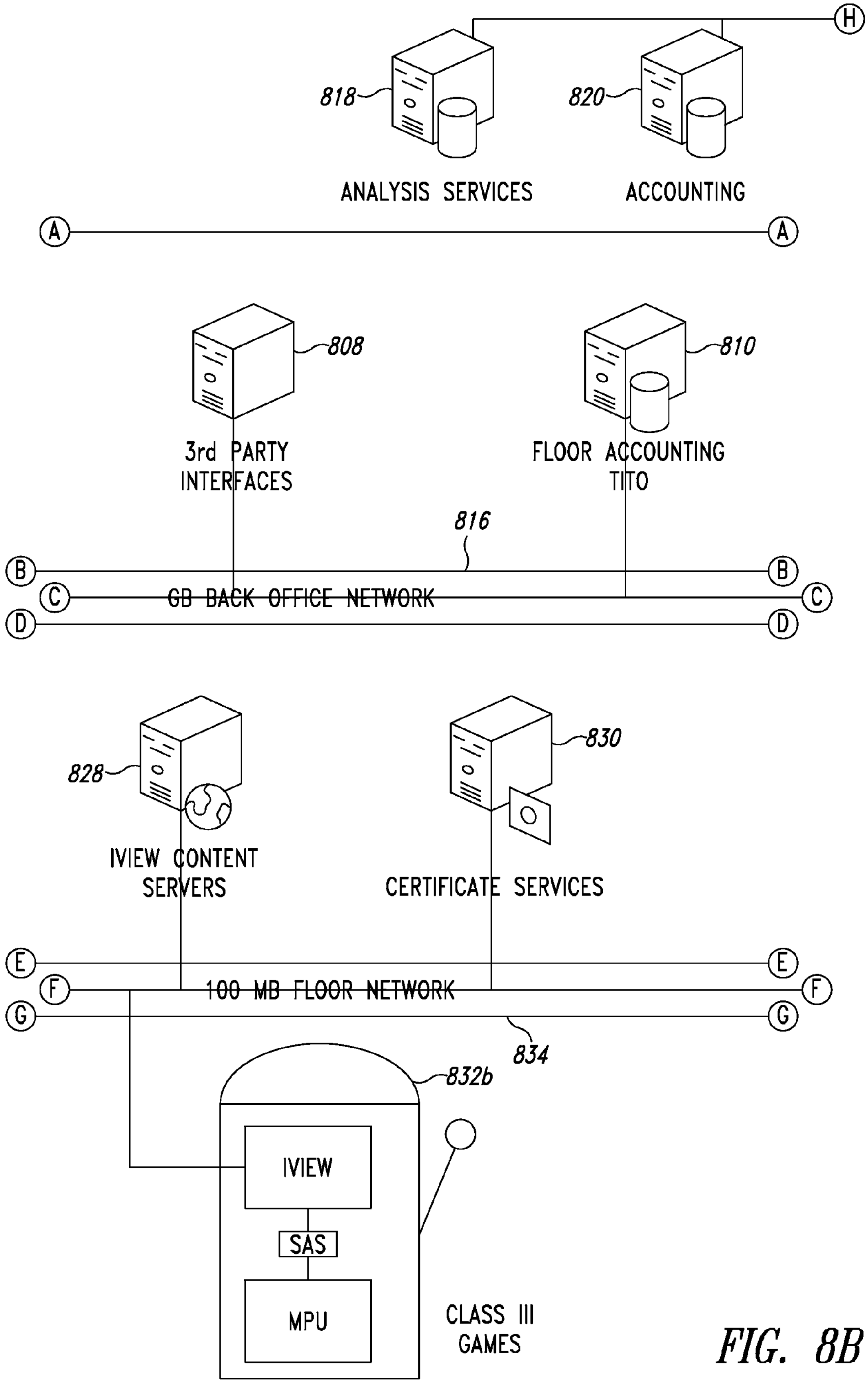
Figure 8C:
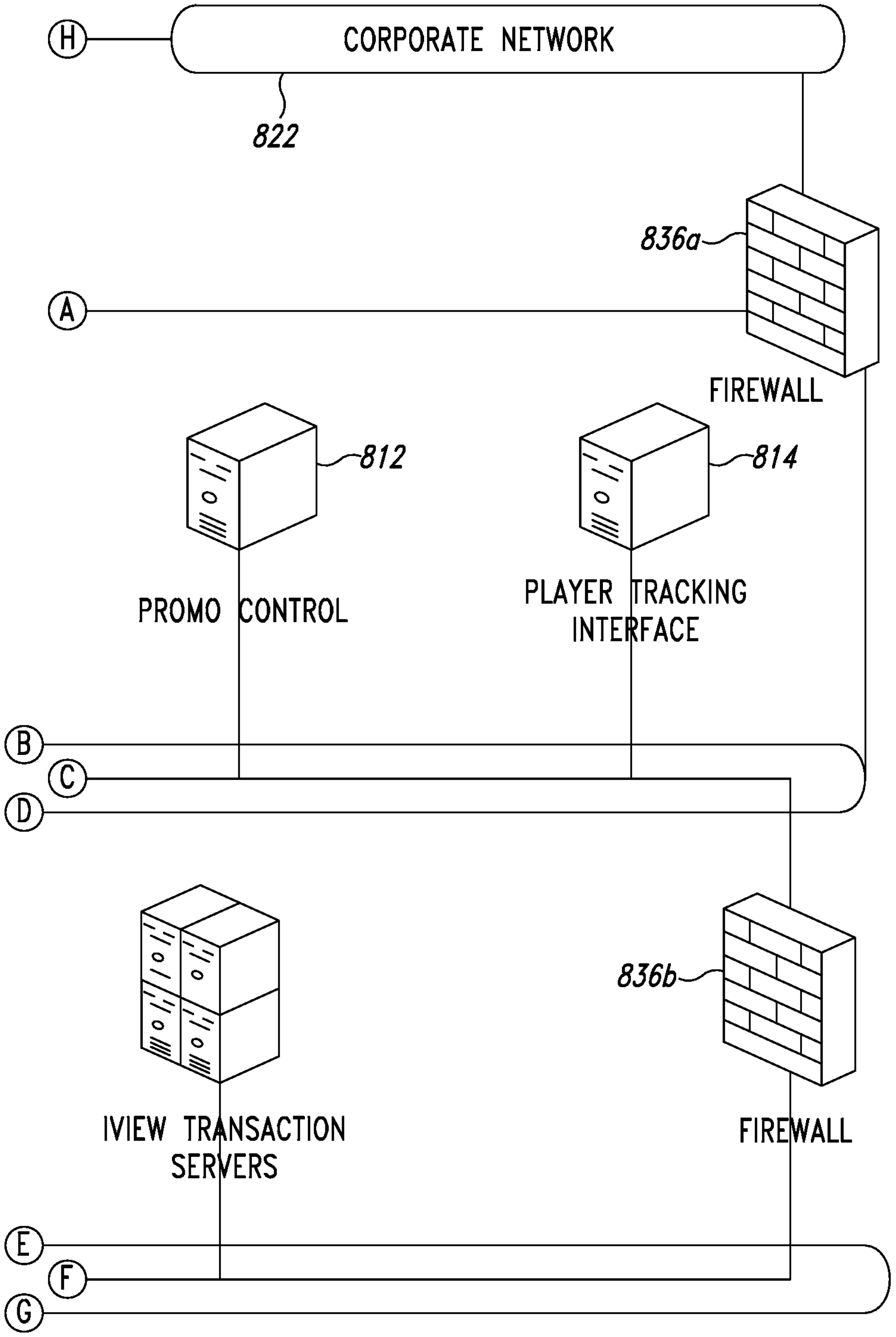

FIGS. 8A-8C show a system architecture according to one illustrated embodiment.

A system 800 includes one or more player tracking servers 802, progressive bonus servers 804, game engines 806, third party interfaces 808, floor accounting servers 810, promotional controllers 812, and player tracking interfaces 814 coupled to one another by a back office network 816. The system 800 may include one or more analysis services 818 and accounting servers 820 coupled by a corporate network 822. The system 800 may also include one or more load balancers 824, network services 826, content servers 828, and/or certificate servers 830, coupled to gaming machines 832*a*, 832*b* by a floor network 834. The gaming machines 832*a*, 832*b* may take the form of Class II and/or Class III gaming machines. The system may include suitable firewalls 836*a*, 836*b* between the various networks.

Figure 9:
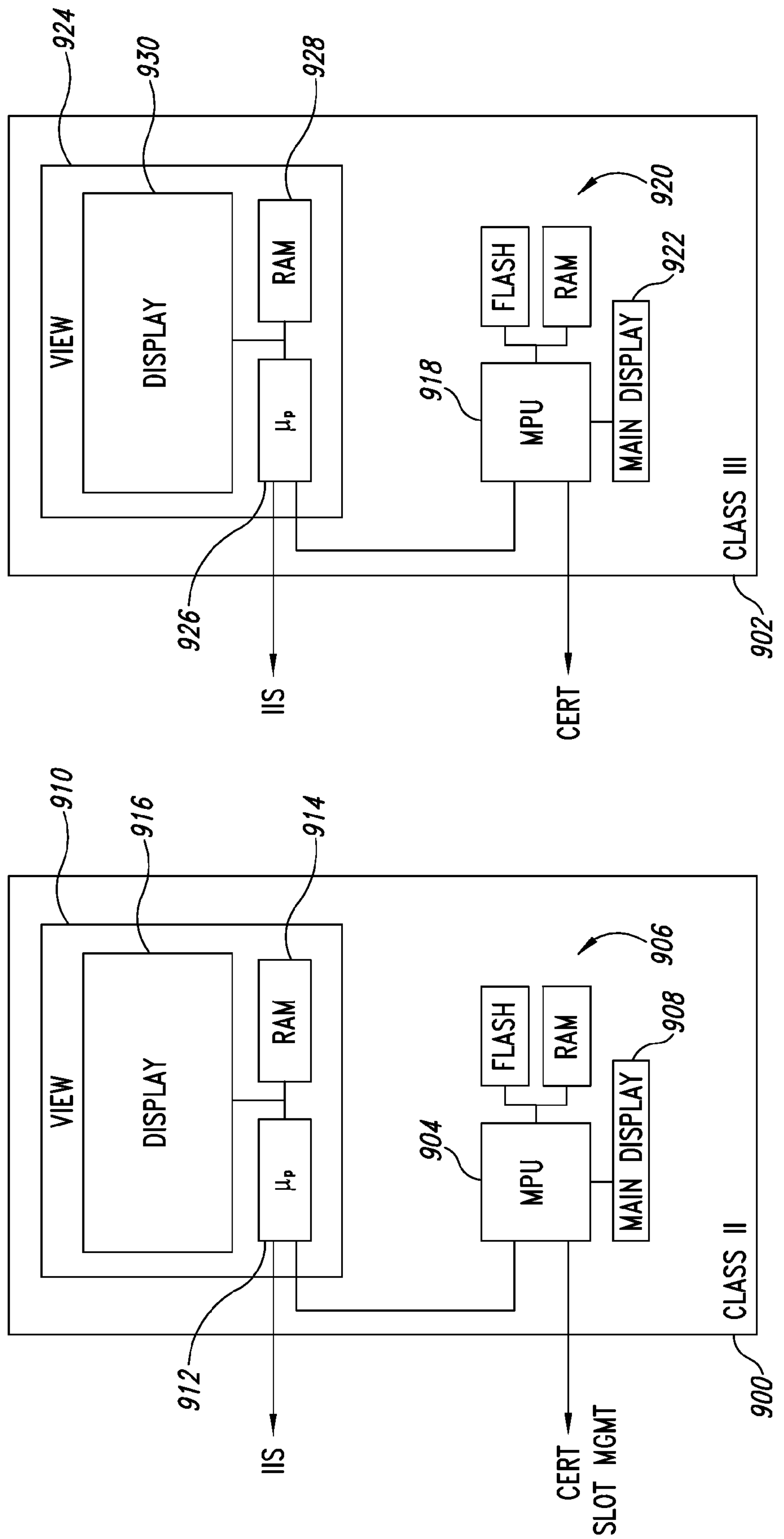
FIG. 9 show a Class II gaming machine and a Class III gaming machine according to one illustrated embodiment.

FIG. 9 show a Class II gaming machine 900 and a Class III gaming machine 902 according to one illustrated embodiment.

The Class II gaming machine 900 includes a main or gaming processor 904, main memory 906 (e.g., ROM, Flash, RAM), and main display 908. The main or gaming processor 904, main memory 906 and main display 908 may be conventional, and may be dedicated to running and presenting the game, and thus have operational limitations such as speed, display area, display resolution, and refresh rate. The Class II gaming machine 900 may also include an embedded user interface 910. The embedded user interface 910 may, for example take the form of a Bally iView interface. The embedded user interface 910 may include an embedded processor 912, embedded memory 914 (e.g., ROM, Flash, RAM), and embedded display 916. The embedded display 916 may be a display that is more suitable to displaying information to the user, for example Web pages, video or animation than the main display 908. For example, the embedded display 916 may have a larger area and or operate at a higher resolution and/or refresh rate than the main display 908.

The Class III gaming machine 902 includes a main or gaming processor 918, main memory 920 (e.g., ROM, Flash, RAM), and main display 922. The main or gaming processor 918, main memory 920, and main display 922 may be conventional, and may be dedicated to running and presenting the game, and thus have operational limitations such as speed, display area, display resolution, and refresh rate. The Class III gaming machine 902 may also include an embedded user interface 924. The embedded user interface 924 may, for example take the form of a Bally iView interface. The embedded user interface 924 may include an embedded processor 926, embedded memory 928 (e.g., ROM, Flash, RAM), and embedded display 930. The embedded display 930 may be a display that is more suitable to displaying information to the user, for example Web pages, video or animation than the main display 922. For example, the embedded display 930 may have a larger area and or operate at a higher resolution and/or refresh rate than the main display 922.

The embedded user interface 910, 924 provides an additional user interface over that of the gaming machine 900, 902. Such may, for example, increase user excitement by providing a richer gaming experience. The additional embedded user interface 910, 924 may provide enhanced player satisfaction and excitement, as well as improved gaming device reliability, interactivity, flexibility, security, and accountability. The embedded user interface 910, 924 is sometimes referred to herein as "additional" in that the embedded user interface 910, 924 is separate or distinct from the main gaming screen 908, 922 or other gaming presentation. Further, the user interface 910, 924 is sometimes referred to herein as "embedded" in that the user interface 910, 924 includes its own processor in some embodiments. Additionally, the embedded display 916, 930, which is referred to herein commonly as a Web content capable display screen, may also (or alternatively) be an animation capable display screen, a Web page embedded display screen, or a multimedia display screen.

The embedded processor 912, 926 employs an internal operating system and communicates with the main gaming processor 904, 918, preferably via the main game monitoring unit (e.g., main processor, main memory and main display). The embedded processor 912, 926 reads incoming data, translates the data into a Web authoring language, and maps the data to the embedded Web page embedded display 916, 930. The display 916, 930 presents Web page information to a user, thereby increasing user excitement by providing a richer gaming experience. The main game monitoring unit monitors the information that is input through the embedded user interface 910, 924. This provides a dramatic improvement over traditional system components that have been used as in the past to provide user information. The embedded user interface 910, 924 communicates with the game monitoring unit in the same manner as the previous system components communicated with the game monitoring unit.

The additional embedded user interface 910, 924 provides the advanced functionality of a Web page embedded display.

Such functionality includes, by way of example only, and not by way of limitation, the ability to display animation, multimedia, and other Web-type content. The additional embedded user interface 910, 924 enables presentation of additional information (e.g., enhanced player information) to a player (or potential player) through the embedded Web page embedded display 916, 930 in an exciting, eye-catching format, while not interfering with the normal gaming processes being displayed on the main gaming display 908, 922. Further, the additional embedded user interface 910, 924 does not interfere with the normal gaming hardware in the gaming machine 900, 902, but rather is easily integrated into a gaming machine 900, 902.

In situations involving multiple gaming machine (or gaming component) manufacturers, an additional embedded user interface 910, 924 can be incorporated into a gaming machine (either originally or by retrofitting) without requiring access to the game logic or other gaming systems that might be proprietary and inaccessible with a gaming machine 900, 902 from another gaming manufacturer. Thus, the additional embedded user interface 910, 924, which includes a Web page embedded display 916, 930 for presenting supplementary information to a player, is incorporated into a gaming machine 900, 902 in addition to the standard or main gaming display 908, 922 typically found in a gaming machine 900, 902. The additional embedded user interface 910, 924 may also be incorporated into a gaming machine 900, 922 that utilizes a gaming region (e.g., a reel-spinner) instead of a standard gaming display. This supplemental information may include general gaming information, player-specific information, player excitement and interest captivation content, advertising content (targeted or otherwise), and the like. Further, in other embodiments, the additional embedded user interface 910, 924 may have the ability to interact with the game logic of the main gaming processor 904, 918, preferably via the game monitoring unit, and thus, provide further functionality, such as bonus games, system games, and/or the ability to incorporate awards, promotional offers, or gifts from the Web page embedded display 916, 930. Moreover, the Web page embedded display 916, 930 may display supplemental information in an "attract mode" when there is no game play occurring. Also the embedded gaming processor 904, 918 may use the embedded Web page embedded display 916, 930 to present casino employees with a Web-based dialogue to facilitate gaming machine configuration and event investigation activities without disturbing the main gaming display/region 908, 922.

In some embodiments, the additional embedded user interface 910, 924 may be used to make casino services more accessible and friendly to casino patrons. In one preferred embodiment, the additional embedded user interface 910, 924 is designed to interface with the hardware configuration of game platforms currently employed in an existing gaming communication systems network, thus decreasing implementation costs for the casino. A standard gaming network interface to the systems network, such as a Mastercom system, includes a multi-drop bus method of communicating to a keypad and display. The Mastercom system is available from Bally Manufacturing, and is described in U.S. Pat. No. 5,429,361 to Raven et al. incorporated herein by reference. One such currently utilized bus is an EPI (Enhanced Player Interface), which uses an industry standard I2C bus and signaling.

In one preferred embodiment, the additional embedded user interface 910, 924 is used to replace/upgrade an EPI. Preferably, the additional embedded user interface 910, 924 replaces the EPI of the gaming machine in a "plug and play" manner. In other words, the old EPI can be unplugged and the new additional embedded user interface 910, 924 can simply be plugged into the I2C bus of the main game monitoring unit in the gaming machine 900, 902. The user interface 910, 924 utilizes the currently employed industry standard I2C bus and signaling without requiring any further modification. The embedded processor 912, 926 of the additional embedded user interface 910, 924 reads incoming I2C data (content), translates the data into a Web authoring language (e.g., HTML, DHTML, XML, MACROMEDIA FLASH), and maps the data to the Web page embedded display 916, 930. In this manner, the previous I2C data messages, which were typically presented on a 2-line, 20 character VF display, are automatically transformed by the additional embedded user interface 910, 924 into an attention grabbing, animated (multimedia) Web page style format. This results in enhanced player satisfaction and excitement with extremely minimal retrofitting requirements.

Since, in one preferred embodiment, the additional embedded user interface 910, 924 utilizes I2C hardware and signaling, this enables the user interface 910, 924 to speak and understand the I2C protocol message set, and thus, communicate directly with the gaming processor of the gaming machine 900, 902 (or other similarly networked devices) in the same fashion in which the gaming processor previously communicated with the EPI. Accordingly, in some embodiments, the functionality of the previously utilized hardware (e.g., the EPI) can be replaced or augmented and thus substantially upgraded with the integration of the additional embedded user interface 910, 924 into the gaming machine 900, 902. As such, the limitations placed upon the main gaming processor 904, 918 by the low function external hardware of such system components (e.g., a keypad and a 2-line, 20 characterVF display) may be eliminated.

As stated above, in one embodiment, the incoming data received by the additional embedded user interface 910, 924 is I2C signaling protocol; however, in other embodiments other serial communication protocols (or electronic communication format) may be utilized. Preferably, the embedded processor 912, 926 communicates with the main gaming processor 904, 918 via the game monitoring unit, and/or other connected devices, over an I2C bus (or over another serial communications bus in embodiments that utilize another protocol). The Web page embedded display 916, 930 of the additional embedded user interface 910, 924 is preferably a color-graphic touch screen display. Preferably, the embedded processor 912, 926 is at least a 32-bit processor. A preferred embodiment utilizes a 32-bit processor because cryptographic techniques, such as SHA-1 (or better) and DSA algorithms, are written and operate natively on a 32-bit system. Additionally, the MICROSOFT® WINDOWS® environment, which is utilized in some preferred embodiments of the claimed invention, is also 32-bit. Further, the internal operating system of the additional embedded user interface 910, 924 may be adapted or customized to match the specific communication bus hardware used by the devices in the gaming machine 900, 902 to which the internal operating system communicates.

Preferably, the additional embedded user interface 910, 924 is an embedded computer board that, in addition to the embedded processor 912, 926 and the Web page embedded display 916, 930, further includes a removable COMPACT FLASH card 75 (or other memory storage device), as shown in FIG. 1, and a network adapter port. Content and feature updates to the additional embedded user interface 910, 924 are accomplished by physically swapping out the COMPACT FLASH card 75 (or other memory storage device). Thus, in order to retrieve data from the additional embedded user interface 910, 924, the data is accessed by physically removing and reading the COMPACT FLASH card 75. In other embodiments, as described below, updates may be provided by direct or peer-to-peer downloading over a network.

In one embodiment, the internal operating system utilized by the embedded processor 912, 926 of the additional embedded user interface 910, 924 is WINDOWS® CE version 4.2 (or higher). Preferably, the additional embedded user interface 910, 924 is built upon a PXA255-based board developed by the Kontron Corporation. Additionally, in an embodiment of the additional embedded user interface 910, 924, the browser control for the Web page embedded display 916, 930 is MICROSOFT® INTERNET EXPLORER® 6.0 (or higher), which is shipped standard with WINDOWS® CE 4.2, a preferred internal operating system for the embedded processor 912, 926.

One embodiment of the additional embedded user interface 910, 924 also provides a mechanism for inputting system information into, and retrieving system information from, the game machine 900, 902. As stated above, the additional embedded user interface 910, 924 preferably uses industry standard I2C hardware and signaling. The I2C protocol has multi-master capabilities, i.e., is capable of participating as both a slave and as a master. The additional embedded user interface 910, 924 enables system information (such as information input by a player into a Web page embedded display 916, 930) to be sent from the game machine 900, 902 to a slot system network (or to another destination location). Likewise, the additional embedded user interface 910, 924 also enables the system information (such as display messages) to be sent from the systems network (or from another source location) to the game machine 900, 902 for viewing by the player through the Web page embedded display 916, 930.

In one embodiment, information can also be input by a user into the Web page embedded display 916, 930 of the user interface 910, 924. The Web page embedded display 916, 930 of the user interface 910, 924 employs a virtual keypad. Further, the user interface 910, 924 uses a keypad dictionary that allows a user to be able to enter a vastly greater amount of information than was previously possible using a 12-digit VF keypad. For example, the virtual key on the touch screen that is displayed by the browser is pressed by a user. This calls the Keypad object by calling its Dispatch interface with a string that identifies which virtual key was pressed. The Keypad object looks up the string in the Dictionary object which has been loaded at initialization time with a set of keys to return when that string is passed to it. When it retrieves this set of zero or more key characters, it passes them to the GMU by calling the interface exposed by the object.

Typically, a network interface (or equivalent system) is used to control the flow of funds used with the gaming machine 900, 902 within a particular casino. By utilizing the additional embedded user interface 910, 924, the gaming network interface can be instructed to move funds between players' accounts and gaming devices by merely touching the Web page embedded display 916, 930. In addition, many other more sophisticated commands and instructions may be provided. Thus, the additional embedded user interface 910, 924 improves the player and casino employee interface to the gaming machine 900, 902, directly at the gaming device itself.

In one embodiment, the Web page embedded display 916, 930 of the additional embedded user interface 910, 924 enables a player to be shown player messages in an animated, multimedia, Web content style environment. These messages would previously have been displayed in a significantly more mundane format on a separate display device (e.g., a 2-line VF display device). In some embodiments, touch screen button icons in the Web page embedded display 916, 930 are used by the player to navigate between windows in Web page embedded display 916, 930 and allow access to system functions such as cashless withdraw, balance requests, system requests, points redemption, and the like. In other embodiments, the Web page embedded display 916, 930 utilizes various other data input techniques commonly known in the art, instead of the touch screen data entry. Thus, implementation of the additional embedded user interface 910, 924 is an efficient, highly beneficial, and substantial upgrade to a gaming machine 900, 902 that greatly increases the functionality over what was previously possible using an EPI.

In one embodiment, text data messages are translated into Web page navigation requests by the embedded processor 912, 926 and then displayed on the Web page embedded display 916, 930. Script languages, such as JAVA SCRIPT and VB SCRIPT, are also utilized for some of the Web pages. Preferably, the additional embedded user interface 910, 924 emulates the 12-digit keypad and the 2×20 VF display on the Web page embedded display 916, 930, which has touch screen capabilities. In this embodiment, commands that were previously displayed on the 2×20 VF display are matched to a corresponding URL and a browser is used to render the page on the Web page embedded display 916, 930. The Web pages displayed contain touch-screen keys that effectively emulate hardware keys.

With reference to FIGS. 6A and 6B, in one embodiment, a dictionary URL approach is used for translating the data messages into Web page information. In this manner, data messages are "looked up" in a dictionary data file where they can be redirected to an attractive URL. The embedded processor 912, 926 responds to requests on the I2C bus that were intended for the conventional player interface (EPI) VF display. The Web page embedded display 916, 930 is not a passive display device like traditional PC monitors, but rather the embedded display 916, 930 must respond to commands with text type responses. These requests include initialization requests, status requests, and display requests. As each text data message to be displayed is passed into the embedded processor 912, 926, the embedded processor 912, 926 calls a URL Dictionary to look up a URL with which to replace the text data message. Once the substitution is complete, the embedded processor 912, 926 instructs the Web page embedded display 916, 930 to present (or navigate to) the appropriate Web page. Such is discussed in detail in U.S. patent application publication No. 2007/0082737.

Accordingly, a URL Dictionary component is used to map a text string, sent from the embedded processor 912, 926 and intended for the display on the 2×20 VF display, to a URL that can be used to display a much more visually enhanced graphical representation of the same message. Thus, the URL Dictionary component contains a listing of the possible text messages to be supported that could be sent from the embedded processor 912, 926, and a mapping to a set of the desired eye-catching Web content to be displayed on the Web page embedded display 916, 930. In this event that a message is not in the URL Dictionary, such a message is mapping to a page that substitutes for the 2-line mode.

In some of the embodiments described above, the embedded processor 912, 926 of the additional embedded user interface 910, 924 reads incoming I2C data messages, translates the I2C data messages into a Web authoring language (e.g., HTML, DHTML, XML, MACROMEDIA FLASH), and maps the newly translated Web page data message to the Web page embedded display 916, 930. Additionally, the additional embedded user interface 910, 924 can also read incoming data messages that are already in a Web authoring language (e.g., HTML, DHTML, XML, MACROMEDIA FLASH), and map this Web page data to the Web page embedded display 916, 930. Further, and highly advantageously, one embodiment also allows casinos that are using the additional embedded user interface 910, 924 to design and use their own content, thereby giving the casinos the ability to decide what the Web page presented on the Web page embedded display 916, 930 of the user interface 910, 924 will look like.

Content may be locally downloaded. Specifically, in one embodiment, the content is updated through a physical USB (or other connection) that is used to download the new content. In one embodiment, the data on the COMPACT FLASH card can be accessed by connecting a separate computer to the network adapter port of the additional embedded user interface 910, 924. This embodiment allows updating the contents of the operating system, changing the operating system itself, and receiving data from the COMPACT FLASH card. Physical removal of the COMPACT FLASH card is also still be an option for update and inspection of files on the additional embedded user interface 910, 924.

In one embodiment, a portable computer is used to store and publish data content to the COMPACT FLASH card on the additional embedded user interface 910, 924, as well as to receiving data from the COMPACT FLASH card on the additional embedded user interface. In this embodiment, all content on the additional embedded user interface 910, 924 is authenticated as if it were a gaming machine.

In another embodiment, a network adapter port is run on the embedded computer board of the user interface 910, 924. This embodiment also includes a boot loader. Further, in this embodiment, the portable computer (described above) includes components for use in uploading data to, and downloading data from, the COMPACT FLASH card on the additional embedded user interface 910, 924. Specifically, the components that run on the portable computer are for moving new data content to the additional embedded user interface 910, 924, and for validation and verification of the data content that is on the additional embedded user interface. Preferably, all data that is used to update the COMPACT FLASH card moves to or from the additional embedded user interface 910, 924 over the single built in network adapter port on the board.

Prior to the advent of the additional embedded user interface 910, 924, gaming regulators would have been unwilling to allow casino operators to design their own content. However, due to the cryptographic technology implemented by the embedded processor 912, 926 in the additional embedded user interface 910, 924, a certification process is provided with sufficient security for gaming regulators to allow casino operators to design their own content. Specifically, in one embodiment, the certification process offered ensures authentication and non-repudiation of the casino operator designed Web content. The certification process may further ensures auditability and traceability. Various cryptographic technologies, such as authentication and non-repudiation (described herein below), are utilized in various embodiments, to provide sufficient security for gaming regulators to allow casino operators to design their own content.

In one embodiment, this certification process is used to certify "signed content" (created by the casino owners) in the same manner that a "signed program" is certified. Preferably, PKI (Public Key Infrastructure) is utilized in the certification process. PKI is a system of digital certificates, Certificate Authorities, and other registration authorities that verify authenticity and validity. In one embodiment, a "new tier" or second PKI is created that is rooted in the primary PKI and that leverages the capabilities of the certificate (e.g., a X.509 certificate) that allow for limited access. Thus, this embodiment allows the attributes within the certificate are used to provide "levels" of code access and acceptance in the gaming industry.

In one embodiment, the content is protected by digital signature verification using DSA (Digital Signature Algorithm) or RSA (Rivest-Shamir-Adleman) technology. In this regard, the content is preferably protected using digital signature verification so that any unauthorized changes are easily identifiable. A digital signature is the digital equivalent of a handwritten signature in that it binds an individual's identity to a piece of information. A digital signature scheme typically consists of a signature creation algorithm and an associated verification algorithm. The digital signature creation algorithm is used to produce a digital signature. The digital signature verification algorithm is used to verify that a digital signature is authentic (i.e., that it was indeed created by the specified entity). In another embodiment, the content is protected using other suitable technology.

In one embodiment, a Secure Hash Function-1 (SHA-1) is used to compute a 160-bit hash value from the data content or firmware contents. This 160-bit hash value, which is also called an abbreviated bit string, is then processed to create a signature of the game data using a one-way, private signature key technique, called Digital Signature Algorithm (DSA). The DSA uses a private key of a private key/public key pair, and randomly or pseudo-randomly generated integers, to produce a 320-bit signature of the 160-bit hash value of the data content or firmware contents. This signature is stored in the database in addition to the identification number. In other embodiments, higher level Secure Hash Functions are used, such as SHA-256 or SHA-512.

Another embodiment utilizes a Message Authentication Code (MAC). A MAC is a specific type of message digest in which a secret key is included as part of the fingerprint. Whereas a normal digest consists of a hash (data), the MAC consists of a hash (key+data). Thus, a MAC is a bit string that is a function of both data (either plaintext or ciphertext) and a secret key. A MAC is attached to data in order to allow data authentication. Further, a MAC may be used to simultaneously verify both the data integrity and the authenticity of a message. Typically, a MAC is a one-way hash function that takes as input both a symmetric key and some data. A symmetric-key algorithm is an algorithm for cryptography that uses the same cryptographic key to encrypt and decrypt the message.

A MAC can be generated faster than using digital signature verification technology; however, a MAC is not as robust as digital signature verification technology. Thus, when speed of processing is critical the use of a MAC provides an advantage, because it can be created and stored more rapidly than digital signature verification technology.

In one embodiment, the authentication technique utilized is a BKEY (electronic key) device. A BKEY is an electronic identifier that is tied to a particular individual. In this manner, any adding, accessing, or modification of content that is made using a BKEY for authentication is linked to the specific individual to which that BKEY is associated. Accordingly, an audit trail is thereby established for regulators and/or other entities that require this kind of data or system authentication.

Another embodiment of the verification system utilizes "component bindings" for verification using cryptographic security. In component binding, some components come equipped with unalterable serial numbers. Additionally, components such as Web content or the game cabinet may also be given another random identification number by the owner.

Other components in the system, such as the CMOS memory in the motherboard, the hard drive, and the non-volatile RAM, are also issued random identification numbers. When all or some of these numbers are secured together collectively in a grouping, this protected grouping is referred to as a "binding." Each component of the machine contains its portion of the binding.

In one such embodiment, every critical log entry made to the content is signed with a Hashed Message Authorization Code (HMAC) that is based on the entry itself, and on the individual binding codes. In this manner, the security produced by the bindings ensures that log entries that are made cannot be falsified or repudiated.

After the critical gaming and/or system components are selected, given individual identifiers, and combined into a protected grouping that is secured using the component "bindings," any changes to those components will then be detected, authorized, and logged. For example, content within the binding is digitally signed (SHA-1 or better) using the key derived from the bindings. This signature is verified whenever an entry is made to a component within the binding. If the signature is wrong, this security violation and the violator are noted, but typically the entry is not prohibited. In other embodiments, the entry may be prohibited as well. Thus, the component binding produces a cryptographic audit trail of the individuals making changes to any of the components within the binding.

Moreover, bindings ensure that the critical components of a gaming machine system, or the content utilized therein, that have been selected to be components within the binding have not been swapped or altered in an unauthorized manner. Preferably, bindings use unique identification numbers that are assigned to vital parts of the gaming platform including, by way of example only, and not by way of limitation, the cabinet, motherboard, specific software, non-volatile RAM card, content (data), and hard drive. These identification numbers combine in a cryptographic manner to form a "binding" that protects and virtually encloses the included components, such that no component within the binding can be modified, removed, or replaced without creating an audit trail and requiring authentication. Thus, for one of these components within the binding to be changed, appropriate authentication is required and a log file entry is made documenting the activity and the identity of the individual making the change. In one preferred embodiment, a specific level of BKEY clearance or classification is required to make specific changes.

In one embodiment, the additional embedded user interface 910, 924 connects to an Ethernet-networked backbone instead of a local system network. Currently, casino networks are not Ethernet, but rather are smaller, more simplistic local system networks. Thus, in this Ethernet-networked backbone embodiment, the current system network is replaced by an industry standard Ethernet backbone, such as 10/100 base T Ethernet running over Cat 3, 4, 5, 6, or higher. Thus, a standard 10/100 base T Ethernet card is added to the processor in this embodiment. Preferably, the network employs TCP/IP, HTTP, and XML messaging or a variant of XML. Nevertheless any suitable protocol may be used.

Further, in another embodiment, the additional embedded user interface 910, 924 connects to a full-featured, back end, download configuration server (e.g., Executive 230, FIGS. 2A and 2B) through the above-described Ethernet-networked backbone. In such an embodiment, the full-featured download configuration server can schedule downloads of content (gaming or otherwise) as well as upload information from the gaming machines 900, 902, such as what options the gaming machines 900, 902 currently possess. Accordingly, in a preferred embodiment, the primary use of the download configuration server is as data download and data retrieval server. While the download configuration server does upload and download Web content style information, it is typically not connected to the World Wide Web. The download configuration server must be authenticated (just like a gaming machine) to make the content served to the additional embedded user interface 910, 924 acceptable to the gaming regulators. Preferably, utilization of the Ethernet-networked backbone and the download configuration server provides many system benefits, including but not limited to reliability, maintainability, security, content staging, content testing, deployment procedures, and incident recovery. In one embodiment, deliverables also preferably include content templates and guidelines for casino owners and operators to create their own Web content for deployment to the Web server. In one embodiment, the download configuration server has its content authenticated in the same manner as the additional embedded user interface 910, 924 to allow content to be downloaded to the Web page embedded display 916, 930.

In one embodiment, the functions previously performed by the gaming monitoring unit of the gaming machine 900, 902 may be supported by the embedded processor 912, 926 of the additional embedded user interface 910, 924. Otherwise stated, the GMU code is transitioned from the gaming monitoring unit into the embedded processor 912, 926 in the additional embedded user interface 910, 924. Accordingly, such a configuration removes the need for the gaming monitoring unit in the gaming machine 900, 902. This results in a significant reduction in the amount and complexity of the hardware, as well as completing a phased transition of more traditional style gaming machines into more modernized upgraded gaming machines.

Thus, in such an embodiment, the gaming machine in includes a main display 908, 922 or other appropriate gaming region (e.g., spinning reels), but does not include a gaming monitoring unit. Such an additional embedded user interface 910, 924 still includes a Web content capable display 916, 930 and an embedded processor 912, 926. Once again, the Web content capable display 916, 930 presents Web information to a user via the display screen. The embedded processor 912, 926 preferably utilizes an internal operating system. Furthermore, in this embodiment the embedded processor 912, 926 additionally includes standard gaming monitoring unit functionality (GMU code), since it replaces the gaming monitoring unit in the gaming machine 900, 902. As before, the embedded processor 912, 926 reads incoming data, translates the data into a Web protocol (Web authoring language), if necessary, and maps the data to the Web content capable display 916, 930.

In one embodiment, the additional embedded user interface 910, 924, the messages are flashed (e.g., animation, multimedia, and the like) to the player within the Web page embedded display 916, 930 while the main gaming display 908, 922 is used for game play. These Web page style messages can be set at virtually any desired length, format, or style. A message might display, for example, "Welcome to Harrah's Las Vegas! You have 1200 bonus points. Would you like to make a hotel or dinner reservation?" Importantly, while a previous utilized EPI would only been capable of scrolling this message in one-quarter inch (0.25ÿ) tall monochrome text, in contrast, the Web page embedded display screen 20 would "flash" this message in bright red, white, black, and green animated format, on six inch (6.0ÿ) by three inch (3.0ÿ) color graphic display. Additionally, in some embodiments, inserting a player identification card into a card reader and/or selecting a player services button activates additional player services functionality.

In one exemplary embodiment of the additional embedded user interface 910, 924 that utilizes a card reader (or other identification technique, such as a player ID code) to recognize a particular player, the Web page embedded display 916, 930 displays an eye-catching, Web page-style message to that player, for example, "Welcome, Mr. Smith!" in response to identifying Mr. Smith. Preferably, the Web page embedded display 916, 930 also has touch screen capabilities that include, by way of example only, and not by way of limitation, "Beverages," "Change," "Services," "Transactions," and "Return to Game." In one embodiment, each of the touch screen icon buttons, when selected, launches a new full screen display within the Web page embedded display 916, 930 for the player.

For example, in one embodiment, when the "Transactions" touch screen icon button is selected, a new screen is activated that includes the Web page style message, "Mr. Smith, Account Balance: Bonus Points=1200, Player Funds=$150, Available Credit=$850, Casino Matching Funds Available=$25," as well as the "Return to Game" icon button 120. As a further example, when the player selects a "Cashless Withdraw" button in another embodiment, a new screen is activated that includes a touch screen keypad and flashes the question, "How much do you want?" as well as "Enter," "Clear," and "Back" buttons. Preferably, this interface also includes an "Information" button that, when selected, launches a new screen within the Web page embedded display 916, 930 that provides answers to frequently asked questions and other useful information. Moreover, the Web page embedded display 916, 930 preferably also includes a "History" button that, when selected, launches a new screen within the Web page embedded display 916, 930 that provides a history log of all transactions and other actions performed on that gaming machine 900, 902.

In accordance with another embodiment, a richer gaming experience is provided via an additional embedded user interface 910, 924 that is incorporated into the gaming machine 900, 902. The method preferably includes: receiving a serial data message (e.g., an I2C data message) containing enhanced player information over a serial communication bus (e.g., an I2C) bus in the additional embedded user interface 910, 924; translating the data message (using the embedded processor 912, 926) into a Web authoring language; and mapping the data message to the Web page embedded display 916, 930, wherein the display screen presents Web page information to a user via the display screen.

The potential advantages of utilizing the additional embedded user interface 910, 924 are numerous. These potential advantages include, by way of example only, and not by way of limitation: providing animated and/or multimedia Web style content; providing fonts and icons which are larger and more aesthetically appealing; providing special services to players, (e.g., multiple languages, assistance for handicapped individuals); facilitating interactive uses of the Web page embedded display 916, 930; providing the ability to customize the "look and feel" of the Web page embedded display 916, 930 for players and casino employees; increased player excitement and participation; and simplified replaceability and/or upgradeability from an EPI or other similar non-Web page style components.

In one embodiment, there is no operating system user interface in the iVIEW device 910, 924. As such, a preferred embodiment of the iVIEW device 910, 924 has several atypical attributes. For example, in one specific, non-limiting preferred embodiment, the iVIEW device 910, 924 starts automatically at power up, uses a unique SMS (Systems Management Server) device identifier, automatically provisions itself into the SMS server, saves its set of installed SMS packages in a persistent manner that ensure they survive hard resets, identifies the existence of the SMS server as soon as possible and issues a poll to the server after the server has been identified, and instructs a Logger component to write logs that track updates.

With respect to the iVIEW device 910, 924 automatically starting up at power up, typically the device client has a component that runs as a service and can be setup to start at boot time. With respect to the iVIEW device 910, 924 using a unique SMS device identifier, when the device client initializes, the component is queried that supplies the device management engine with the device ID, device hardware, and state information. In one specific, non-limiting embodiment, a call is made to the GetDeviceID( ) to obtain the Device Identifier. This function first tries to obtain the Device Identifier from a call to KernalloControl (IOCTL_HAL_GET-_DEVICEID). If this procedure fails, a GUID (Globally Unique Identifier) is generated. The intent is that a call to this kernel returns the unique Device Identifier. That way a unique Device Identifier is ensured.

With respect to the iVIEW device 910, 924 automatically provisioning itself into the SMS server, in one embodiment of the iVIEW device 910, 924 the device client has a registry entry that is setup at boot time to point to the SMS Server. Preferably, the server is an "a priori" (i.e., before experience) constant. Notably, in many embodiments there is another registry entry (which may be named EnableEditServer). Setting this registry entry false ensures that all clients point to the same server.

With respect to the iVIEW device 910, 924 saving its set of installed SMS packages in a persistent manner that ensures they survive hard resets, the relevant module of an extension communicates with a local database file to maintain state information about packages such as package ID, package name, and download status of the package. By default the database file is located in the WINDOWS directory. In one embodiment, the device client is compiled so that it uses a database file located on the COMPACT FLASH card, while in another embodiment the database file is saves from the WINDOWS directory to the COMPACT FLASH card on exit, and restore the file back to the WINDOWS directory at boot time. Notably, to save the package status, a COMPACT FLASH card (or other persistent, portable storage media) must be used. Additionally, since the contents of the COMPACT FLASH card are signed and secure, the package information is saved in a directory that is skipped by the Gatekeeper application so that the application does not interfere with the signed content.

With respect to the iVIEW device 910, 924 identifying the existence of the SMS server as soon as possible, in a preferred embodiment the device client works in a "pull mode" (i.e., data is pulled or requested from the server by the device client) in contrast to a server "push mode" (i.e., data is pushed from the server to the device client). This "pull mode" is normally accomplished by periodically polling the server (i.e., making continuous requests for data from the server, typically at fixed time intervals). In one embodiment, the iVIEW device 910, 924 implements a "device side" listening socket. In this regard, a scan can be performed on the "server side" to find any available iVIEW devices 910, 924. Once found, the server issues a "poll now" command that initiates an upgrade process.

Finally, with respect to the iVIEW device 910, 924 instructing a Logger component to write logs that track updates. The device client has a component (which is a DLL) with an API that enables programmatic access to the device client. In a preferred embodiment, an API call is used to query the device client database for post installation status queries. In addition, it is our intent to implement a callback structure from the CAB file install that will allow our Monitor program to write out log file entries.

In a preferred embodiment of the iVIEW device 910, 924, the extension includes a digital signature object that implements a two step process. This process is used to verify the authenticity of the code and content on the iVIEW device 910, 924. Preferably, the first step resides in the boot ROMs of the hardware, which uses the public key embedded in the ROM and a digital signature to verify that the executable code contained within the operating system file is authentic. In such an embodiment, the second step uses the same algorithm, but with a program embedded within the operating system that has just been authenticated. Preferably, this program is run before any other user mode executables and verifies that the content files have not been changed.

In one embodiment of the iVIEW device 910, 924, two boot ROMs are typically utilized to support the test signing. Preferably, one boot ROM is distributed to customers and contains a public key. The other type of boot ROM contains a public key that is paired with a far less secure private key. This boot ROM is used in the development and test process to run code that has been signed with the test private key. These test boot ROMs are produced in limited quantity and protected more carefully than production boot ROMs. Moreover, one of two mechanisms must be implemented to allow customers to sign their own code. Either a customer's public key must be embedded in the operating system file (which leads to complications given the number of customers) or a third tier of authentication must be added.

In one embodiment, the game monitoring unit (GMU) provides text strings to the iVIEW device 910, 924. These strings are interpreted according to configuration files as navigation commands to HTML pages, as well as other actions. Embedded within these text strings, in an "ad hoc" manner, are variable pieces of data that can be formatted into the HTML (Hyper Text Markup Language) pages using DHTML (Dynamic Hyper Text Markup Language) and script to provide personalization and other functionality. The iVIEW device 910, 924 was configured to avoid modifying the legacy GMU as much as possible, since originally, the strings in the GMU design were only intended to display on a two line device before the advent of the iVIEW device 910, 924.

The strings are transmitted to the GMU using an EPI protocol, which is a higher level protocol implemented on top of the I2C bus. The EPI protocol provides functionality beyond that typically provided by I2C. For example, long messages are broken into packets, and retry logic is included for greater reliability.

Figure 13:
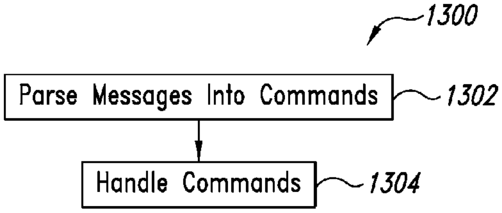
FIG. 13 shows a method of managing a plurality of gaming machines operable as Class II and Class III gaming machines, according to one illustrated embodiment.

Preferably, digital signature verification is the authentication scheme used to secure the iVIEW code and content, which are referred to herein as the message. The outcome of signing process is the production of a digital signature. Preferably, to generate the digital signature, the message is first transformed into the message digest using a hashing algorithm. In one preferred embodiment, the algorithm used is the Secure Hash Algorithm (SHA-1). Next, the message digest is signed, preferably using a private key and the Digital Signature Algorithm (DSA). The output of the DSA signing is the digital signature for the message. As shown in FIG. 13, a digital signing diagram illustrates the digital signing sequence.

To ensure the message has not been changed or tampered with, the message is verified through analysis of its digital signature. First, the message is hashed into the message digest, preferably using SHA-1. Next, using the digital signature as well as the public key, the message digest is verified using DSA. In a preferred embodiment, the content is signed with the private key, but is verified with the public key.

Referring now to a Key Pair Generation component, three tiers of keys may be included in some embodiments. The top tier is the company root key pair. The private key of this key pair is the most securely held key. The public key of this key pair is in the company root certificate. This certificate is self-signing in that it requires no other certificate authority to validate the key as authentic.

The second tier keys may be subsidiary keys. Typically, these key pairs are controlled at the company level (as are the first tier keys). In one specific non-limiting embodiment, there are initially three subsidiary key pairs (e.g., one for each city in which the company is located). When these keys are generated, the keys may be signed using the first tier company root private key. After the second tier keys are generated, content can be signed without the need to use the root private key. However, it is still important to hold the subsidiary private keys securely, since content signed with the second tier keys are valid and could display unsecured content. Another advantage of subsidiary keys is that if a key is compromised for some reason, it will only affect that particular subsidiary key and content, not all content across all keys.

In some embodiments, the third tier keys are casino keys, which are controlled by each individual casino (or other establishment utilizing the claimed invention). When these third tier keys are generated, the third tier keys are signed by a subsidiary (second tier) key. Again, it is important to keep the casino private key secure, since content signed with this key is valid. By having a third tier, any compromised casino keys only affect the machines within that casino.

In another aspect, X.509 certificates are used to facilitate the use of the three tier key structure. The X.509 certificates contains two pieces of information: (1) the public key of the certificate, and (2) the digital signature of the Certificate Authority. To use the public key of the certificate, the Certificate Authority must first authenticate the public key. In this regard, to authenticate a certificate's public key, the Certificate Authority's public key is applied along with the certificate-stored Certificate Authority's digital signature using DSA.

Root, subsidiary, and casino level digital signature certificates (X.509) may be employed. The root certificate is self-signing, meaning that its public key is authentic by definition. The Subsidiary (second tier) certificates have company root as its Certificate Authority. Lastly, the casino (e.g., individual establishment) certificates each have a subsidiary (second tier) certificate as its Certificate Authority.

With respect to a digital signing sequence, the production content is signed using the private key. Typically, the private key can only be accessed from within the vault. Furthermore, in order to facilitate vault signing, the content is first hashed into a message digest, and stored on a floppy disk (or other portable storage media). Next, the floppy disk (or other portable storage media) is taken into the vault, where the files are signed with the private key. Continuing, the digital signatures and the public key are written to the floppy disk (or other portable storage media). Lastly, the floppy disk (or other portable storage media) is then used to transfer the final files.

In another embodiment, a four-tier key structure is utilized. In such an embodiment, the first tier is the root program tier. At this first tier level, full access is granted and all system parameters may be modified. In one embodiment, the second tier is the slot manager program tier. At this second tier level a somewhat reduced level of access is permitted. Preferably, the second level access enables a slot manager to add, delete, and/or modify hardware, software, games, denominations, prize awards, jackpots, wager amounts, and the like, but is not allowed to alter the operating system. The third tier is the slot technician program tier. At this second tier level an even more significantly reduced level of access is permitted. Preferably, the third level access enables a slot technician to fix tilts, jams, and other errors, as well as refill money, tickets, coupons, and/or receipts. However, in this embodiment the third tier level does not provide any of greater degrees of access described above. Finally, the fourth tier is the player customization tier. At this fourth tier level no restricted access is permitted, but rather only display change type access is permitted. Preferably, the fourth level access enables a player to modify parameter including, by way of example only, and not by way of limitation: the language, color, font size, and general layout of the game presentation. Each of these four tier level keys must be signed. Importantly, all of the keys are configured to leave their own distinct audit trail.

Figure 10:
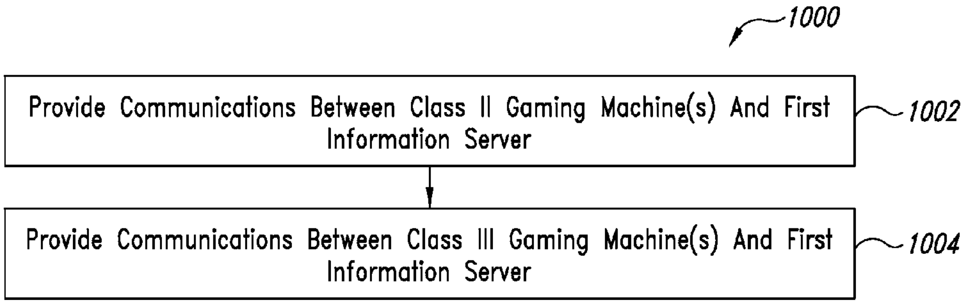
FIG. 10 shows a method of managing a plurality of gaming machines operable as Class II and Class III gaming machines, according to one illustrated embodiment.

FIG. 10 shows a method 1000 of managing a plurality of gaming machines operable as Class II and Class III gaming machines, according to one illustrated embodiment.

At 1002, communications are provided between one or more Class II gaming machines and a first information server. At 1004, communications are provide between one or more Class III gaming machines and the first information server. Thus, gaming machines of both Class II and Class III advantageously communicate via the same sever. Such may allow unified control over an entire gaming floor or throughout an entire property or even across properties.

Figure 11:
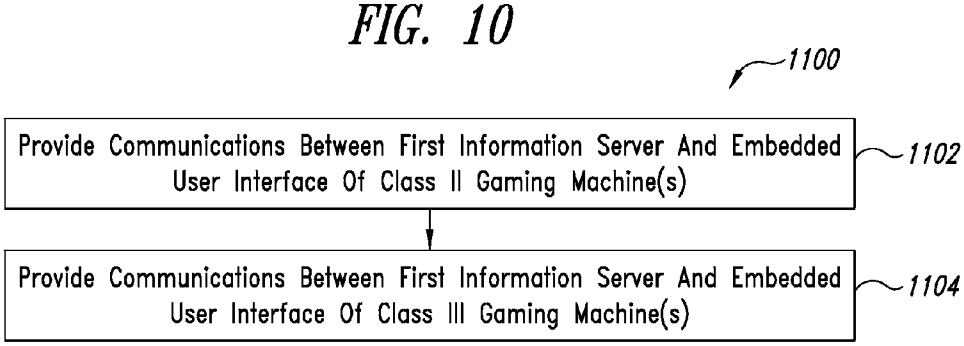
FIG. 11 shows a method of managing a plurality of gaming machines operable as Class II and Class III gaming machines, according to one illustrated embodiment.

FIG. 11 shows a method 1100 of managing a plurality of gaming machines operable as Class II and Class III gaming machines, according to one illustrated embodiment.

At 1102, communications are provided between the first information server and each of a first number of embedded user interfaces embedded in respective ones of the gaming machines operated as Class II gaming machines. At 1104, communications are provided between the first information server and each of a second number of embedded user interfaces embedded in respective ones of the gaming machines operated as Class III gaming machines. The communications between the first information server and the Class II and Class III gaming machines may be provided substantially concurrently, for example time sharing between the Class II and Class III gaming machines. Such may be employed in performing the acts of method 1000 (FIG. 10).

The embedded user interfaces may take a variety of forms, for example the Bally Gaming iView user interface. As previously described with reference to FIG. 10, the embedded user interfaces may have an embedded processor, embedded memory and/or an embedded display that is distinct from the main processor, main memory and main display of the gaming machine. The embedded user interface allows communications with a variety of gaming machines, including legacy gaming machines that are otherwise not equipped for communications. The embedded user interface allows information gathering from a variety of gaming machines, including legacy gaming machines that are otherwise not equipped to gather data.

Figure 12:
FIG. 12 shows a method of managing a plurality of gaming machines operable as Class II and Class III gaming machines, according to one illustrated embodiment.

FIG. 12 shows a method 1200 of managing a plurality of gaming machines operable as Class II and Class III gaming machines, according to one illustrated embodiment.

At 1202, communications are provided using a set of Internet Information Services®. Internet Information Services® is a set of Internet-based services for servers using Microsoft Windows®, and was formerly called Internet Information Server®. Such may be employed in performing the acts of method 1000 (FIG. 10).

FIG. 13 shows a method 1300 of managing a plurality of gaming machines operable as Class II and Class III gaming machines, according to one illustrated embodiment.

At 1302, a message processor parses messages into a number of commands. At 1304, a message handler handles the commands. Commands may, for example, involve the retrieval of information from a database or the writing of information to a database.

Figure 14:
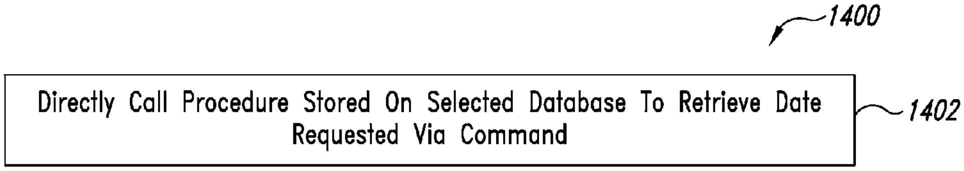
FIG. 14 shows a method of managing a plurality of gaming machines operable as Class II and Class III gaming machines, according to one illustrated embodiment.

FIG. 14 shows a method 1400 of managing a plurality of gaming machines operable as Class II and Class III gaming machines, according to one illustrated embodiment.

At 1402, the message handler directly calls a procedure stored on a selected database to retrieve data requested via one of the commands to handle a message. Such may be employed in performing the act 1302 of method 1300 (FIG. 13).

Figure 15:
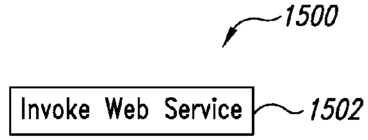
FIG. 15 shows a method of managing a plurality of gaming machines operable as Class II and Class III gaming machines, according to one illustrated embodiment.

FIG. 15 shows a method 1500 of managing a plurality of gaming machines operable as Class II and Class III gaming machines, according to one illustrated embodiment.

At 1502, the message hander invokes a Web service to handle the message. Web services are software designed to support interoperable machine to machine interaction over a network such as the World Wide Web of the Internet. Such may be employed in performing the act 1302 of method 1300 (FIG. 13).

Figure 16:
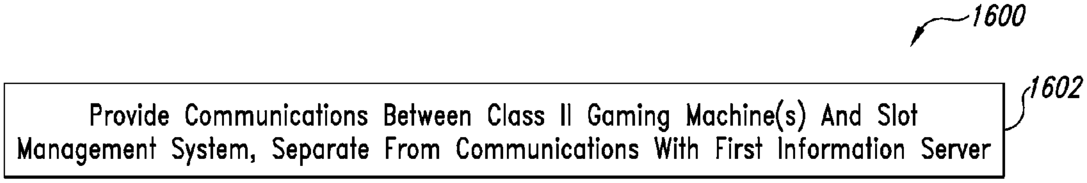
FIG. 16 shows a method of managing a plurality of gaming machines operable as Class II and Class III gaming machines, according to one illustrated embodiment.

FIG. 16 shows a method 1600 of managing a plurality of gaming machines operable as Class II and Class III gaming machines, according to one illustrated embodiment.

At 1602, communications are provided between the Class II gaming machines and a slot management system. The communications may be provided separately (e.g., distinct communications channel or network) from the communications between the Class II gaming machines and the first information server. The slot management system may, for example, be a legacy networked computing system that is configured to monitor operation of traditional and/or video slot machines, and the like. The slot management system may, for example, allow bonus, progressive and other jackpots. The slot management system may additionally or alternatively allow for tracking information about players and/or comping players.

Figure 17:
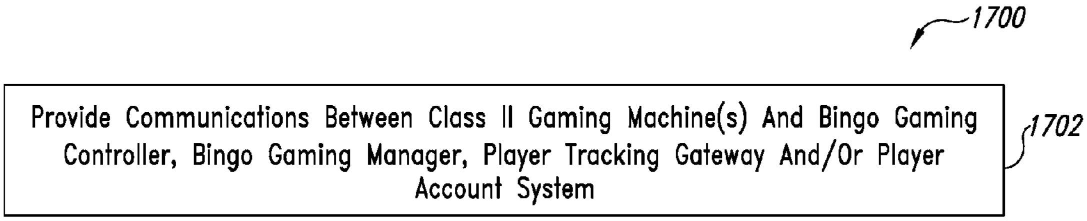
FIG. 17 shows a method of managing a plurality of gaming machines operable as Class II and Class III gaming machines, according to one illustrated embodiment.

FIG. 17 shows a method 1700 of managing a plurality of gaming machines operable as Class II and Class III gaming machines, according to one illustrated embodiment.

At 1702, communications are provided between the Class II gaming machines and at least one of a bingo gaming controller, a bingo gaming manager, a player tracking gateway and a player account system, separately (e.g., distinct communications channel or network) from the communications between the gaming machines operated as Class II gaming machines and the first information server. Such may be employed in performing the act 1602 of method 1600 (FIG. 16).

Figure 18:
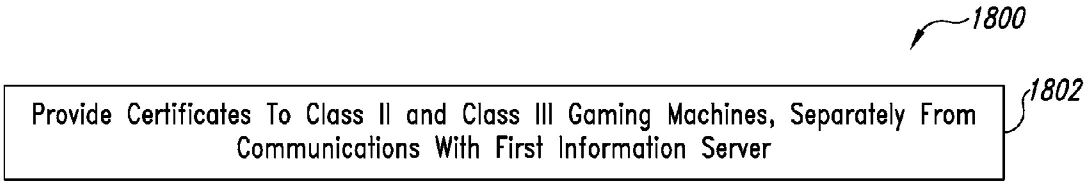
FIG. 18 shows a method of managing a plurality of gaming machines operable as Class II and Class III gaming machines, according to one illustrated embodiment.

FIG. 18 shows a method 1800 of managing a plurality of gaming machines operable as Class II and Class III gaming machines, according to one illustrated embodiment.

At 1802, a certificate server provides certificates to the gaming machines (e.g., Class II and/or Class III gaming machines). The certificates may, for example, be supplied by a dedicated certificate server. The communications may be provided separately from the communications between the gaming machines and the first information server. The certificate may be used to authenticate or otherwise validate users, configuration information, packages of instructions, messages, etc.

Figure 19:
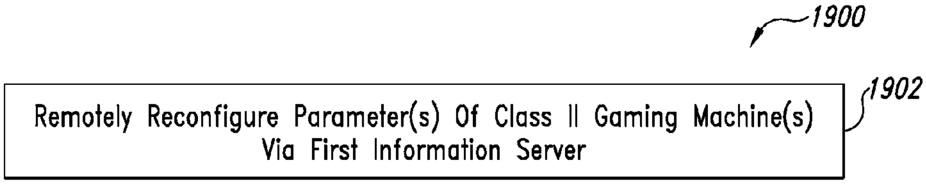
FIG. 19 shows a method of managing a plurality of gaming machines operable as Class II and Class III gaming machines, according to one illustrated embodiment.

FIG. 19 shows a method 1900 of managing a plurality of gaming machines operable as Class II and Class III gaming machines, according to one illustrated embodiment.

At 1902, at least one parameter of at least one of the Class II gaming machine is remotely reconfigured via the first information server. Such may be used to change operation of the Class II gaming machine, without downloading a new package of software or firmware instructions. For example, a parameter may indicate a minimum wager and/or maximum wager that may be placed at the gaming machine. For example, a parameter may indicate a payout schedule or bonus schedule. Remote configuration advantageously allows a control over a large number of gaming machines without the need to physically access each of the gaming machines, saving time and labor costs.

Figure 20:
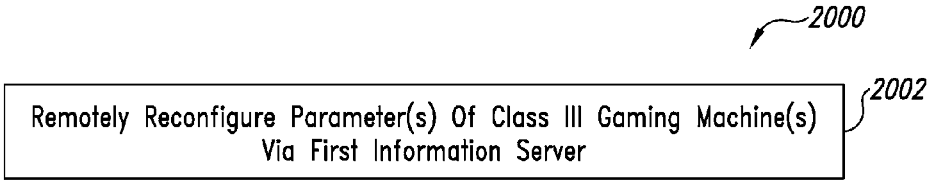
FIG. 20 shows a method of managing a plurality of gaming machines operable as Class II and Class III gaming machines, according to one illustrated embodiment.

FIG. 20 shows a method 2000 of managing a plurality of gaming machines operable as Class II and Class III gaming machines, according to one illustrated embodiment.

At 2002, at least one parameter of at least one of the Class III gaming machines is remotely reconfigured via the first information server. Such may be used to change operation of the Class III gaming machine, without downloading a new package of software or firmware instructions. For example, a parameter may indicate a minimum wager and/or maximum wager that may be placed at the gaming machine. For example, a parameter may indicate a payout schedule or bonus schedule. Remote configuration advantageously allows a control over a large number of gaming machines without the need to physically access each of the gaming machines, saving time and labor costs.

Figure 21:
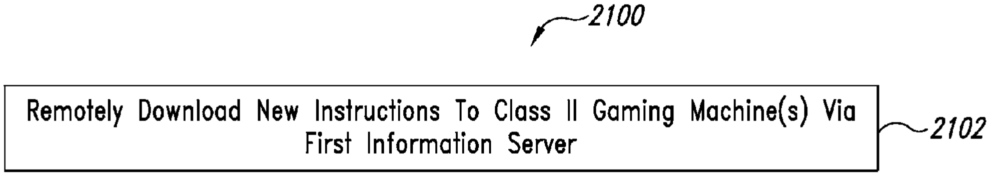
FIG. 21 shows a method of managing a plurality of gaming machines operable as Class II and Class III gaming machines, according to one illustrated embodiment.

FIG. 21 shows a method 2100 of managing a plurality of gaming machines operable as Class II and Class III gaming machines, according to one illustrated embodiment.

At 2102, a new package of software or firmware instructions are remotely downloaded to at least one of the Class II gaming machines via the first information server. Such may be used to significantly change operation of the Class II gaming machine by downloading new software or firmware packages. For example, software or firmware instructions that causes the gaming machine to present a new game or new game rules may be downloaded. The new game or game rules may be a Class II game. Alternatively, the new game or game rules or may cause the Class II gaming machine to be reprogrammed into a Class III gaming machine. Remote downloading advantageously allows a control over a large number of gaming machines without the need to physically access each of the gaming machines, saving time and labor costs.

Figure 22:
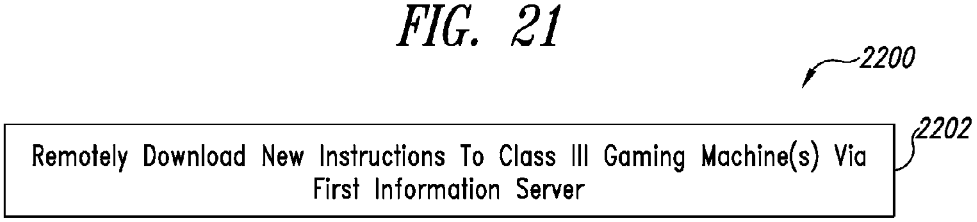
FIG. 22 shows a method of managing a plurality of gaming machines operable as Class II and Class III gaming machines, according to one illustrated embodiment.

FIG. 22 shows a method 2200 of managing a plurality of gaming machines operable as Class II and Class III gaming machines, according to one illustrated embodiment.

At 2202, new instructions are remotely download to at least one of the gaming machines operated as a Class III gaming machine via the first information server. Such may be used to significantly change operation of the Class III gaming machine by downloading new software or firmware packages. For example, software or firmware instructions that causes the gaming machine to present a new game or new game rules may be downloaded. The new game or game rules may be a Class III game. Alternatively, the new game or game rules or may cause the Class III gaming machine to be reprogrammed into a Class II gaming machine. Remote downloading advantageously allows a control over a large number of gaming machines without the need to physically access each of the gaming machines, saving time and labor costs.

Figure 23:
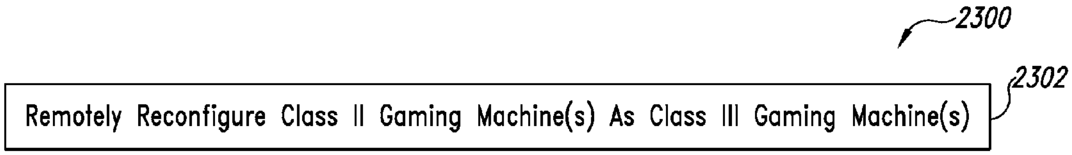
FIG. 23 shows a method of managing a plurality of gaming machines operable as Class II and Class III gaming machines, according to one illustrated embodiment.

FIG. 23 shows a method 2300 of managing a plurality of gaming machines operable as Class II and Class III gaming machines, according to one illustrated embodiment.

At 2302, at least some of the Class II gaming machines are remotely reconfigured or reprogrammed as Class III gaming machines. Such may be performed by downloading a package of executable instructions that cause the game machine to present games that are Class III games. Alternatively, such may be performed by instructing the Class II gaming machine to execute an instruction package previously loaded or downloaded. Such may be used when an actual or expected demand for Class III games justifies doing so. Additionally or alternatively, such may be used where a player playing a Class II gaming machine desires to play Class III games, but does not want to move to a different gaming machine. Such may be limited to times when the casino or other facility can change the operation without exceeding a legal limit on the total number of Class III gaming machines which may be imposed under the laws of some states or other jurisdiction. The system may track the number of Class III gaming machines, and prevent the reconfiguration or reprogramming if such would exceed the limit. The system may additionally, or alternatively, provide the casino operator notice when gaming on one Class III gaming machine ends and the casino is thus below the limit, allowing the casino operator to reconfigure a Class II gaming machine.

Figure 24:
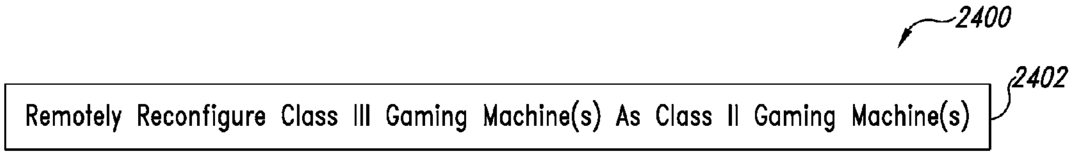
FIG. 24 shows a method of managing a plurality of gaming machines operable as Class II and Class III gaming machines, according to one illustrated embodiment.

FIG. 24 shows a method 2400 of managing a plurality of gaming machines operable as Class II and Class III gaming machines, according to one illustrated embodiment.

At 2402, at least some of the Class III gaming machines are remotely reconfigured or reprogrammed as Class II gaming machines. Such may be performed by downloading a package of executable instructions that cause the game machine to present games that are Class II games. Alternatively, such may be performed by instructing the Class III gaming machine to execute an instruction package previously loaded or downloaded. Such may be used when an actual or expected demand for Class II games justifies doing so. Additionally or alternatively, such may be used where a player playing a Class III gaming machine desires to play Class II games, but does not want to move to a different gaming machine.

Figure 25:
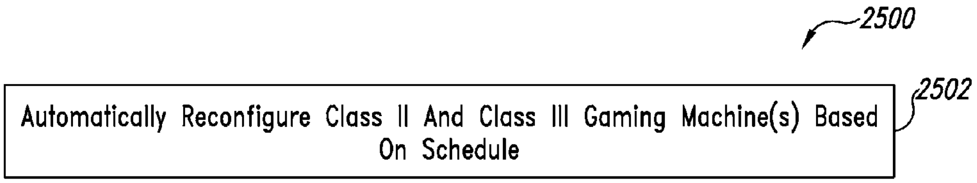
FIG. 25 shows a method of managing a plurality of gaming machines operable as Class II and Class III gaming machines, according to one illustrated embodiment.

FIG. 25 shows a method 2500 of managing a plurality of gaming machines operable as Class II and Class III gaming machines, according to one illustrated embodiment.

At 2502, at least some of the Class II and the Class III gaming machines are remotely reconfigured or reprogrammed based on a schedule. For example, the Class II and the Class III gaming machines may be automatically reconfigured or reprogrammed based on the schedule. The schedule may be based on actual demand during previous similar periods. Similar periods may take a variety of forms, for example week nights, weekday, weekend daytime, weekends night time, summer, winter, Holiday, non-Holidays, and/or conventions.

Figure 26:
FIG. 26 shows a method of managing a plurality of gaming machines operable as Class II and Class III gaming machines, according to one illustrated embodiment.

FIG. 26 shows a method 2600 of managing a plurality of gaming machines operable as Class II and Class III gaming machines, according to one illustrated embodiment.

At 2602, communications are provided between at least some of the gaming machines and a casino management system via the first information server. The casino management system may provide one or more functions, for example accounting, player tracking, player comping, employee tracking, promotional systems to promote events and products, bonusing systems, and/or security.

The various embodiments described above can be combined to provide further embodiments. To the extent that they are not inconsistent with the specific teachings and definitions herein, all of the U.S. patents, U.S. patent application publications, U.S. patent applications, foreign patents, foreign patent applications and non-patent publications referred to in this specification and/or listed in the Application Data Sheet, including but not limited to U.S. patent publication No. 2007/0082737A1; U.S. patent publication No. 2007/0006329A1; U.S. patent publication No. 2007/0054740A1; U.S. patent publication No. 2007/01111791; U.S. provisional patent application Ser. No. 60/865345, filed Nov. 10, 2006, entitled "COMPUTERIZED GAME MANAGEMENT SYSTEM AND METHOD"; U.S. provisional patent application Ser. No. 60/865575, filed Nov. 13, 2006, entitled "COMPUTERIZED GAME MANAGEMENT SYSTEM AND METHOD"; U.S. provisional patent application Ser. No. 60/865332, filed Nov. 10, 2006, entitled "DOWNLOAD AND CONFIGURATION SERVER-BASED SYSTEM AND METHOD"; U.S. provisional patent application Ser. No. 60/865550, filed Nov. 13, 2006, entitled "DOWNLOAD AND CONFIGURATION SERVER-BASED SYSTEM AND METHOD"; U.S. nonprovisional patent application Ser. No. 11/938121, filed Nov. 9, 2007, entitled "GAMING SYSTEM DOWNLOAD NETWORK ARCHITECTURE"; U.S. nonprovisional patent application Ser. No. 11/938228, filed Nov. 9, 2007, entitled "GAMING SYSTEM CONFIGURATION CHANGE REPORTING"; U.S. nonprovisional patent application Ser. No. 11/938155, filed Nov. 9, 2007, entitled "REPORTING FUNCTION IN GAMING SYSTEM ENVIRONMENT"; U.S. nonprovisional patent application Ser. No. 11/938190, filed Nov. 9, 2007, entitled "SECURE COMMUNICATIONS IN GAMING SYSTEM"; U.S. nonprovisional patent application Ser. No. 11/938163, filed Nov. 9, 2007, entitled "METHODS AND SYSTEMS FOR CONTROLLING ACCESS TO RESOURCES IN A GAMING NETWORK"; U.S. nonprovisional patent application Ser. No. 11/938231, filed Nov. 9, 2007, entitled "DOWNLOAD AND CONFIGURATION SERVER-BASED SYSTEM AND METHOD WITH STRUCTURED DATA"; U.S. nonprovisional patent application Ser. No. 11/938225, filed Nov. 9, 2007, entitled "PACKAGE MANAGER SERVCE IN GAMING SYSTEM"; U.S. Patent Application Ser. No. 11/278,937, filed Apr. 6, 2006, entitled "LOGIC INTERFACE ENGINE SYSTEM AND METHOD"; U.S. Provisional Patent Application Ser. No. 60/676,429, filed Apr. 28, 2005, entitled "LOGIC INTERFACE ENGINE SYSTEM AND METHOD"; U.S. patent application Ser. No. 11/470,606, filed Sep. 6, 2006 entitled "SYSTEM GAMING"; U.S. Provisional Patent Application Ser. No. 60/714,754, filed Sep. 7, 2005, entitled "SYSTEM GAMING APPARATUS AND METHOD"; U.S. patent application No. 11/938121, filed Nov. 9, 2007 entitled "DOWNLOAD AND CONFIGURATION SERVER-BASED SYSTEM AND METHOD"; U.S. Provisional Patent Application No.60/865,332, filed Nov. 10, 2006, entitled "DOWNLOAD AND CONFIGURATION SERVER-BASED SYSTEM AND METHOD"; and U.S. Provisional Patent Application No.60/865,396, filed Nov. 10, 2006, entitled "DOWNLOAD AND CONFIGURATION CAPABLE GAMING MACHINE OPERATING SYSTEM, GAMING MACHINE, AND METHOD" are incorporated herein by reference, in their entirety. Aspects of the embodiments can be modified, if necessary, to employ systems, circuits and concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A gaming system, comprising:

a plurality of gaming machines each including a respective main processor and a respective main user interface, at least one of the gaming machines configured as a Class II gaming machine and at least one of the gaming machines configured as a Class III gaming machine;

an information server communicatively coupled with the gaming machines configured as Class II gaming machines and the gaming machines configured as Class III gaming machines;

a plurality of embedded user interfaces associated with respective ones of the gaming machines, the embedded user interfaces each respectively including an embedded processor and an embedded display, the embedded processor separate from the respective main processors of the respective ones of the gaming machines and the plurality of embedded user interfaces separate from the respective main user interfaces of the respective ones of the gaming machines, where the information server is communicatively coupled to the gaming machines via respective ones of the embedded user interfaces;

a dedicated certificate server communicatively coupled to at least one of the embedded processors of the plurality of embedded user interfaces, wherein the dedicated certificate server is distinct from said information server; and a gaming control computer including a graphical user interface and operable to at least one of remotely selectively configure or program at least the embedded interface with the processor communicatively coupled to the dedicated certificate server, wherein the dedicated certificate server provides certificates used to authenticate a proposed configuration command associated with configuring or programming at least the embedded interface with the processor communicatively coupled to the dedicated certificate server.

2. The gaming system of claim 1 wherein the information server is implemented as a Web service.

3. The gaming system of claim 1, further comprising:

a message processor configured to parse messages into commands and to route the commands to be handled.

4. The gaming system of claim 3, further comprising:

a message handler configured to handle commands routed from the message processor.

5. The gaming system of claim 4 wherein the message handler is configured to handle at least some of the commands via a Web service.

6. The gaming system of claim 4, further comprising:

a plurality of databases communicatively coupled to the message handler.

7. The gaming system of claim 6 wherein the plurality of databases includes at least one of a core database, a configuration database that stores configuration information indicative of one or more configuration parameters of the gaming machines, a download database that stores one or more packages of instructions downloadable to and executable by one or more of the gaming machines, a tournament database that stores information indicative of a tournament run on one or more of the gaming machines, a reports database that stores performance information about one or more of the gaming machines, an event database that stores information about one or more events, a voucher database that stores information about one or more vouchers provided to a number of players, and a schedule database that stores scheduling information indicative of times at which one or more of the gaming machines are to be reconfigured.

8. The gaming system of claim 6 wherein the message handler is configured to make a direct call to a procedure stored on a selected one of the databases to retrieve data requested via one of the commands.

9. A gaming machine management system to manage a plurality of gaming machines operable as Class II and Class III gaming machines, the gaming machine management system comprising:

a plurality of embedded user interfaces embedded in respective ones of the gaming machines and including an embedded processor and an embedded display, the embedded processor separate from respective main processors of the respective ones of the gaming machines and the plurality of embedded user interfaces separate from respective main user interfaces of the respective ones of the gaming machines;

a set of communications services that provide communications between the embedded user interfaces respectively embedded in both the Class II and the Class III gaming machines;

a game management computing system including a game management graphical user interface;

a dedicated certificate server communicatively coupled to the plurality of embedded user interfaces;

an executive server configured to at least one of reconfigure or reprogram the embedded user interfaces as Class II and Class III gaming machines subject to certification by the dedicated certificate server; and a set of communications services that provide communications between the game management computing system and the executive server.

10. The gaming system of claim 9 wherein the set of communications services are implemented as a Web service.

11. The gaming system of claim 9, further comprising:

a message processor configured to parse messages into commands and to route the commands to be handled; and a message handler configured to handle commands routed from the message processor.

12. The gaming system of claim 11, further comprising:

a plurality of databases communicatively coupled to exchange information with the message handler.

13. The gaming system of claim 12 wherein the message handler is configured to handle at least some of the commands via a Web service.

14. The gaming system of claim 9, further comprising:

a scheduler communicatively coupled to the executive server and configured to cause the executive server to at least one of reconfigure or reprogram at least some of the gaming machines based on a schedule stored in a schedule database.

15. The gaming system of claim 9, further comprising:

a scheduler communicatively coupled to the executive server and configured to cause the executive server to at least one of reconfigure or reprogram at least some of the gaming machines based on a schedule stored in a schedule database that represents player demand for the Class II and the Class III gaming machines in a similar previous period.

16. The gaming system of claim 9 wherein the executive server is configured to reconfigure at least some of the Class II gaming machines as Class III gaming machines.

17. The gaming system of claim 9 wherein the executive server is configured to reconfigure at least some of the Class III gaming machines as Class II gaming machines.

18. The gaming system of claim 9 wherein the executive server is configured to reprogram at least some of the Class II gaming machines as Class III gaming machines.

19. The gaming system of claim 9 wherein the executive server is configured to reprogram at least some of the Class III gaming machines as Class II gaming machines.

20. A method of managing a plurality of gaming machines operable as Class II and Class III gaming machines, the method comprising:

at least one computer processor providing communications between the gaming machines operated as Class II gaming machines and a first information server;

the at least one computer processor providing communications between the gaming machines operated as Class III gaming machines and the first information server, wherein the providing communications between the gaming machines and the first information server between the first information server includes providing communications between the first information server and each of a plurality of embedded user interfaces embedded in respective ones of the gaming machines, the embedded user interfaces each respectively including an embedded processor and an embedded display, the embedded processor separate from respective main processors of the respective ones of the gaming machines and the plurality of embedded user interfaces separate from respective main user interfaces of the respective ones of the gaming machines; and a dedicated certificate server in communication with the embedded processors providing certificates to the gaming machines operated as Class II gaming machines and to the gaming machines operated as Class III gaming machines separately from the communications between the gaming machines and the first information server.

21. The method of claim 20 wherein providing communications between the gaming machines operated as Class II gaming machines and a first information server includes providing communications between the first information server and each of a first number of the plurality of embedded user interfaces embedded in respective ones of the gaming machines operated as Class II gaming machines.

22. The method of claim 21 wherein providing communications between the gaming machines operated as Class III gaming machines and the first information server includes providing communications between the first information server and each of a second number of the plurality of embedded user interfaces embedded in respective ones of the gaming machines operated as Class III gaming machines.

23. The method of claim 22 wherein providing communications between the first information server and each of a first number of embedded user interfaces embedded in respective ones of the gaming machines operated as Class II gaming machines and providing communications between the first information server and each of a first number of embedded user interfaces embedded in respective ones of the gaming machines operated as Class III gaming machines includes providing communications using a Web service.

24. The method of claim 20, further comprising:

parsing messages into a number of commands; and handling the commands.

25. The method of claim 24 wherein handling the commands includes directly calling a procedure stored on a selected databases to retrieve data requested via one of the commands.

26. The method of claim 24 wherein handling the commands includes invoking a Web service.

27. The method of claim 20, further comprising: providing communications between the gaming machines operated as Class II gaming machines and a slot management system, separately from the communications between the gaming machines operated as Class II gaming machines and the first information server.

28. The method of claim 20, further comprising: providing communications between the gaming machines operated as Class II gaming machines and at least one of a bingo gaming controller, a bingo gaming manager, a player tracking gateway and a player account system, separately from the communications between the gaming machines operated as Class II gaming machines and the first information server.

29. The method of claim 20, further comprising: remotely reconfiguring at least one parameter of at least one of the gaming machines operated as a Class II gaming machine via the first information server.

30. The method of claim 20, further comprising: remotely reconfiguring at least one parameter of at least one of the gaming machines operated as a Class III gaming machine via the first information server.

31. The method of claim 20, further comprising: remotely downloading new instructions to at least one of the gaming machines operated as a Class II gaming machine via the first information server.

32. The method of claim 20, further comprising: remotely downloading new instructions to at least one of the gaming machines operated as a Class III gaming machine via the first information server.

33. The method of claim 20, further comprising: remotely reconfiguring at least some of the Class II gaming machines as Class III gaming machines.

34. The method of claim 20, further comprising: reconfiguring at least some of the Class III gaming machines as Class II gaming machines.

35. The method of claim 20, further comprising: remotely downloading a package of executable gaming machine instructions to change operation of at least some of the Class II gaming machines to Class III gaming machines.

36. The method of claim 20, further comprising: remotely downloading a package of executable gaming machine instructions to change operation of at least some of the Class III gaming machines to Class II gaming machines.

37. The method of claim 20, further comprising: automatically reconfiguring at least some of the Class II and the Class III gaming machines based on a schedule.

38. The method of claim 20, further comprising: automatically downloading at least one package of executable gaming machine instructions to change operation of at least some of the Class II and the Class III gaming machines based on a schedule.

39. The method of claim 20, further comprising: providing communications between at least some of the gaming machines and a casino management system via the first information server.

* * * * *